United States Patent [19]

Amberg et al.

[11] 4,053,346
[45] Oct. 11, 1977

[54] METHOD AND APPARATUS FOR FORMING THERMOPLASTIC CONTAINERS

[75] Inventors: Stephen W. Amberg, Toledo, Ohio; Thomas E. Doherty, Setauket, N.Y.

[73] Assignee: Owens-Illinois, Inc., Toledo, Ohio

[21] Appl. No.: 683,745

[22] Filed: May 6, 1976

Related U.S. Application Data

[60] Division of Ser. No. 479,421, June 14, 1974, Pat. No. 3,970,492, which is a continuation-in-part of Ser. No. 354,305, April 25, 1973, abandoned, which is a continuation-in-part of Ser. No. 211,259, Dec. 23, 1971, Pat. No. 3,854,583.

[51] Int. Cl.$^2$ ............................................. B65B 51/14
[52] U.S. Cl. ............................... 156/446; 93/36 MM; 93/36.2; 93/36.5 SS; 93/39 C; 93/39.1 R; 93/DIG. 1; 156/497; 156/580
[58] Field of Search .................... 156/443, 497, 580.1, 156/69, 446, 58 D; 93/81 R, DIG. 1, 36.5 SS, 36 MM, 36.2, 39 C, 39.1 R, 54.1

[56] References Cited

U.S. PATENT DOCUMENTS

| | | | |
|---|---|---|---|
| 2,697,387 | 12/1954 | Falconer | 93/81 R |
| 3,252,388 | 5/1966 | Schur | 93/81 R |
| 3,562,920 | 2/1971 | Vuilleumier et al. | 93/36 M |
| 3,764,425 | 10/1973 | Neff et al. | 156/69 |

*Primary Examiner*—Edward G. Whitby
*Attorney, Agent, or Firm*—Myron E. Click; Harold F. Mensing

[57] ABSTRACT

A fabricated cup or other nestable container in which the sidewall is formed from a rectangular sheet-like blank of a thermoplastic material, particularly an expanded thermoplastic material, the blank having its ends joined to one another in a liquid-tight seam extending the full height thereof to form a sleeve, the blank having a relatively high degree of orientation or heat-shrinkability extending circumferentially of the sleeve, the fabrication of the sidewall from the sleeve being accomplished by telescoping the sleeve over a generally frusto-conically shaped mandrel, by exposing the sleeve to heat to cause it to shrink to conform to the configuration of the mandrel and by stripping the shrunken sleeve from the mandrel. A two-piece container may be formed from such a sidewall by affixing an end closure element to the bottom or smaller end of the sidewall. A one-piece container may also be formed in this manner by using a blank of sufficient height so that a substantial portion of the sleeve formed therefrom extends beyond the smaller end of the forming mandrel, such substantial portion, when the sleeve is exposed to heat, being shrinkable to form an annular planar portion disposed transversely of the longitudinal axis of the mandrel and a relatively small tubulation which extends longitudinally from the interior of the annular planar portion and which, by the application of pressure thereto while at elevated temperature, may be caused to collapse and fuse together to close the bottom of the container in a liquid-tight manner. A container of this type may be used to advantage to contain any liquid or other fluent product therein in face-to-face contact with the interior surface of the sidewall thereof, and when the container is fabricated from an expanded material, because of the insulating characteristics of such material, a container fabricated therefrom may be used to particular advantage as a hand-holdable cup for coffee or other hot beverage.

The container fabricating apparatus includes a continuously moving conveyor having a plurality of spaced mandrels having an external configuration corresponding to the internal configuration of the containers. Sub-assemblies acting in timed relationship with the main conveyor (a) pre-heat the mandrels, (b) form cylindrical sleeve blanks from a continuous web of thermoplastic material and telescope the sleeve blanks onto the mandrels, (c) simultaneously cut bottom disc closures from two continuous webs of thermoplastic material and deliver the discs serially to the mandrels, (d) subject the mandrels carrying the sleeve blanks and discs to heat to shrink each sleeve blank about a mandrel in overlapped relationship with a bottom disc, (e) fuse the disc to the overlapping portion sidewalls of the container and (f) form a curved rim at the top of the cup to complete formation.

7 Claims, 43 Drawing Figures

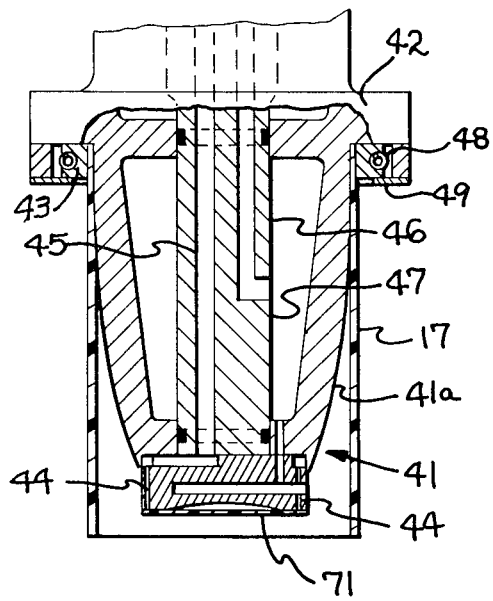
FIG. 6
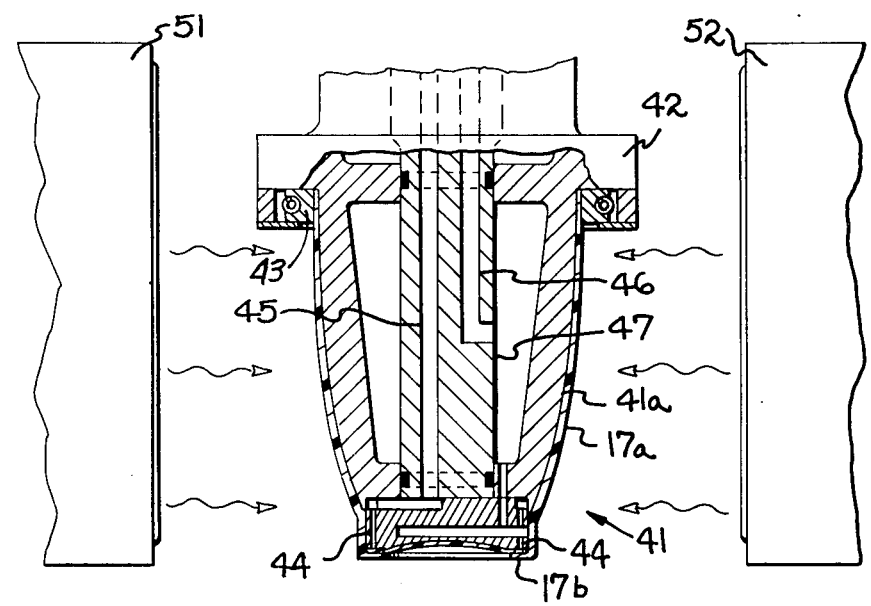
FIG. 7
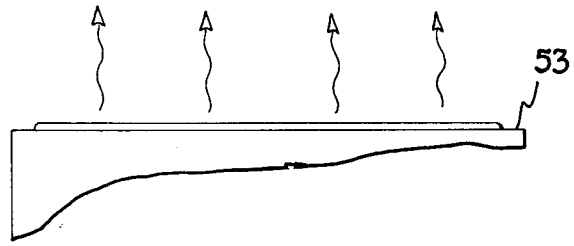

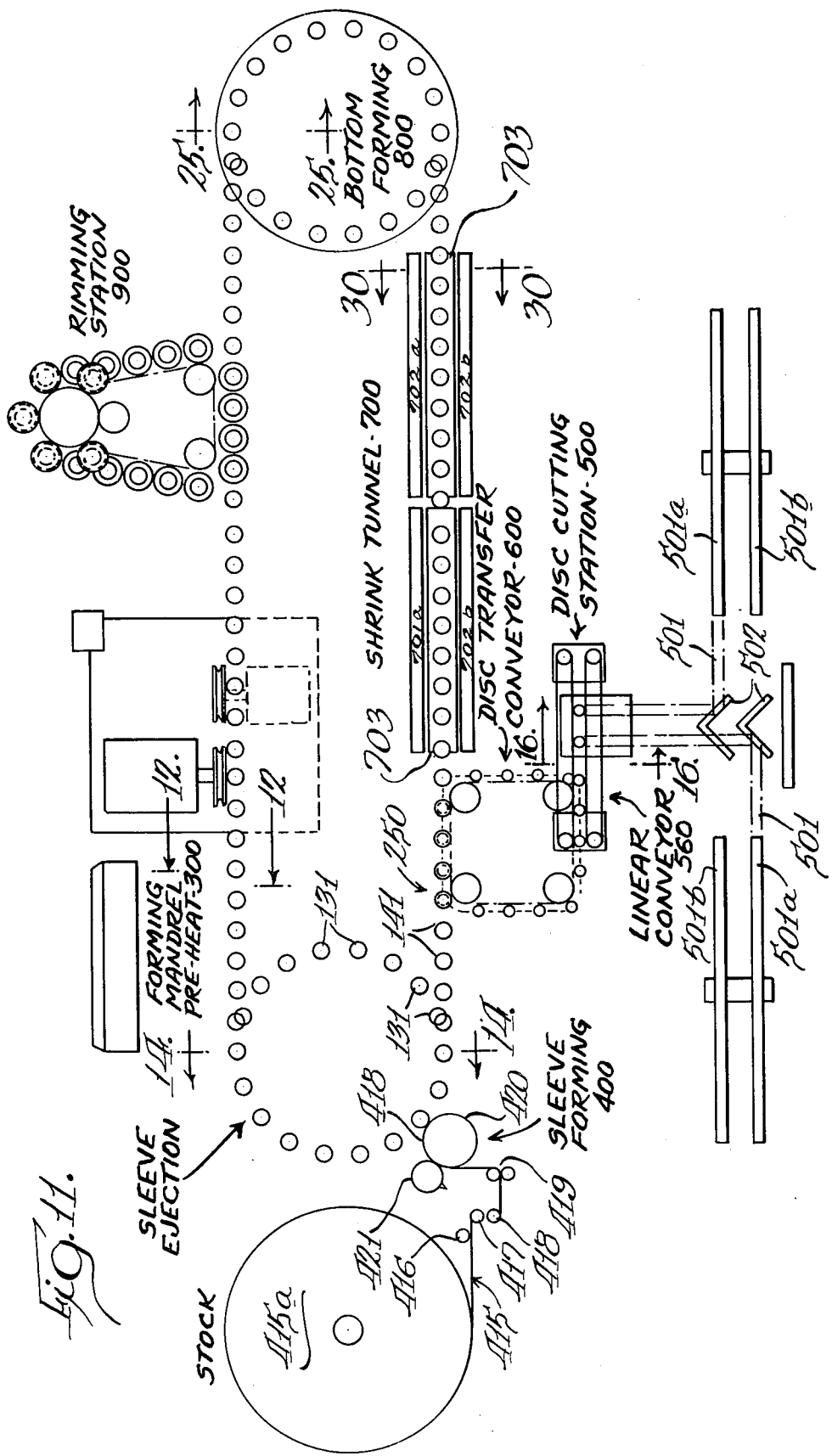

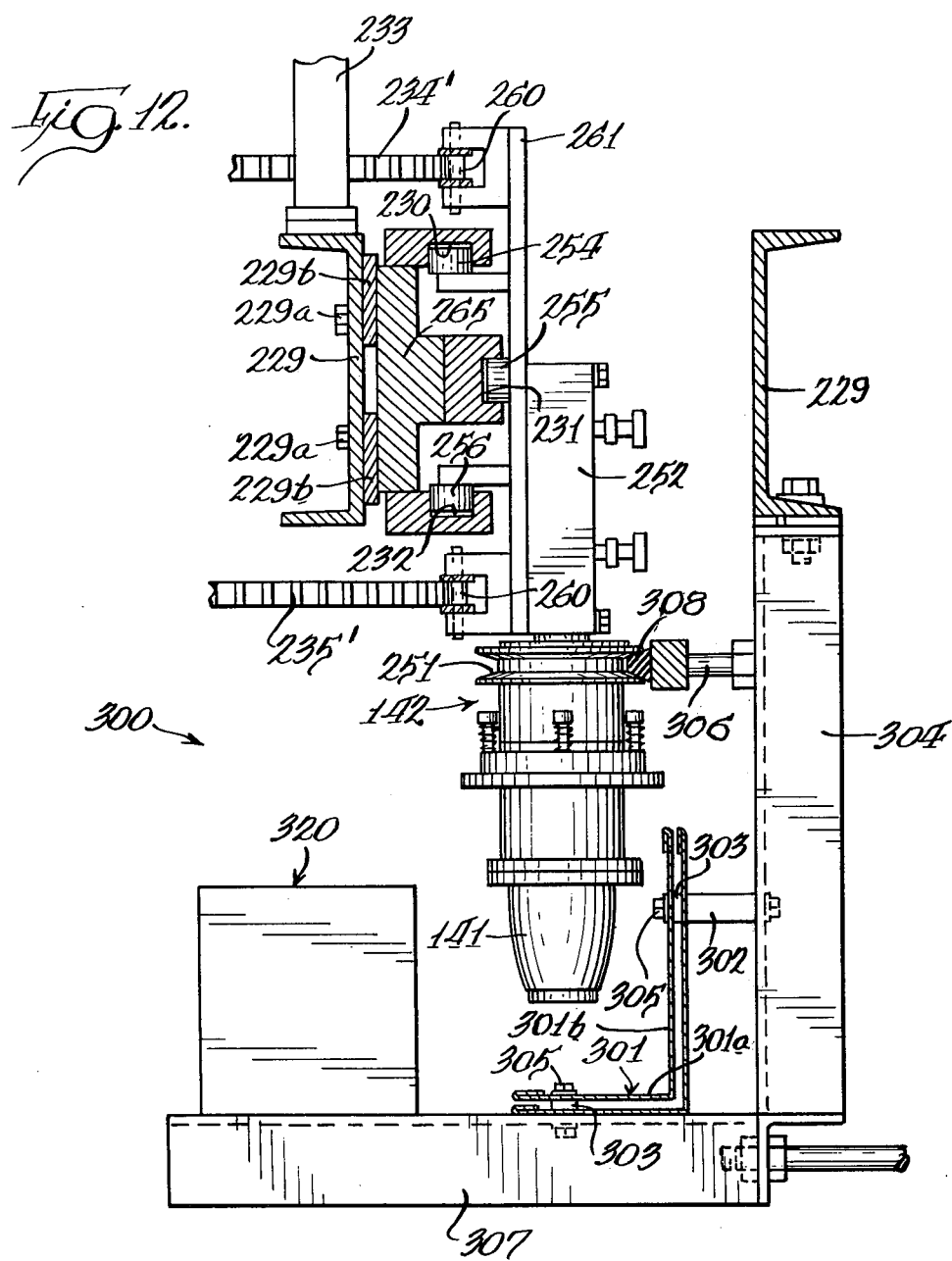

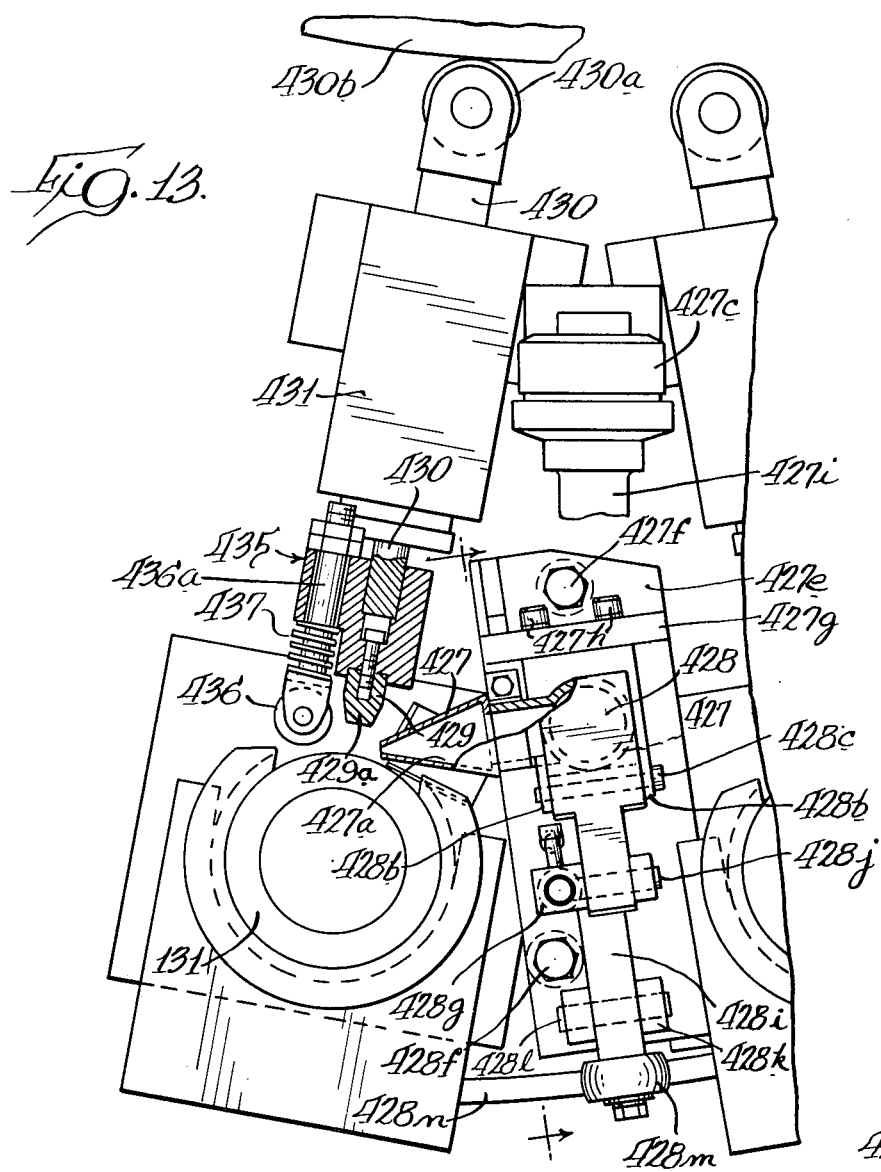
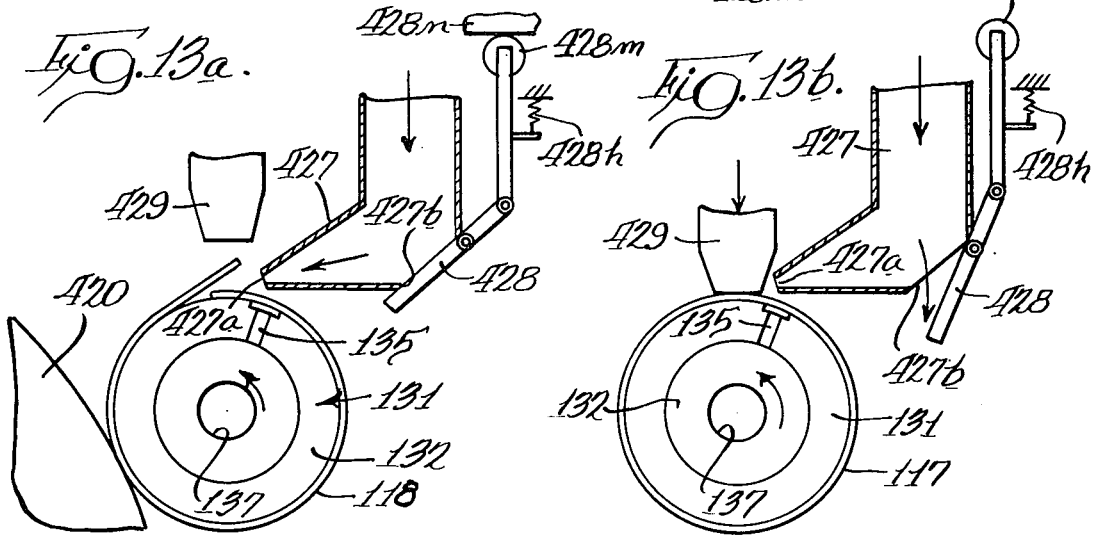

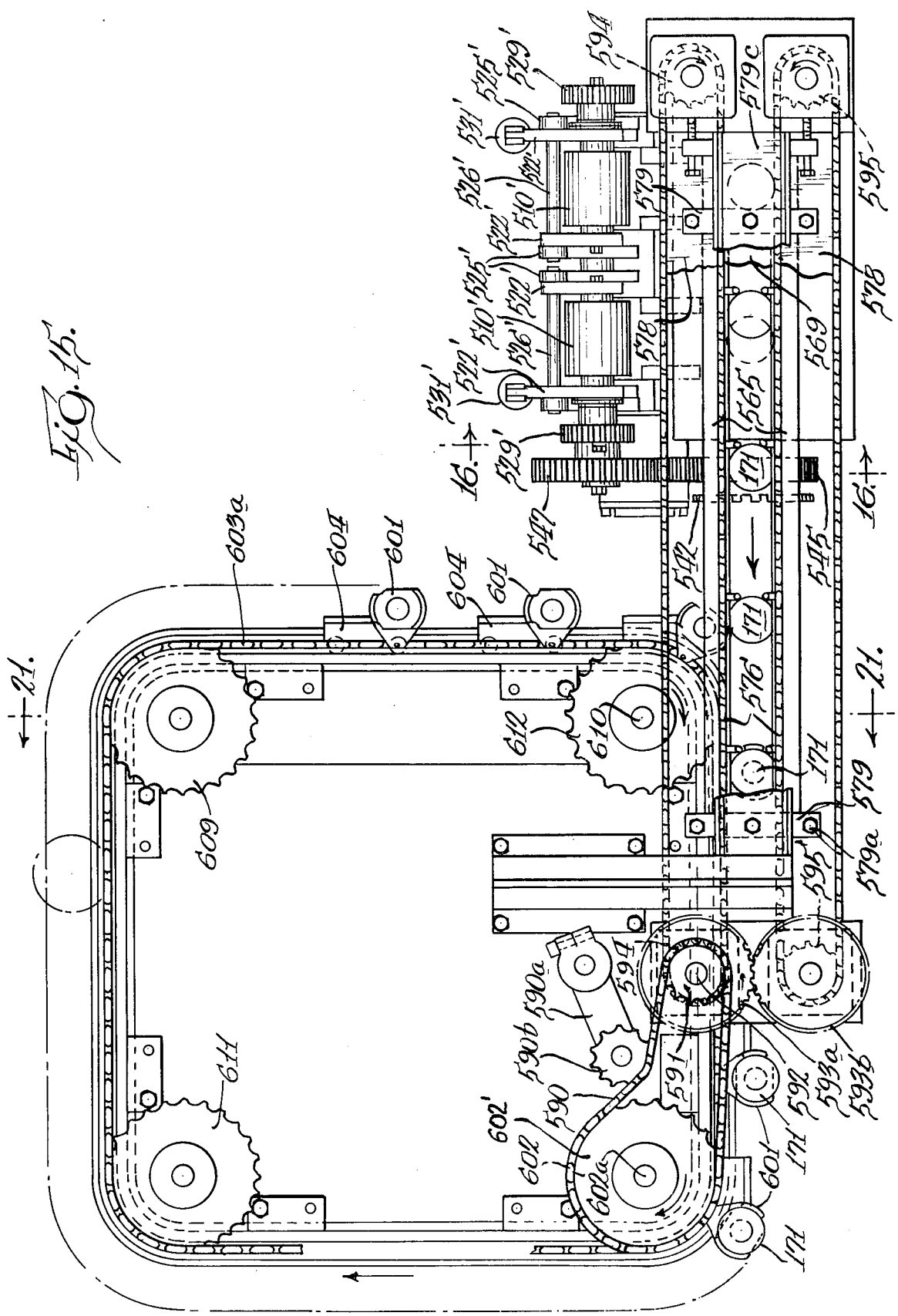

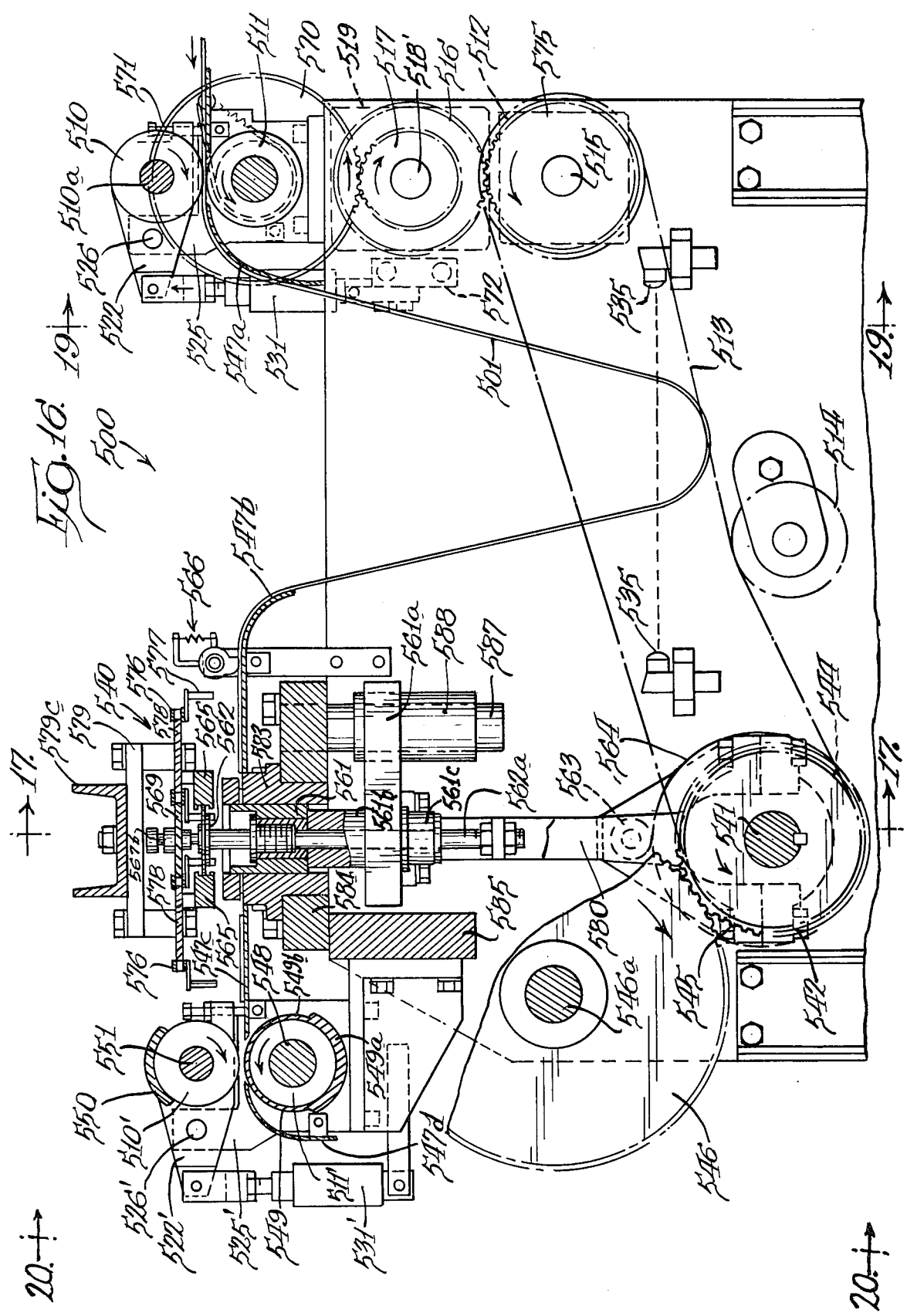

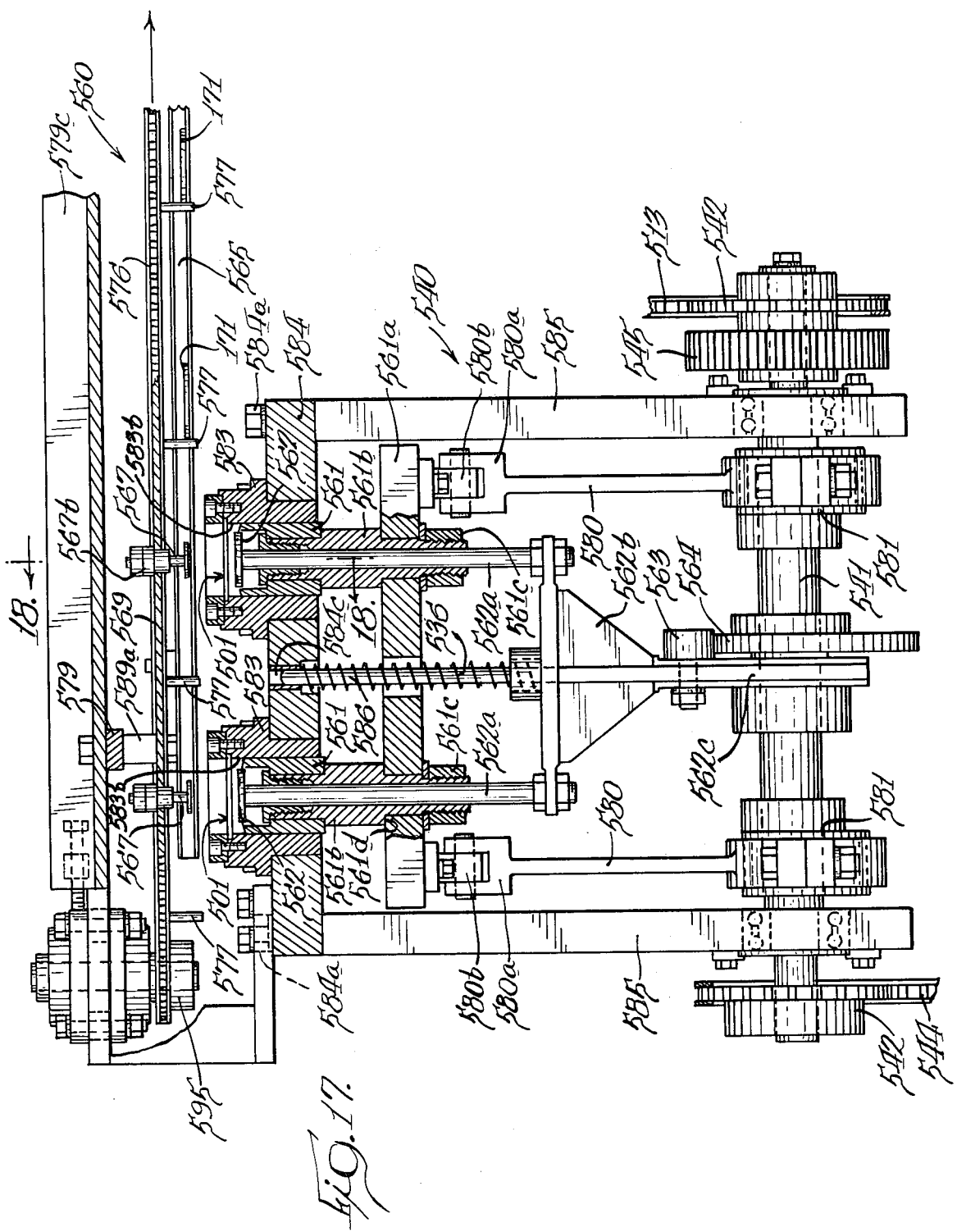

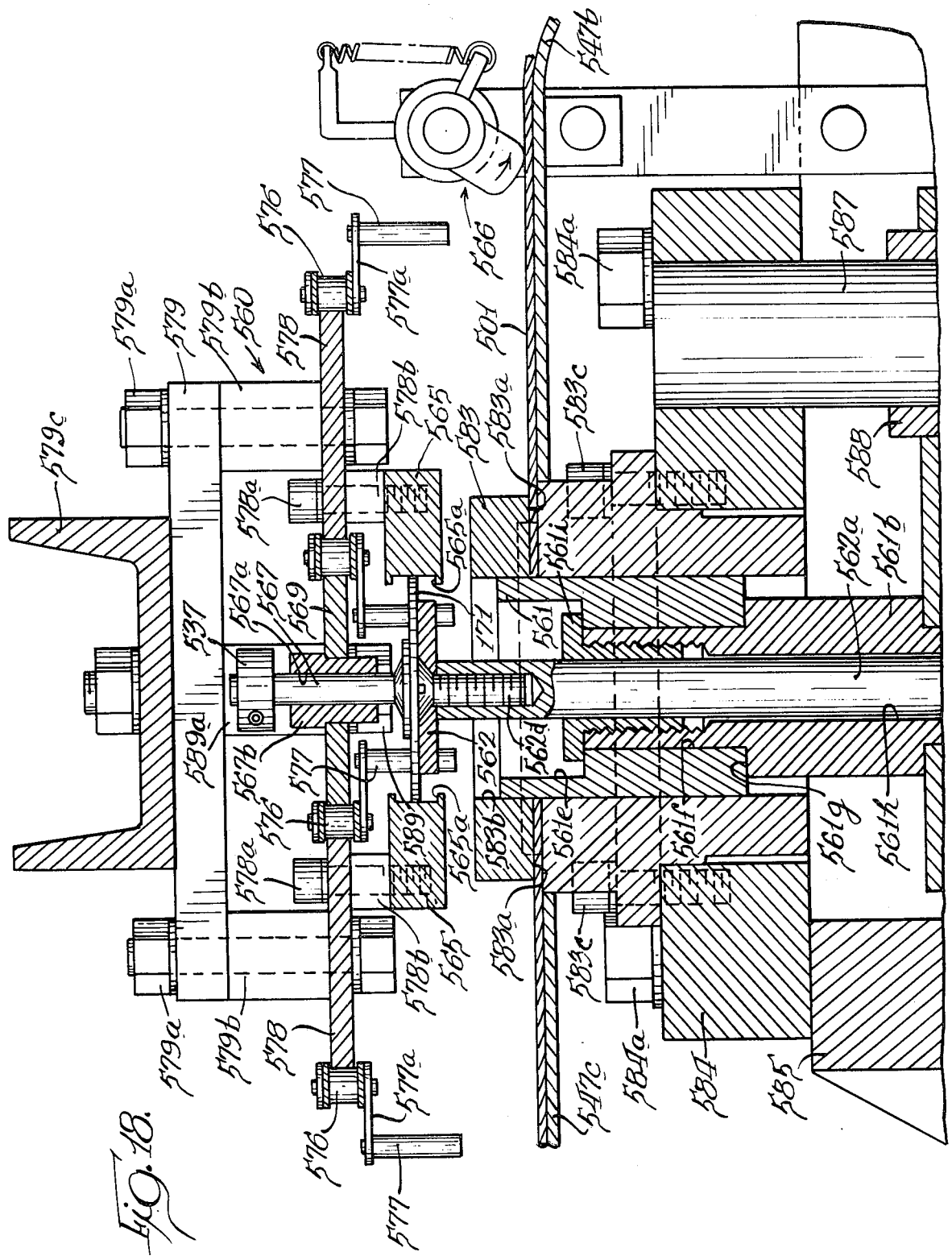

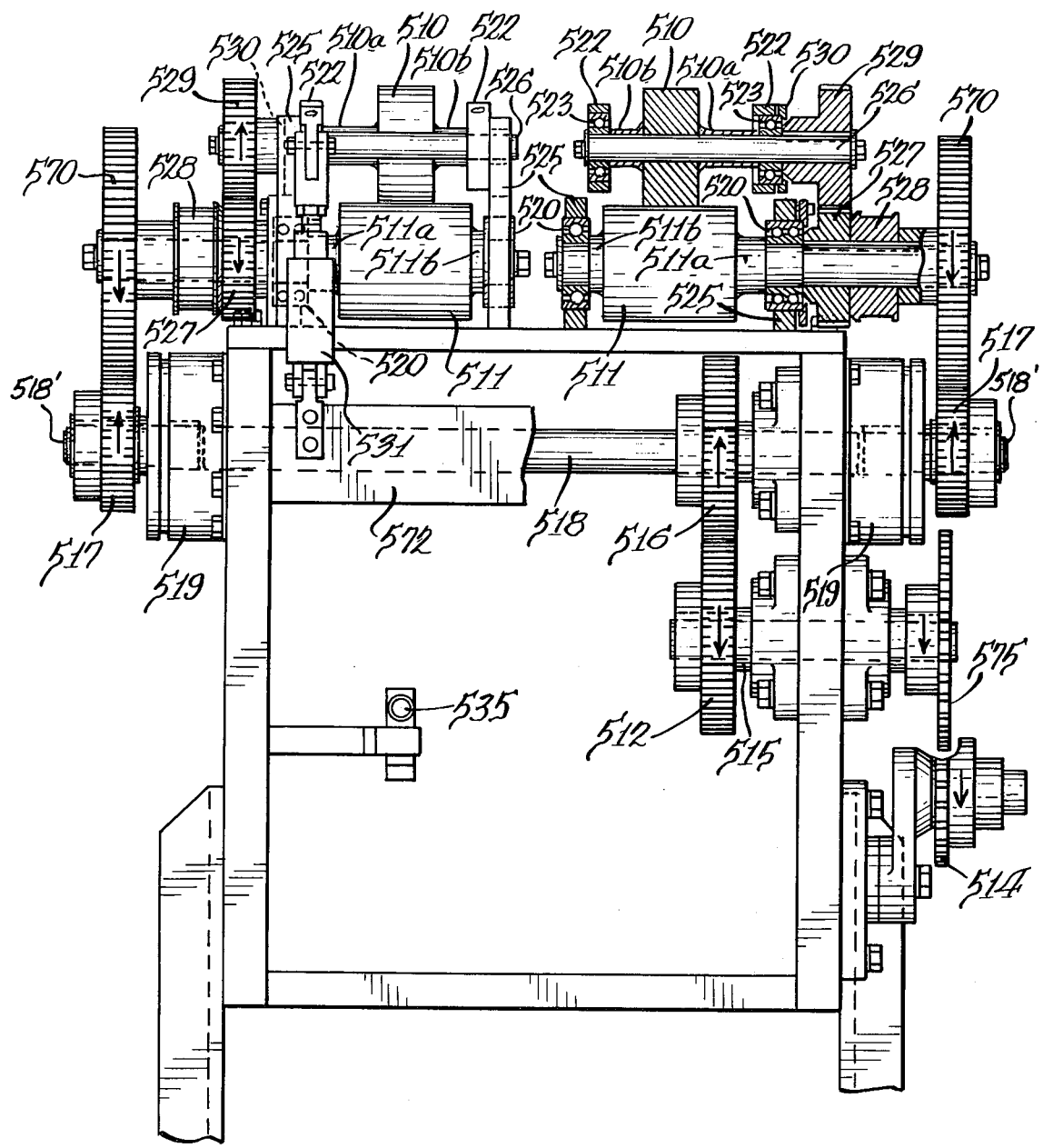

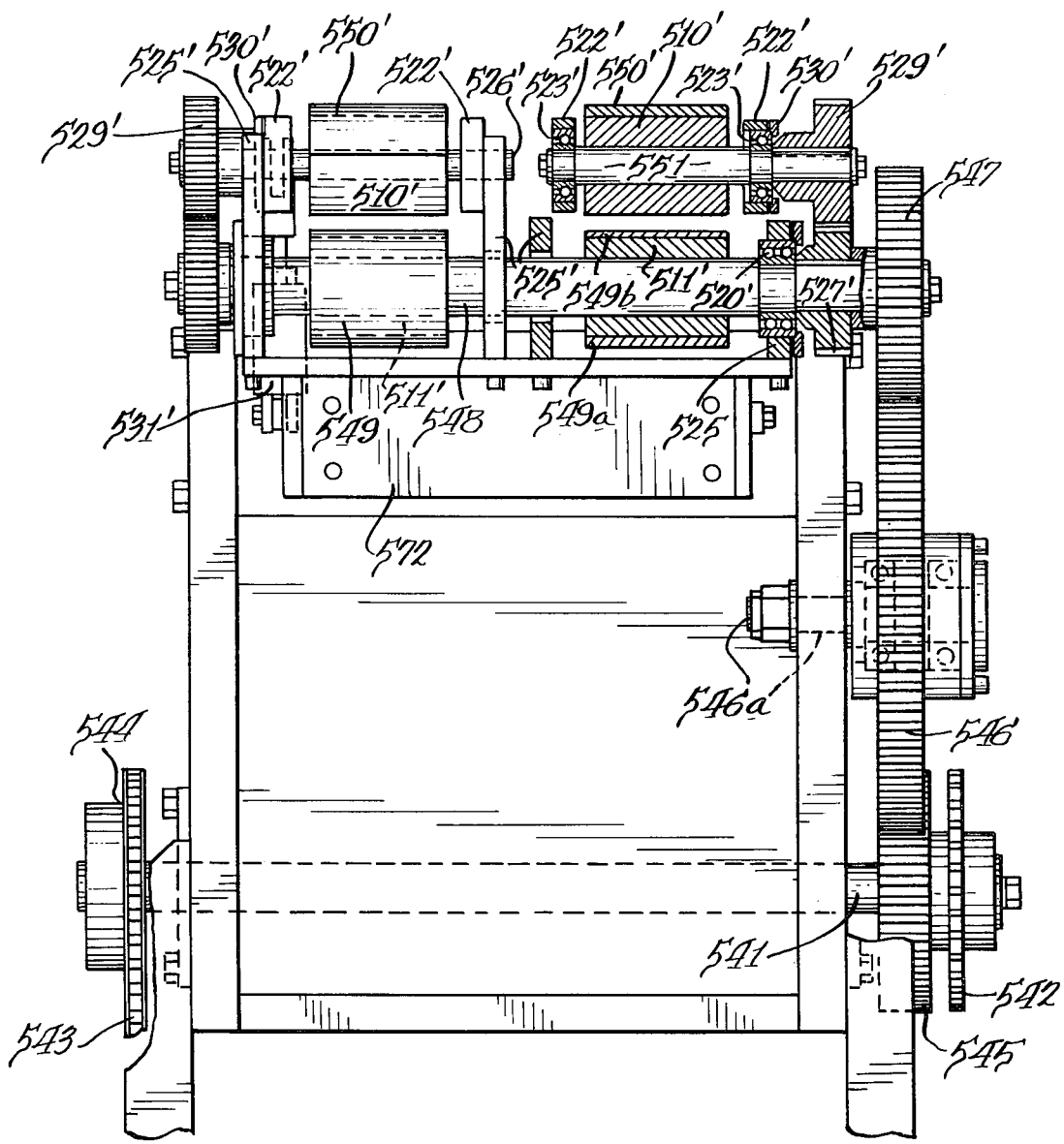

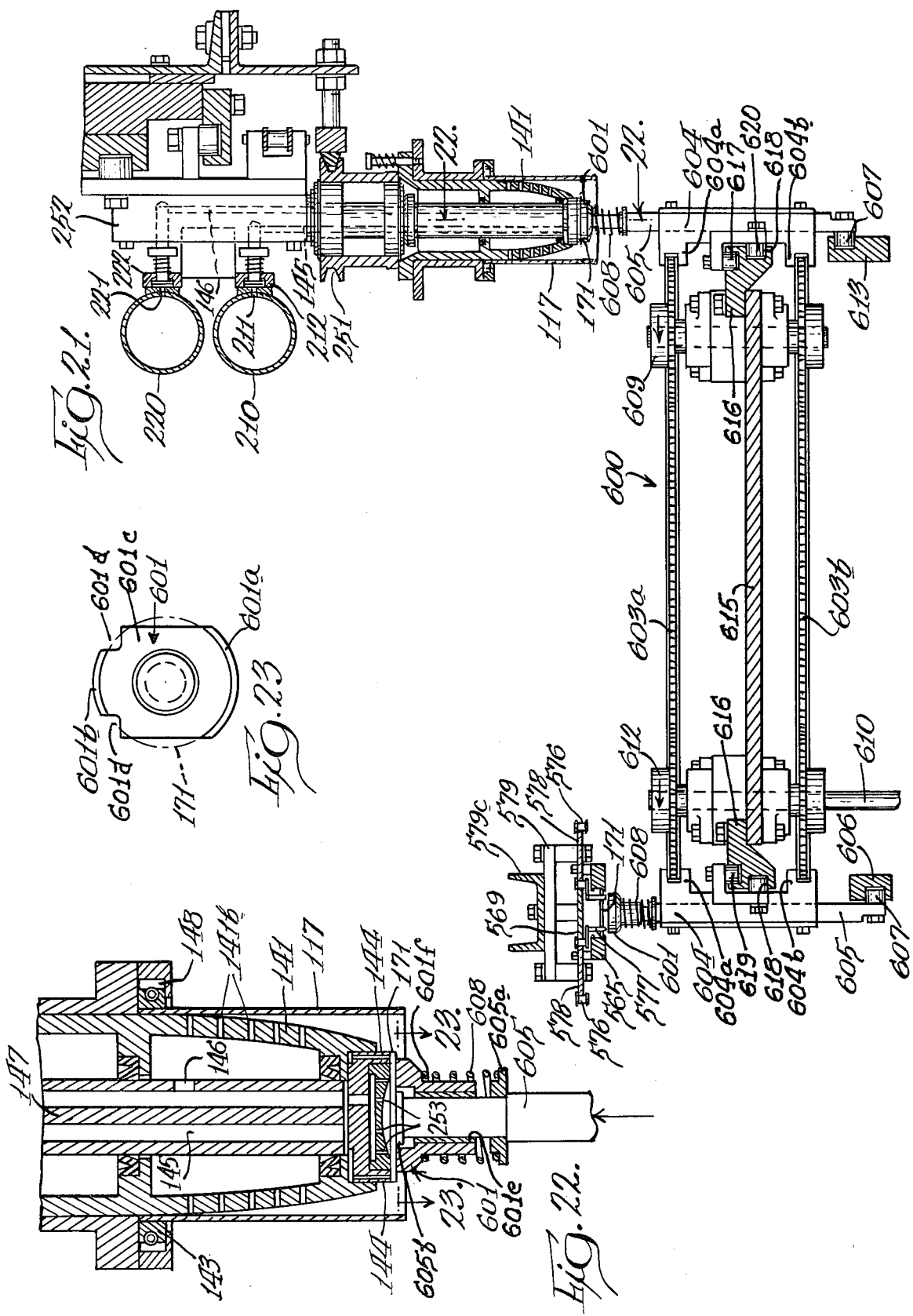

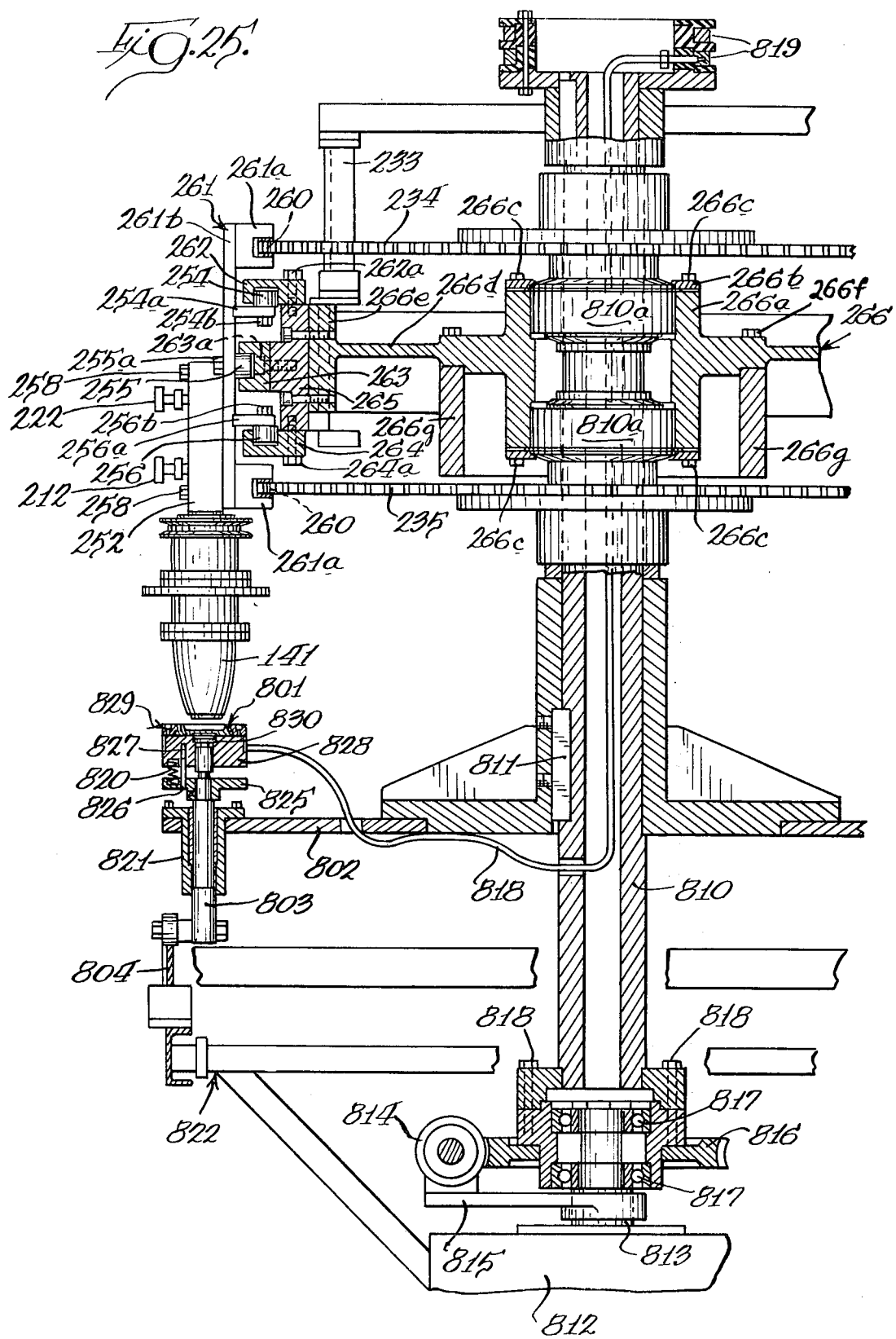

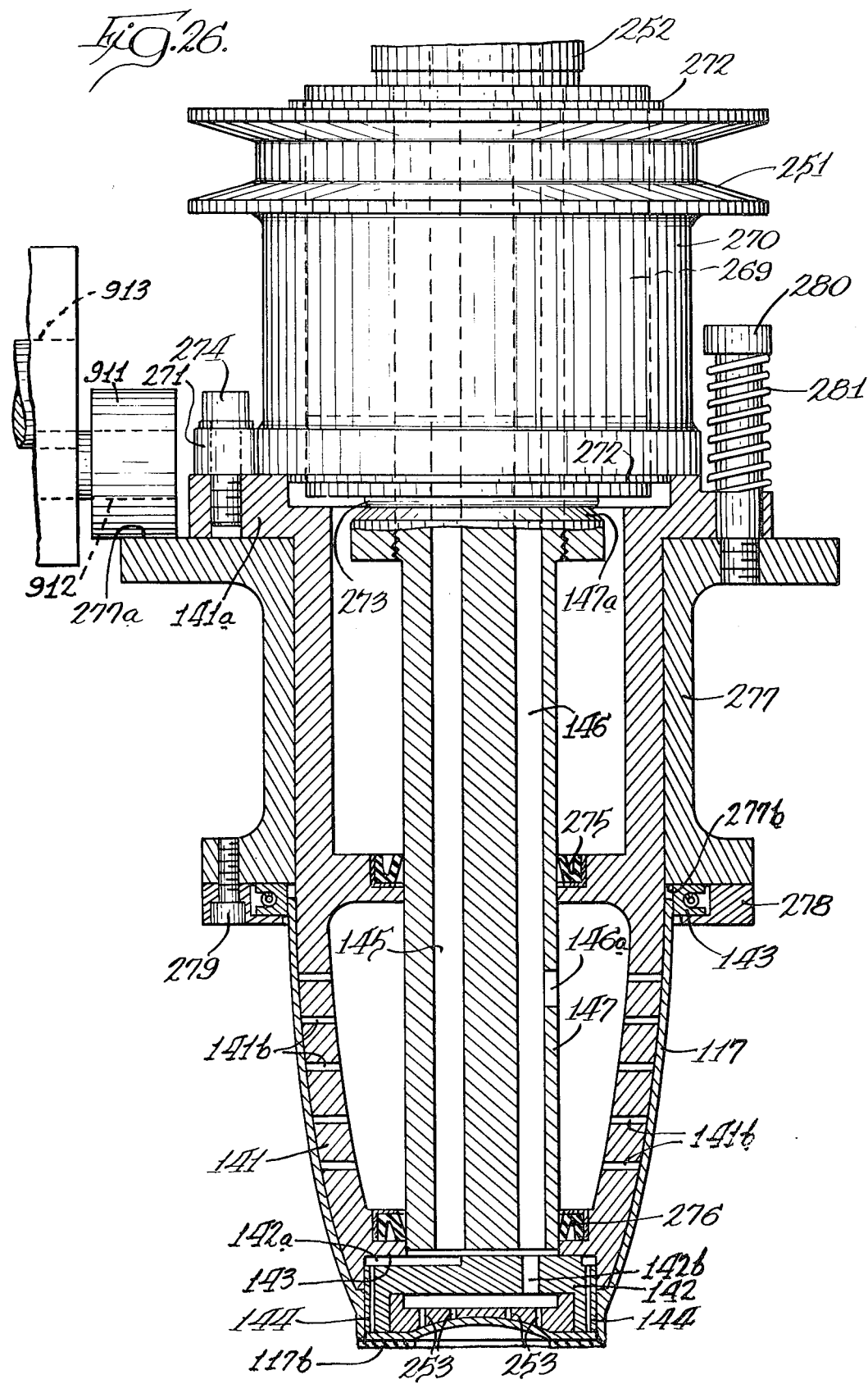

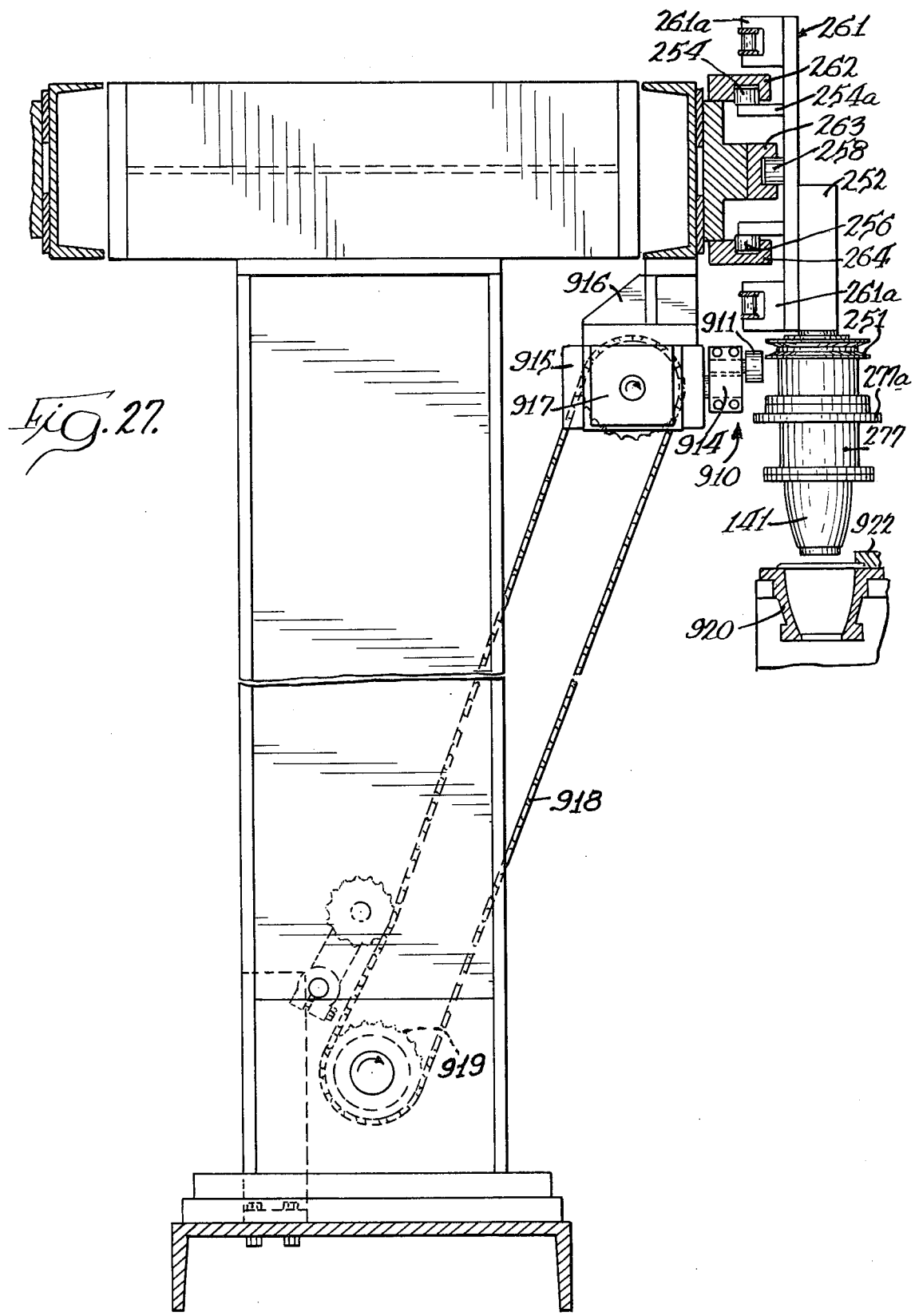

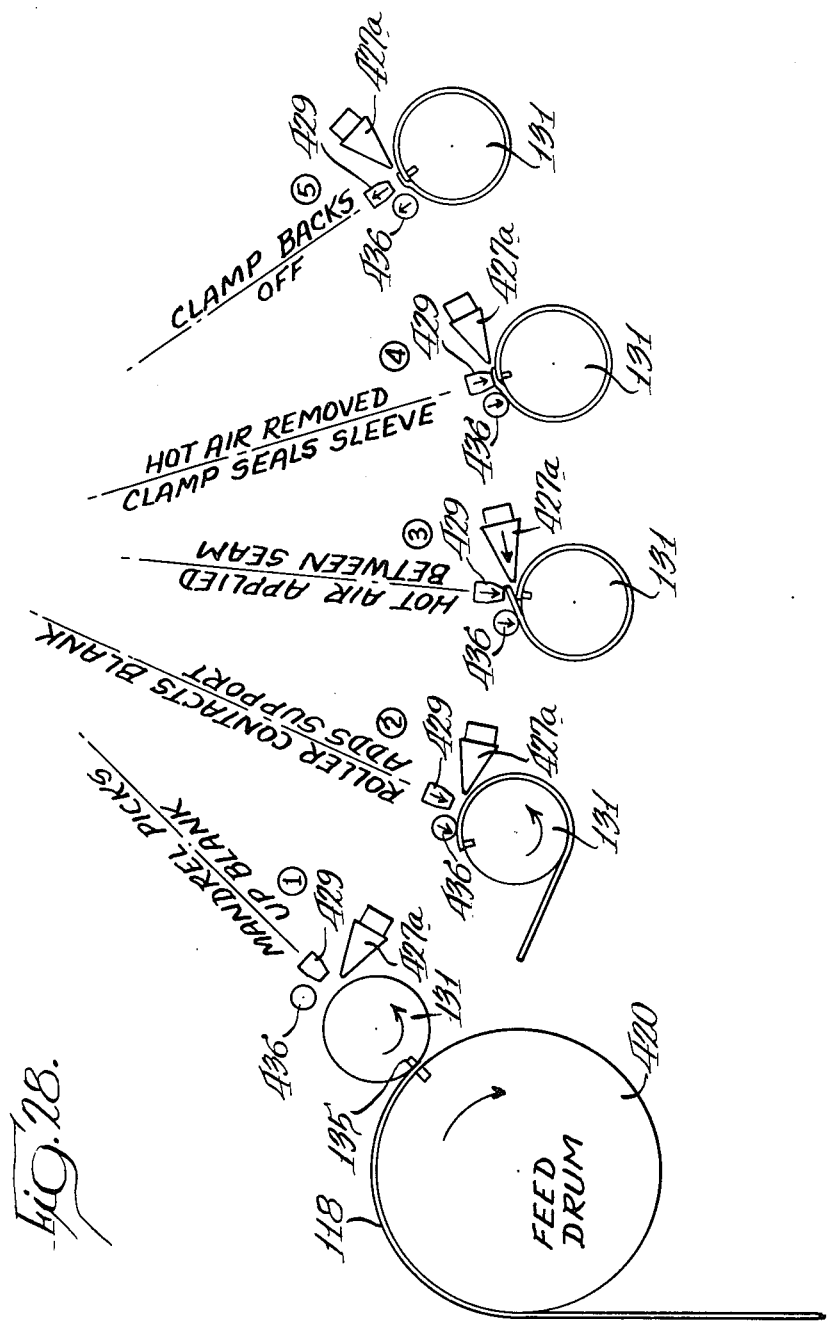

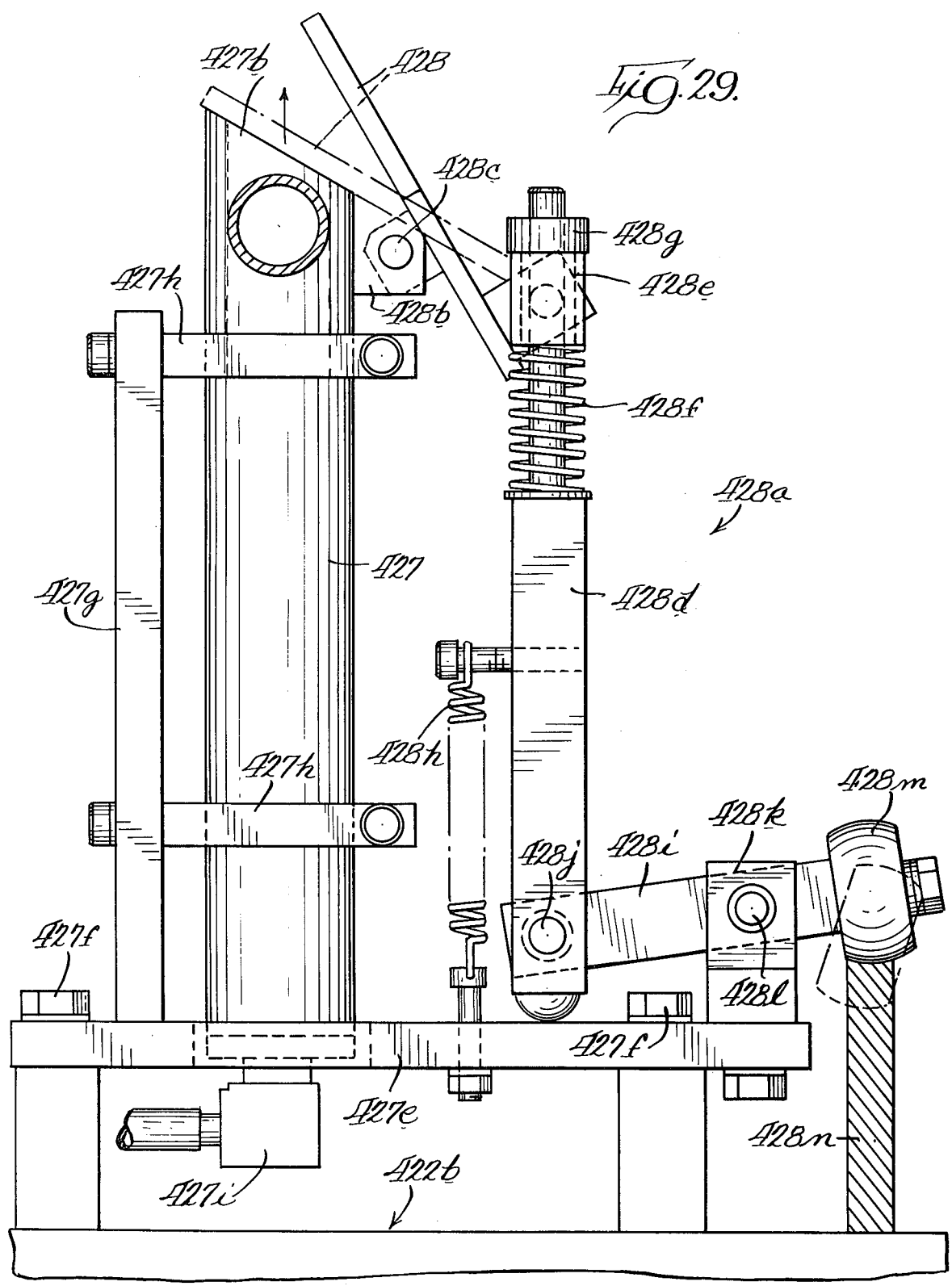

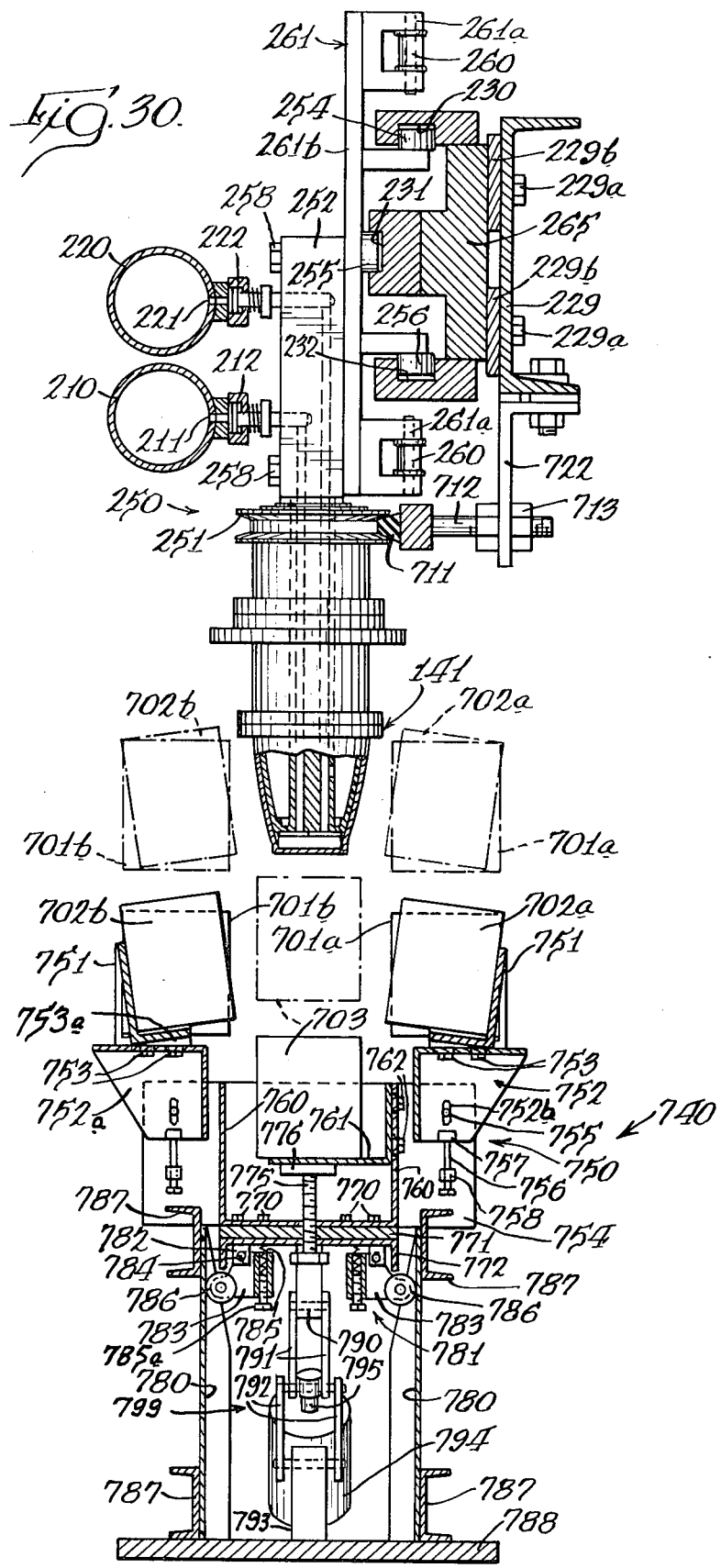

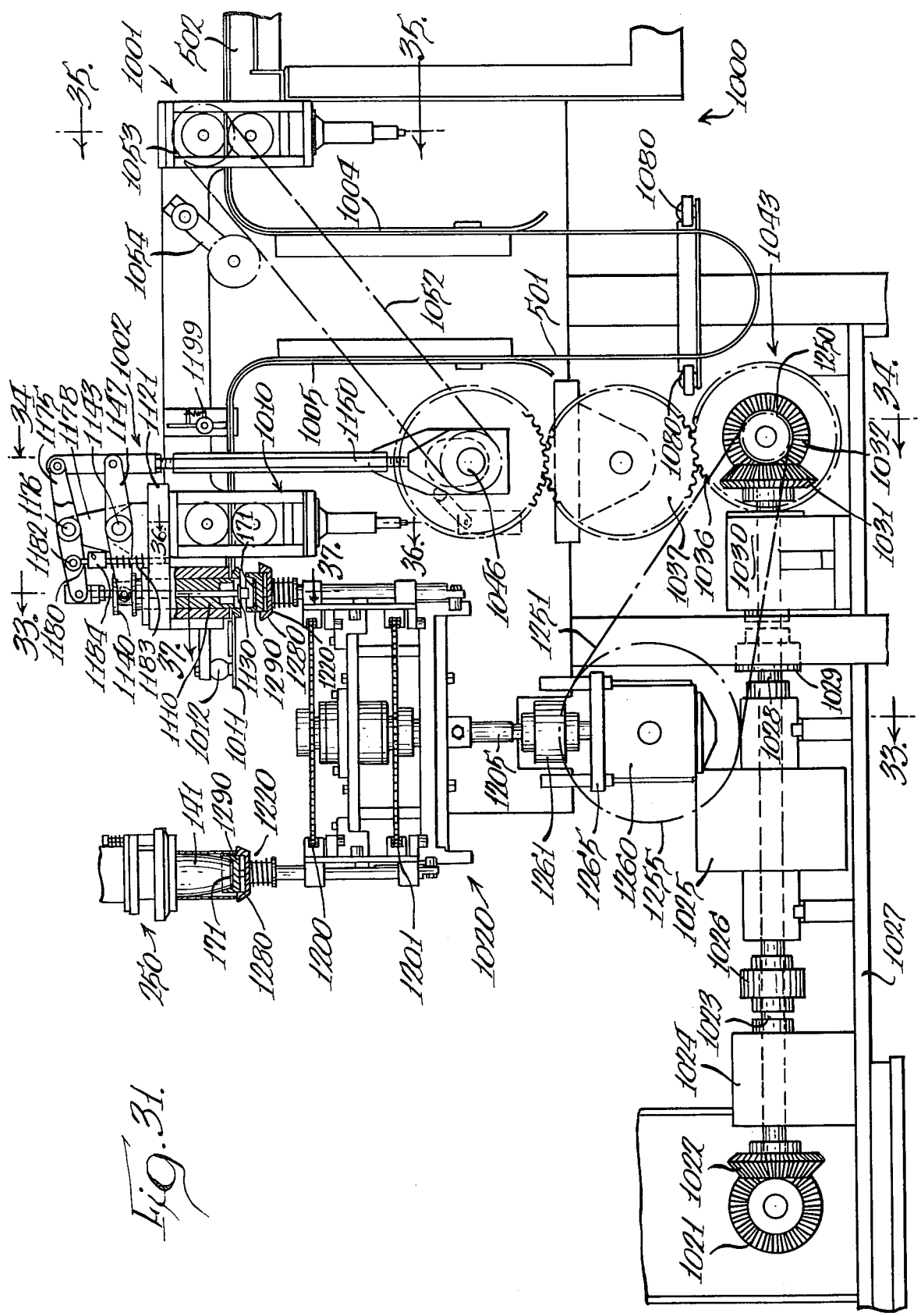

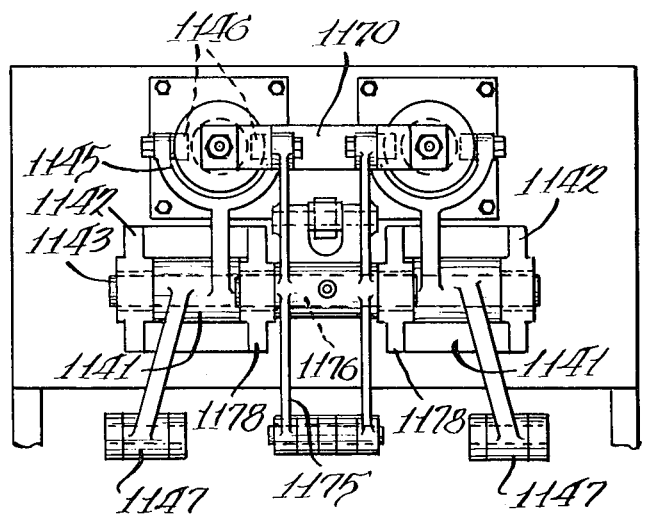
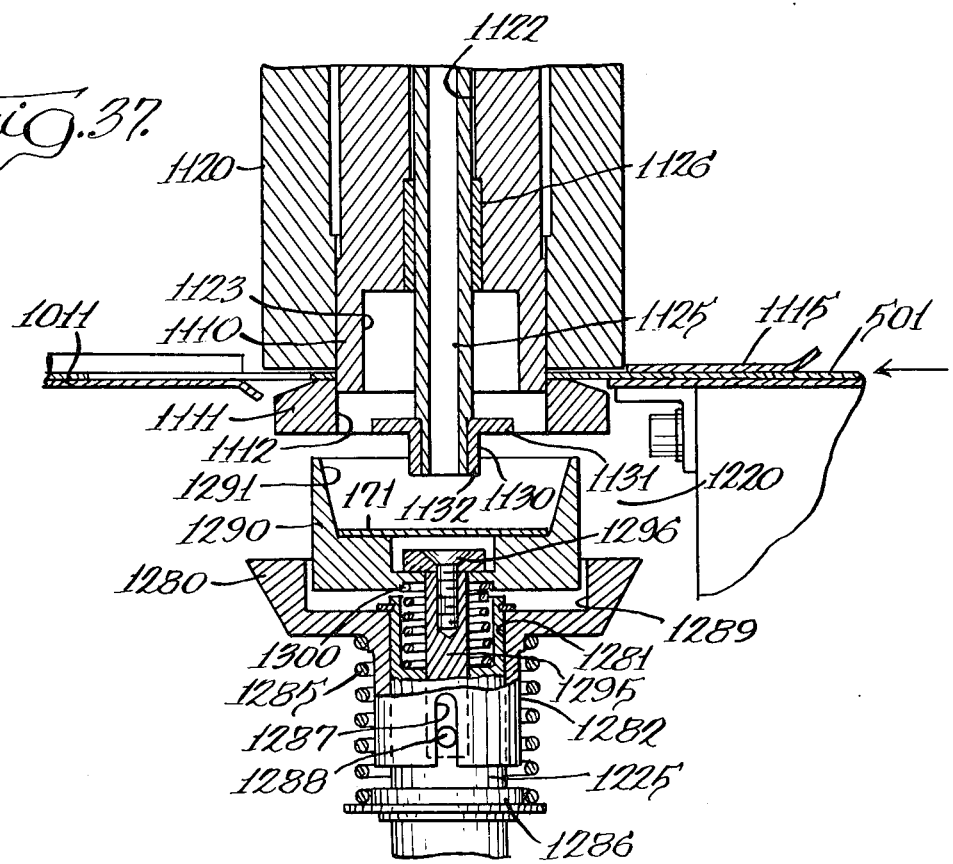

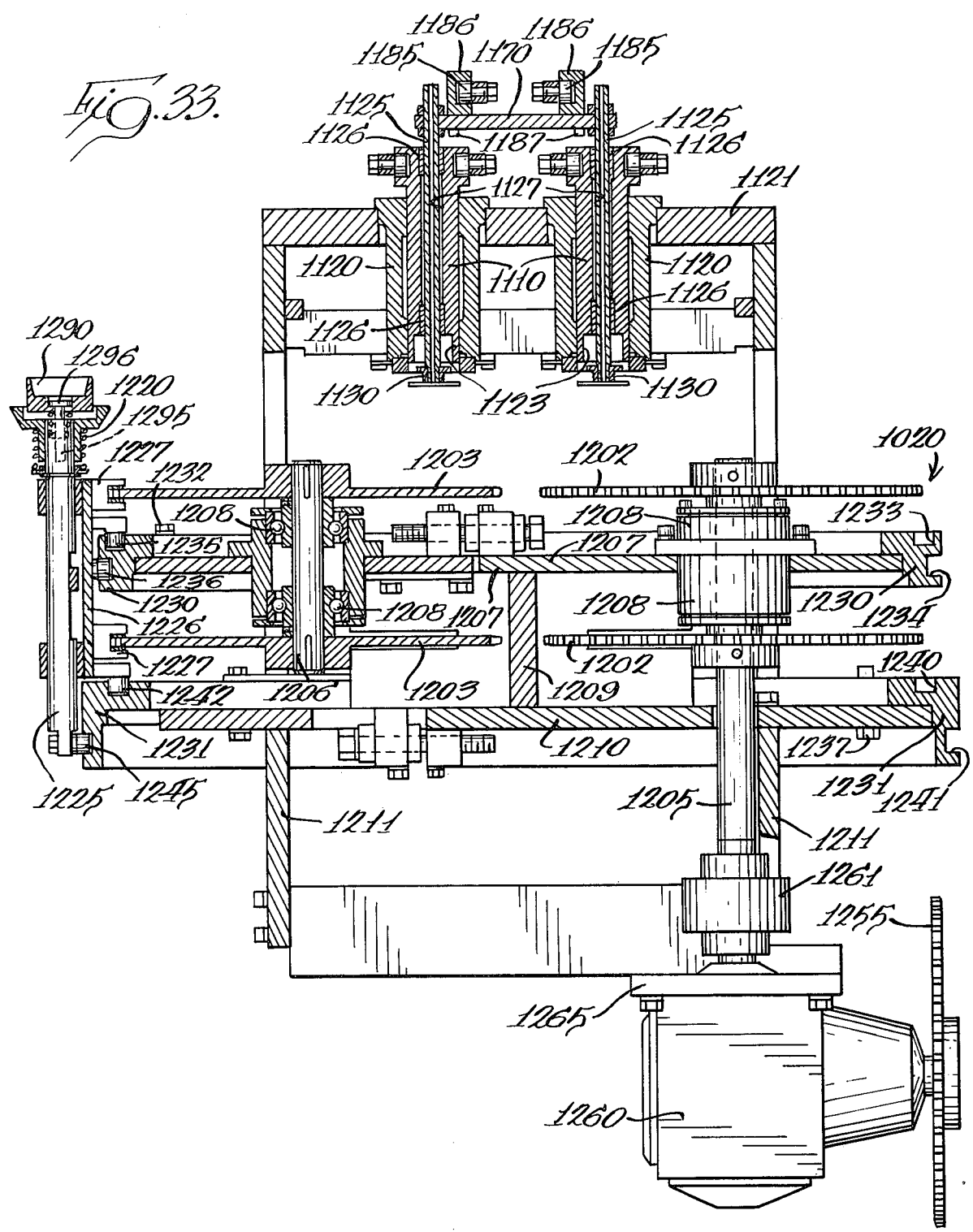

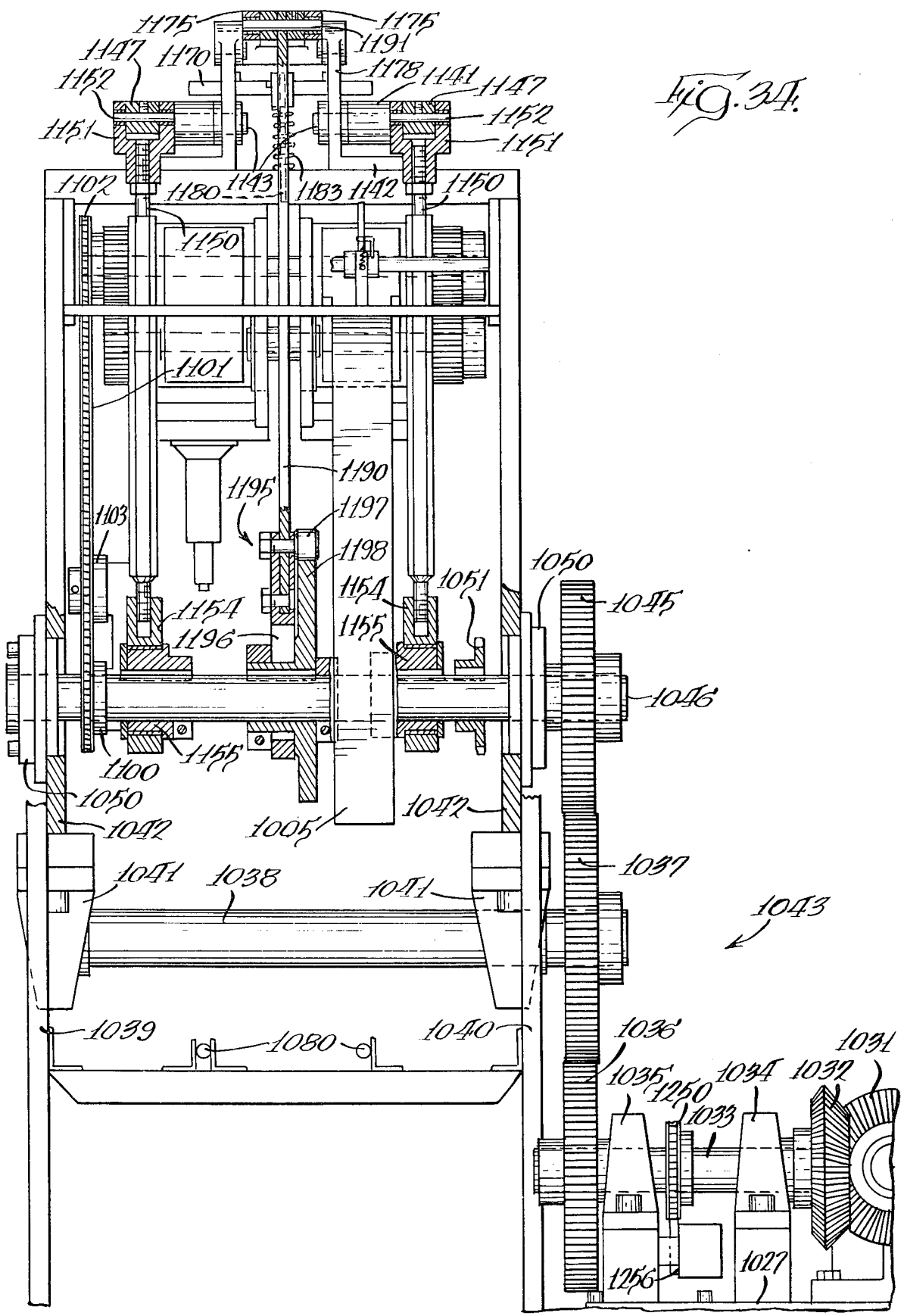

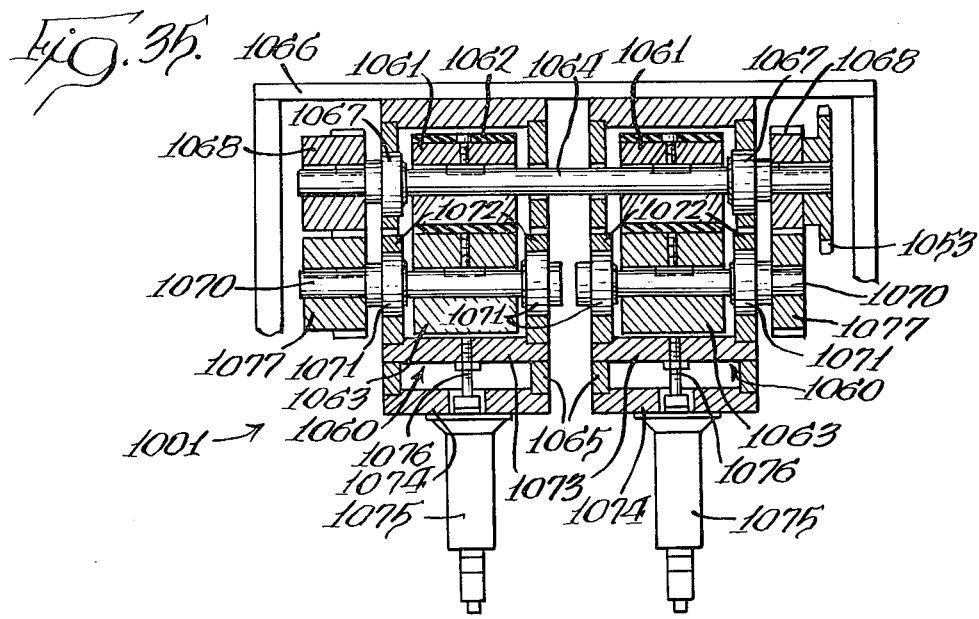
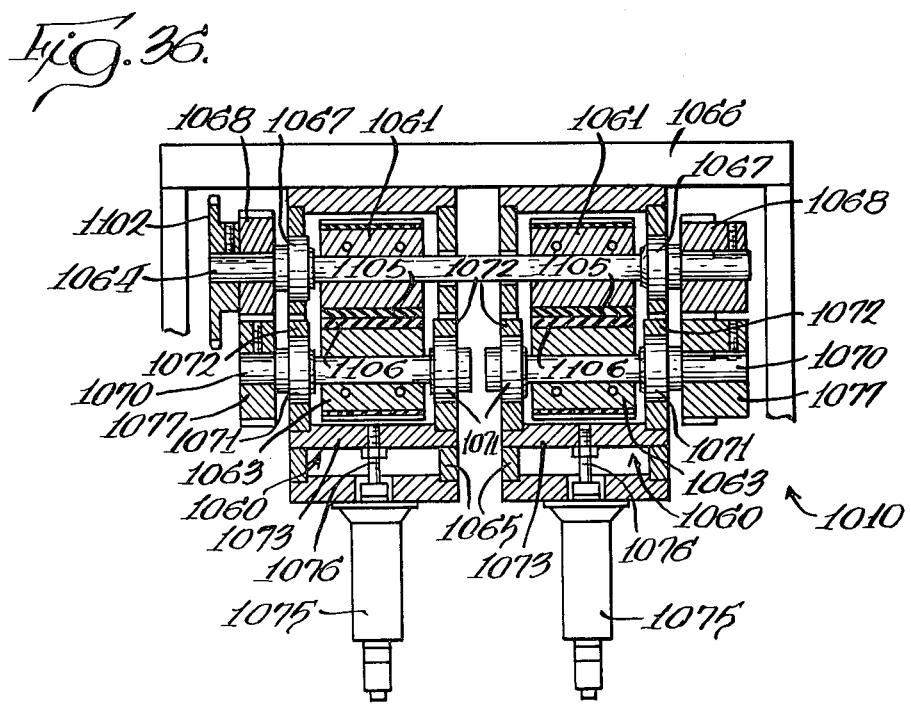

METHOD AND APPARATUS FOR FORMING THERMOPLASTIC CONTAINERS

CROSS-REFERENCE TO RELATED APPLICATION

This is a division of application Ser. No. 479,421, filed June 14, 1974 now U.S. Pat. No. 3,970,492 which is a continuation-in-part application of our application Ser. No. 354,305, filed Apr. 25, 1973, now abandoned which is a continuation-in-part application of application Ser. No. 211,259, filed Dec. 23, 1971 now U.S. Pat. No. 3,854,583.

BACKGROUND OF THE INVENTION

It has long been recognized that drinking cups and other nestable containers with superior properties, especially for the retention of hot beverages such as coffee, can be formed from expanded thermoplastic materials, the most popular of which has proven to be expanded polystyrene. A very popular cup of this type is a one-piece cup which is molded directly from expandable polystyrene beads in a steam chest. However, in forming cups in this manner, it has proven to be necessary, for purposes of imparting adequate strength, rigidity and liquid impermeability to the sidewall thereof, to construct such cups with a thick sidewall, at least in relationship to the sidewall thickness of other types of insulated cups. As a consequence of this added sidewall thickness, it is not possible to obtain as small a stacking height, or spacing, between like cups in a nested stack thereof, with the result that such cups require considerably more storage space than a comparable quantity of other types of nestable insulating cups. Another disadvantage of the so called steam chest molded cup is that, as an inherent consequence of its mode of manufacture, the external surface of its sidewall can only be decorated by post decorating or printing techniques which are slower and more expensive than the flexographic and other sheet printing techniques which may be used in decorating cups fabricated from pre-printed sheet. As a result, the vast majority of such steam chest molded cups which appear in the market place do not contain a decorated or printed outer surface.

Another known type of insulated or expanded thermoplastic drinking cup which has enjoyed some measure of commercial popularity is a two-piece cup such as that which is manufactured and marketed by the assignee of this application under the trademark "X-Fome" and which corresponds to the cup described in U.S. Pat. No. 3,468,467 which is assigned to the assignee of this application. The sidewall of such cup may be formed by conventional cup fabrication techniques from a crescent-shaped blank of an expanded plastic material which, in turn, is cut from a pre-printed sheet or web of indefinite length thereof. By controlling the density of such sheet, it is possible to fabricate a cup with adequate strength, rigidity and liquid impermeability and which, nonetheless, has a considerably thinner sidewall than a steam chest molded cup for superior stacking or nesting properties in relationship thereto. Also, the ease with which the exterior of the sidewall of such cups can be provided with attractive decoration by pre-decorating the sheet from which the sidewall blanks are formed, has made it possible for a substantial portion of such cups to be decorated in a way which has proven to be quite popular in the trade. One of the drawbacks of such a cup is its costliness, at least insofar as material costs are concerned, in relationship to the steam chest molded cup, due in part to the scrap which is inherently formed with a crescent shaped sidewall blank is cut from a sheet or web of normal character.

Yet another known type of insulated or expanded thermoplastic drinking cup which has also enjoyed some measure of commercial popularity is a one-piece, seamless deep drawn cup which is manufactured and marketed by the assignee of this application and which corresponds to the cup described in U.S. Pat. No. 3,666,162, issued May 30, 1972 (J. R. Tiffin et al). Such cups can, in somewhat higher densities than conventional steam chest molded cups, be formed to very close manufacturing tolerances and with very low stacking height, and because of these features, they have, in spite of somewhat more costliness than the steam chest molded cup and the twopiece cup described above, and in spite of the fact that they can only be decorated after forming, gained a substantial measure of popularity in the coin-operated beverage vending machine market.

SUMMARY OF THE INVENTION

As can be seen from the foregoing discussion, each of known types of insulated cups referred to therein has certain advantages which makes it well-suited for some uses, and certain limitations which makes it less well-suited than one of the other types for other uses. In accordance with the present invention, however, there is provided an insulating cup which combines a wide range of desirable properties, without offsetting limitations, and which is, therefore, well-suited for a wide range of applications for insulated cups. The sidewall of such cup can be formed from rectangular blanks, and therefore without the scrap and inherent expense involved in the severing of crescent-shaped sidewall blanks from a parent sheet or web, and the sidewall of such a cup may be relatively inexpensively provided with attractive, high quality decorative material. Additionally, such cup may be provided with relatively good stacking or nesting characteristics to minimize the required storage space which is important to the carryout beverage industry, which is the bulk user of these types of cups. It is also possible with close manufacturing tolerances, to provide the reliable denesting which is necessary in coin-operated vending machine utilization of cups. Relatively inexpensive high quality cups according to the present invention may readily be formed on a high production basis in either a one-piece version or a two-piece version.

The sidewall of either such version is formed from a web of polystyrene or other thermoplastic polymeric sheet material which has a substantial degree of orientation or heat-shrinkability in the machine direction, by severing rectangular sidewall blanks from such web, preferably after printing or other decorative material is applied to the web by flexographic or similar printing technique in a repeat pattern in registration with the blanks to be cut therefrom, by forming a cylindrical sleeve from each such blank with the machine direction of the parent web extending circumferentially thereof, including the forming of a liquid tight lapped seam between the ends of the sleeve, as by heat sealing, by placing the sleeve over a forming mandrel having an outer forming surface corresponding to the desired configuration of the inner surface of the sidewall of the nestable cup to be formed therefrom, by heating the sleeve while it is so positioned over the mandrel to cause it to heat shrink into conforming face-to-face contact with the forming surface of the mandrel, and by stripping the shrunken sleeve from the mandrel. A separate bottom closure may be affixed to a sidewall formed in this manner either while the sleeve is still in position on the mandrel, or after it is removed, by any of several known cup-manufacturing techniques. Alternatively, a one-piece cup may be formed by starting with a sleeve which is highly oriented in the circumferential direction and which exceeds the height of the forming mandrel over which it is to be telescoped by a distance on the order of one-half of the smaller diameter of such mandrel, with the sleeve being so telescoped over the mandrel that the excess portion of the sleeve extends beyond the smaller end of the mandrel. When such a sleeve is exposed to heat, the excess portion thereof will shrink to form an annular planar portion extending inwardly across the smaller end of the mandrel and a relatively small diameter tubulation extending longitudinally from the interior of such planar portion. By the application of opposed compressive forces to such tubulation whilt it is at elevated temperature, it can be caused to collapse and to fuse together to close the interior of the annular planar portion in a liquid-tight fashion.

The fabrication of either a two-piece cup or a one-piece cup according to the present invention is effective to provide a cup whose sidewall thickness increases from a lesser thickness at the location of greatest diameter to a greater thickness at a location of lesser diameter. This is especially desirable in that it provides adequate thickness in the lower portion of the cup to protect the hand of a user from the temperature of a hot beverage therein, while keeping the wall thin at the top of the container so that the bead or rim which is normally formed therein need not be excessively thick. This highly advantageous result is accomplished as a direct function of the method of the present invention, since the heat shrinkable sleeve that forms the cup sidewall shrinks to a greater degree adjacent to the bottom of the cup to thereby provide the desired increased thickness at the lower portion of the cup. Also, the degree of taper in the sidewall can readily be increased in the lower thicker regions to offset the adverse effect of a thicker sidewall on the stacking or nesting characteristics of like cups of this type.

The apparatus for fabricating two-piece cups in accordance with the method of the present invention includes a continuously moving main conveyor carrying a plurality of spaced mandrels having an external configuration corresponding to the internal contour of the cup. The main conveyor moves the mandrels along a closed path through a series of operational subassemblies which function in timed sequenced interrelationship to form the cup of the present invention.

The mandrels are preheated to an elevated temperature at a first working station to facilitate shrinkage of sleeve blanks. Individual rectangular blanks are cut from a continuous web of heat shrinkable thermoplastic material, formed in a cylindrical sleeve blank and telescoped on to the preheated mandrels. Bottom disc closures are simultaneously cut from two continuous webs of thermoplastic material, and serially delivered to the mandrels on which the sleeves have been positioned.

The mandrels then pass to a heat shrinking station, where the sleeves are heated, as by infrared radiation, to shrink the sleeves to conform to the external contour of the mandrels and to produce inwardly extending portions at their lower ends that overlap the bottom closure discs. The discs are also, at least partially, formed to the bottom contour of the mandrels by the heat and by the provision of internal vacuum ports in the mandrels which cause the discs to conform to the mandrels bottom surface. The mandrels then pass to a bottom sealing station where the overlapping sleeve portions are fused to the bottom closure discs.

The cups are then removed from the main conveyor to a rimming conveyor and the mandrels commence a new cycle by passing through the preheat subassembly. The removed cups are carried by the rimming conveyor to a rimming mechanism which forms a rim at the lips of the cups and then to an ejection station where the completed cups are removed for packaging.

With the process and apparatus of the present invention, cups having exceptional insulating properties can be fabricated at a relatively low cost. Because the operation of the machine is continuous in nature, it is extremely smooth in operation, and achieves a much higher production rate than has been possible in the past with known apparatus for fabrication of nestable cups.

Accordingly, it is a feature of the present invention to provide a novel method of fabricating the sidewall of an insulated nestable cup or similar container.

It is also a feature of the present invention to provide a method and apparatus for thermally fabricating the sidewall of a nestable cup or similar container from a rectangular blank of thermoplastic material and without the need for wasting a portion of the material in such blank; and, more particularly, it is a feature of the present invention to provide a method and apparatus for thermally fabricating the sidewall of such a cup or container from a rectangular blank of an expanded thermoplastic material to impart good insulating properties to such sidewall.

More particularly, it is a feature of the present invention to provide methods and apparatus of producing one-piece and two-piece externally decorated insulated cups with good stacking characteristics and on an economical basis.

BRIEF DESCRIPTION OF THE DRAWINGS

FIGS. 4-8 are schematic views illustrating sequential steps in the fabricating of a two-piece container of the type shown in FIG. 1 from a blank of the type shown in FIG. 3;

FIG. 11 is a schematic representation of an exemplary form of apparatus in accordance with the present invention;

FIG. 12 is a cross-sectional view taken substantially along the plane 12—12 of FIG. 11 illustrating the mandrel pre-heat station;

FIG. 13 is a plan view, partially in crosssection, of a sleeve forming apparatus;

FIGS. 13a and 13b are schematic views illustrating sequential steps in the operation of the sleeve forming apparatus;

FIG. 15 is a plan view of the bottom disc cutting and bottom transfer conveyor systems, with certain portions broken away and others shown in cross-section;

FIG. 16 is a cross-sectional view, taken generally along plane 16—16 of FIG. 15, with certain portions broken away, and illustrating the bottom punch machine and stock feeder;

FIG. 17 is a cross-sectional view taken generally along plane 17—17 of FIG. 16;

FIG. 18 is an enlarged cross-sectional elevation view taken generally along plane 18—18 of FIG. 17;

FIG. 19 is a cross-sectional elevation view, taken generally along plane 19—19 of FIG. 16 and illustrating a portion of the bottom stock feed system;

FIG. 20 is a cross-sectional elevation view, taken generally along plane 20—20 of FIG. 16, and illustating a further portion of the bottom stock feed system;

FIG. 21 is a cross-sectional elevation view, taken generally along plane 21—21 of FIG. 15, and showing the relationship between the bottom disc transfer conveyor and the main conveyor mandrel;

FIG. 22 is an enlarged cross-sectional elevation view taken generally along plane 22—22 of FIG. 21;

FIG. 23 is a plan view of the bottom disc carrier taken generally along plane 23—23 of FIG. 22;

FIG. 25 is a cross-sectional view, taken generally along plane 25—25 of FIG. 11, and illustrating the bottom sealing turret used in forming a two-piece thermoplastic cup;

FIG. 26 is an enlarged cross-sectional view of a forming mandrel;

FIG. 27 is an enlarged cross-sectional view of a cup ejection mechanism and rimming apparatus;

FIG. 28 is a schematic view illustrating sequential steps in the fabricating of a cylindrical sleeve blank;

FIG. 29 is a sectional view illustrating the hot air flow control assembly;

FIG. 30 is a cross-sectional view of the shrink tunnel taken generally along plane 30—30 of FIG. 11;

FIG. 31 is a side elevational view, with certain elements in cross-section for clarity of illustration, showing a second embodiment of the bottom stock feeder, punch mechanism and disc transfer conveyor;

FIG. 32 is a top plan view of the punch mechanism rocker arm assembly in FIG. 31;

FIG. 33 is an enlarged cross-sectional view taken generally along line 33—33 in FIG. 31;

FIG. 34 is an enlarged cross-sectional view taken generally along line 34—34 in FIG. 31;

FIG. 35 is an enlarged cross-sectional view taken generally along line 35—35 in FIG. 31 and illustrating the bottom stock pull rollers;

FIG. 36 is a cross-sectional view taken generally along line 36—36 in FIG. 31 and illustrating the bottom stock feed rollers;

FIG. 37 is an enlarged cross-sectional view taken generally along line 37—37 in FIG. 31;

DETAILED DESCRIPTION OF THE INVENTION

Figure 1:
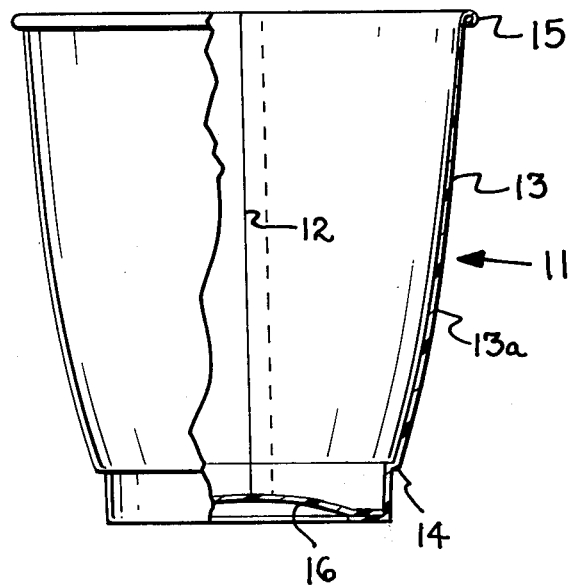
FIG. 1 is an elevational view, partly in section, of a nestable insulated container in accordance with the present invention.

While this invention is susceptible of embodiment in many different forms, there is shown in the drawings and will herein be described in detail only preferred embodiments of exemplary apparatuses and methods for fabricating the same containers in accordance with the present invention and with the understanding that the present disclosure is to be considered as an exemplification of the principles of the invention and is not intended to limit the invention to the specific embodiments illustrated and described. The scope of the invention will be pointed out in the appended claims.

Figure 2:
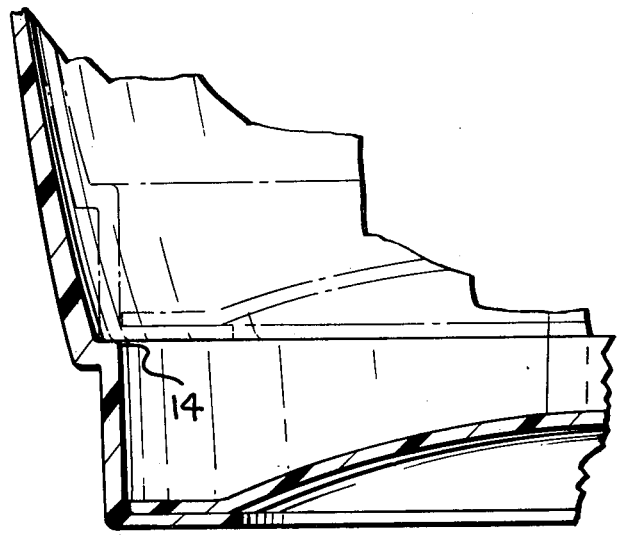
FIG. 2 is a fragmentary sectional view, at an enlarged scale, of a cup in accordance with FIG. 1, showing a like cup in phantom to illustrate the stacking relationship therebetween.

While nestable insulated cups in accordance with the present invention can be constructed in a wide variety of configurations, the presently preferred embodiment of such cup, as is shown generally by reference character 11 in FIGS. 1 and 2, comprises a two-piece cup. Cup 11 is formed, as will be hereinafter described more fully, by heat shrinking an open-ended cylindrical sleeve about a forming mandrel which has an outer forming surface corresponding to the desired contour of the inside surface of the sidewall of the cup, the sleeve having a relatively high degree of orientation in the direction extending circumferentially thereof. Such a sleeve is formed, in accordance with the preferred embodiment of the method and apparatus of the present invention and as will be hereinafter described more fully, by heat sealing or otherwise joining the opposed lapped ends of a rectangular blank of suitable material in a vertically extending liquid tight seam, and as a consequence of such method of forming, cup 11 will have a visible, vertically extending side seam 12 in the sidewall of the cup, which sidewall is identified by reference character 13.

Sidewall 13 of cup 11 has a major uninterrupted portion 13a, shown as extending from the top of the cup to an inwardly extending stacking shoulder 14 which is located near the bottom of the cup, and which is provided to receive the bottom of a like cup inserted therein to provide a positive minimum spacing between nested or stacked cups, as is shown in FIG. 2 and as is well understood in the art. Of course, as is also well understood in the art, equivalent stacking means could be provided in the sidewall of the cup at a relatively higher elevation in the sidewall, in which case the major portion of the sidewall would be located below the stacking means. In either such event, because of the heat shrinking step involved in the manufacture thereof, the thickness of the sidewall of the container decreases as the diameter of the cup increases, and adequate thickness may be provided in the region of the sidewall which is normally grasped by the hand of a user to protect or insulate the hand from the heat of a hot beverage such as coffee. At the same time, it is possible to maintain the thickness in the region of the top of the cup at a low enough value to form a thin tight bead, shown as 15 in FIG. 1, surrounding the mouth of the container. Because close nesting of like cups is adversely affected by increased wall thickness, the major portion 13a of the sidewall of cup 11 is shown as increasing in taper, as measured by the included acute angle between the longitudinal central axis of the cup and a line tangent to the sidewall thereof, as the cup diameter decreases and the wall thickness increases, it being noted that increasing wall taper improves close nesting, as is understood in the art.

The bottom or smaller end of cup 11 is shown as being closed by a generally horizontally extending bottom member 16 which is joined to a sidewall portion 13 in a liquid-tight fashion. In the illustrated embodiment, such bottom member is formed from a disc-like element of a thermoplastic material sealable to and compatible with the material of the sidewall, e.g. the same material as the sidewall. This bottom member is joined in a liquid-tight fashion to an inturned portion of the sidewall of the cup, as by heat-sealing or with an adhesive, as hereinafter described. However, it is also contemplated that such bottom member may be formed integrally with the sidewall of the cup, as is also hereinafter described.

Figure 3:
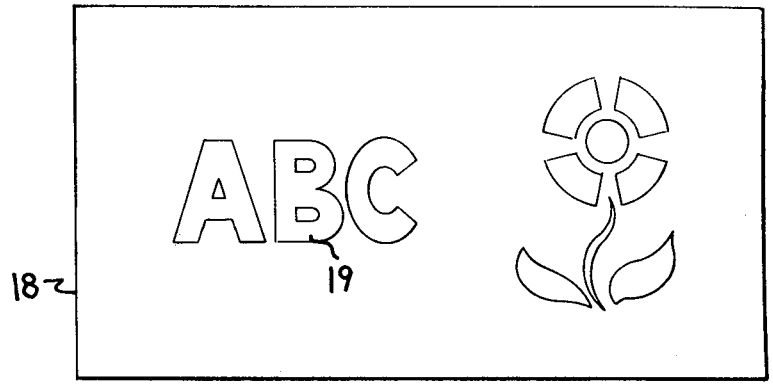
FIG. 3 is a plan view of a rectangular blank from which a cup of the type shown in FIG. 1 can be fabricated.

The sleeve from which a cup of the type shown in FIG. 1 may be formed, which is designated by numeral 17 in FIG. 6, is formed from a rectangular sheet or blank of an expanded plastic material, such as expanded polystyrene, such blank being designated by numeral 18 in FIG. 3. The blank is formed by severing from a parent web or sheet of appropriate material, preferably a web of indefinite length of such material which is highly mono-axially oriented in the longitudinal direction. Such a web may be produced, in turn, by slitting a seamless extruded tube of appropriate thermoplastic material along one or more longitudinally extending lines which, if there are more than one, extend parallel to one another. The requisite orientation in the machine direction may readily be imparted to such web, or webs, by engaging the extruded tube while it is at a suitable orientation temperature between opposed counterrotating rolls which are driven at peripheral speeds substantially in excess of the lineal speed of the thermoplastic material leaving the extruder, all as is well understood in the art.

In practice, it is normally desired that blank 18 be provided with printing or other decorative material on the surface which is destined to be the outer surface of the finished cup. For simplicity, decorative material is shown only in FIG. 3 where it is identified by reference character 19, it being understood that it will also be present in other views of the blank, or of the sleeve or cup which are sequentially formed therefrom.

This decorative material may be rapidly and relatively inexpensively applied, in multiple colors if desired, by applying it in a repeat pattern to the parent web before the individual blanks are severed therefrom, as by means of known printing devices such as a flexographic printing press or an offset rotary letter press, all as is well understood in the art. It is to be noted that, because of the differential contraction of the material involved in shrinking a cylindrical sleeve into the form of the sidewall of a nestable cup, the printing should be applied to the web in a form which is distorted from its desired form, so that upon such differential contraction, the printing will change in form into its desired form.

Figure 4:
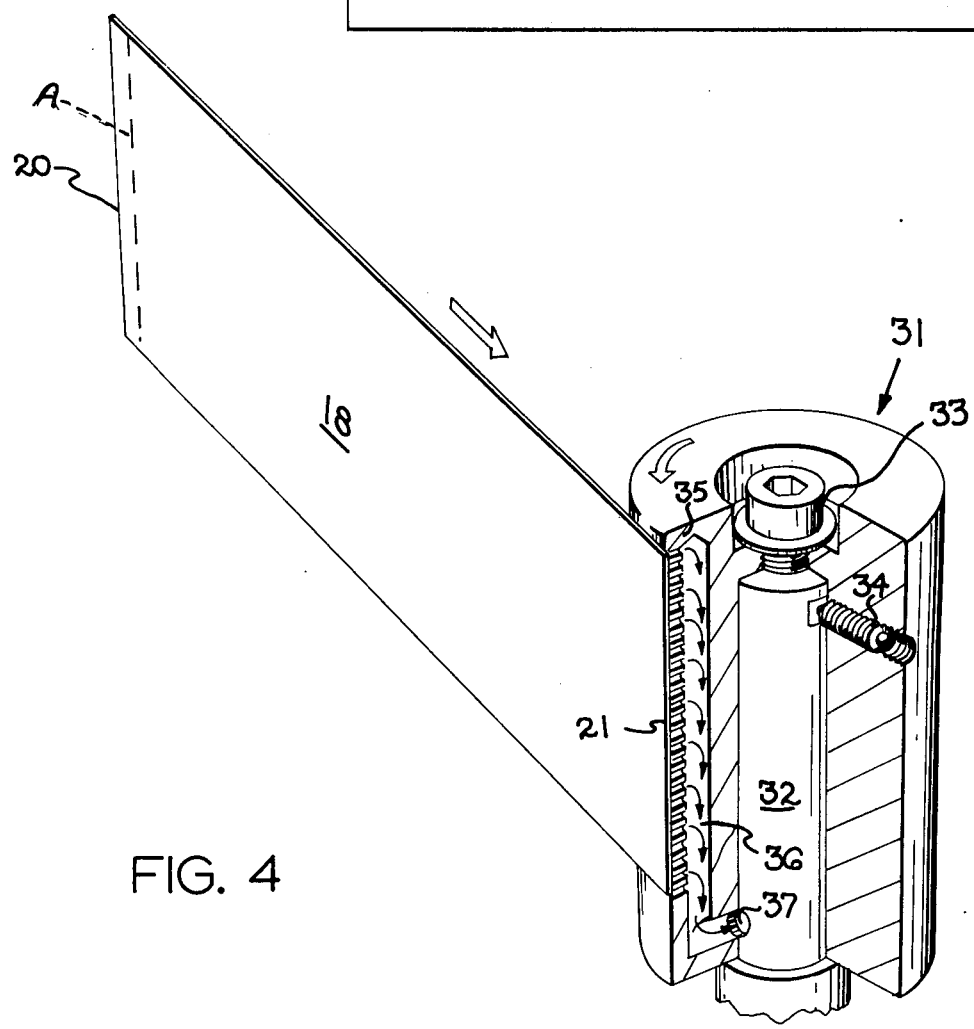
Figure 5:
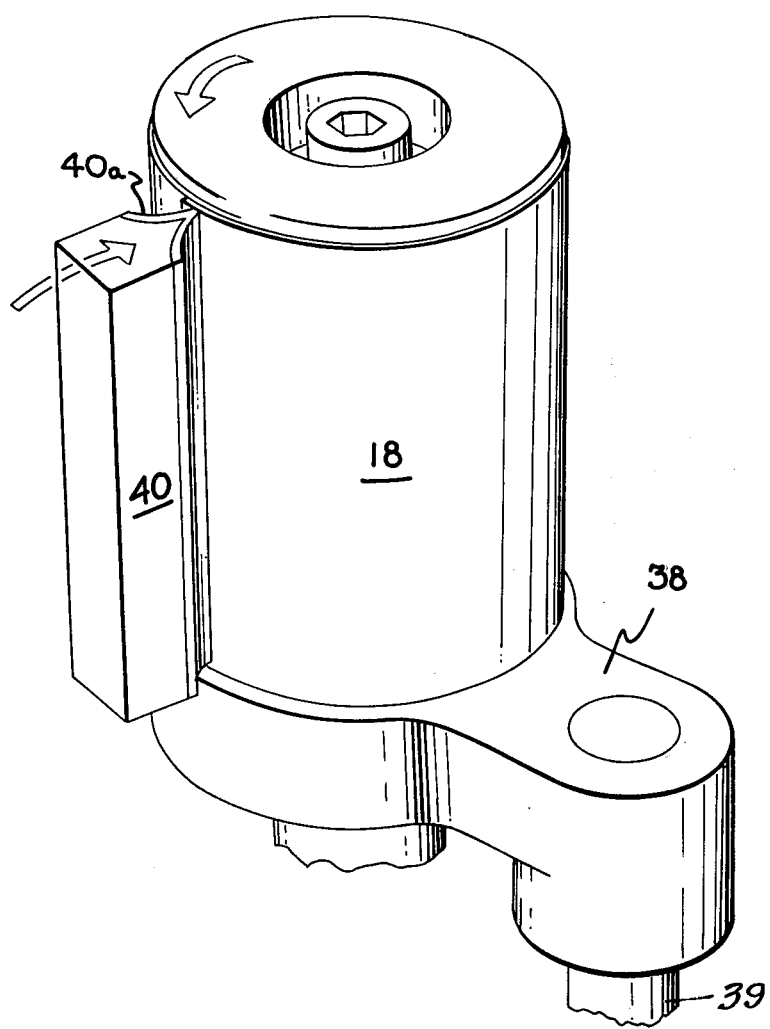

The fabrication of sleeves such as that identified by numeral 17 in FIG. 6 from blanks such as that identified by numeral 18 in FIG. 3 is illustrated in FIGS. 4 and 5. Individual blanks 18 are fed to a rotary mandrel head 31. Mandrel 31 is mounted on shaft 32 and held by collar 33 and set screw 34. Shaft 32 is rotated under power. The blank 18 is held to the mandrel by the vertical row of vacuum ports 35 connected to vertical passage 36 and through radial port 37 into the hollow center passage of shaft 32. The mandrel 31 is concentric with a stripper sleeve 38 carried on a bracket and vertical spindle 39 (FIG. 5). Blank 18 is attached at the leading edge 21 to mandrel 31 by vacuum, and as the mandrel rotates, blank 18 is wrapped around the surface of the cylinder, which is the outer surface of the mandrel 31 to form sleeve 17. The stripper sleeve 38 is in its lowered position out of interference with sleeve 17. The mandrel is the desired size (diameter) in relation to the cup forming mandrel that is to receive the sleeve when finished, as hereinafter described As the mandrel 31 completes a revolution, the trailing edge of the blank overlaps the leading edge to form a lap seam for the cylinder. The seam is made by heat and some pressure in bonding the overlapped regions of plastic together, in a liquid-tight seam extending the full height of the sleeve accomplished by bringing heater 40 into contact with these overlapped areas of the sleeve 17. Heater 40 has a surface layer 40a of Teflon material to prevent sticking of the heater nose on the sleeve. Heater 40 is pressed against the overlapped plastic sheet and the combined heat and pressure of heater 40 irons the lap seam into substantially less than the double thickness of the overlap. This forms a feathered edge compatible with the thickness of the remainder of sleeve 17. Heater 40 is on an appropriate carriage to be brought into and out of contact with the sleeve at the proper time and rotation of mandrel 31 during pressure contact of heater 40 as it irons the seam of sleeve 17.

As an alternative, the lap-seam may be made with a hot melt adhesive applied to the inner surface of the blank 18, such as in the area between edge 20 (FIG. 4) and phantom line A. Heater 40 will activate the adhesive area and form an adhesive bond between the overlapped ends of the material on mandrel 31.

To fabricate a two-piece cup from a sleeve 17, produced as has heretofore been described, there is provided a forming mandrel shown generally at 41 in FIG. 6. Mandrel 41 has an exterior surface 41a which is contoured to correspond to the desired contour of the interior surface of the cup 11 which is to be formed therefrom, or at least the sidewall portion, and the mandrel is suspended from a support member 42. A sleeve 17 which is to be formed on mandrel 41 is telescoped thereover with the upper end of sleeve 17 being held in a position aligned with the maximum dimension of forming surface 41a by means of an expansible clamping ring 43. Clamping ring 43 comprises a series of arcuate sleeve contacting segments extending inwardly from an O-shaped spring, and clearance is provided between the clamping ring and the surrounding structure to provide for radial expansion of the ring to accommodate the insertion of the end of a sleeve between the inner ends of such segments and the terminal portion of the forming surface 41a of mandrel 41. Clamping ring 43 is retained in a fixed position relative to the axis of mandrel 41 in a cavity 48 of support member, to the bottom of which is attached a removable flange 49 on which clamping ring 43 slidably rests.

As is shown in FIG. 7, when sleeve 17 is positioned over the forming surface 41a of mandrel 41, the so positioned elements are exposed to a source of heat, as by advancing them in unison into a region, exposed to infra-red heating elements 51, 52 and 53, elements 51 and 52 being directed against opposed sides of mandrel 41 and element 53 being directed against the bottom thereof. For purposes of illustration, elements 51–53 may be considered to be electric elements of the type manufactured by Irex Corporation of Riverdale, New Jersey and sold as Radplane radiant process heaters. As an alternative to heating by way of infra-red elements, it is also contemplated that the so positioned sleeve and mandrel could be heated by advancing them through a tunnel through which heated air is circulated. However, infra-red heating has been found to be more controllable and, because of the penetrative effect of the infra-red radiation, somewhat faster than forced convection heating. In any event, the application of heat will cause the portion 17a of sleeve 17 which overlies the side portion of the surface 41a to shrink into tight conforming relationship therewith.

To avoid chilling of the interior surface of the sleeve during shrinking which would, of course, inhibit shrinking, it has been found desirable that the mandrel be at an elevated temperature during the shrinking step, but not at a temperature higher than the softening point of the thermoplastic material from which the sleeve is formed. With sleeves formed from expanded polystyrene, good results have been obtained with a mandrel pre-heated to a temperature on the order of from about 150° to 170° F.

Prior to the exposure of sleeve 17 to the heating effect of heating elements 51, 52 and 53, a disc-shaped element of thermoplastic material 71, from which bottom element 16 of the finished cup is to be formed, is brought into position against the bottom of mandrel 41 in coaxial relationship to sleeve 17. Element 71 is retained in such position during the heating step by vacuum applied thereagainst through a circumferential series of ports 44 which are in fluid communication with vacuum line passages 45 and 46 extending through a central spindle portion 47 of mandrel 41 and, in turn, communicating with a vacuum source, not shown, external to the mandrel. The use of a pair of such vacuum line passages, 45 and 46, makes it possible to maintain a vacuum in the annular space defined by the outer surface 41a of mandrel 41 and the central spindle 47 thereof. While such vacuum is not utilized in the illustrated embodiment of the invention, it can be utilized to advantage by providing vacuum ports through the orifice 41a to help in the forming of sharp corners in an upper portion of the finished cup, as in the case of a cup having a stacking rim in an upper portion thereof or a cup formed from very thin and/or very low density material and thereby requiring a circumferentially extending stiffening rib near the upper portion thereof.

Figure 8:
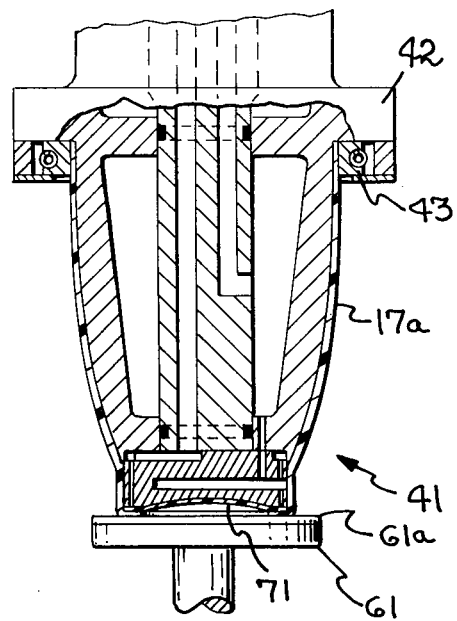

While the portion of sleeve 17 which overlies the side portion of the surface 41a of mandrel has shrunk into conformity therewith, as heretofore explained, the terminal portion of sleeve 17 which extends beyond the smaller end of the mandrel 41 will continue to shrink to form an annular, generally planar portion 17b which is integral with, and extends inwardly from the smaller end of portion 17a, and which overlaps the marginal portion of element 71 in a continuous, circumferential pattern. In the meanwhile, the interior portion of element 71 will permanently shape itself to conform to the concave curvature of the bottom of mandrel 41 by the effect of the heat and vacuum forces to which it is exposed, some vacuum naturally bleeding from ports 44 into the region above the interior portion of element 71. After the shrinking operation, the mandrel 41 with the shrunken sleeve 17 and the shaped bottom element 71 thereon is removed from exposure to heating elements 51, 52 and 53 and, as is shown in FIG. 8, a heated sealing tool 61, with a non-stick contact surface layer 61a such as a woven glass fabric, for example, of the type sold under the designation Flour glass, which is impregnated with Teflon resin or other non-stick material, is brought into pressing contact therewith to form a continuous, circumferentially extending, liquid-tight heat seal between portion 17b of sleeve 17 and the underlying marginal portion of element 71.

After the seal has been effected between portion 17b of sleeve 17 and the underlying portion of element 71, as has been described, the shrunken sleeve is stripped from the mandrel and is further processed in a conventional manner, for example, by rolling the rim 15 therein by means of conventional rim forming devices, by inspecting finished cups and by collecting and packaging a multiplicity of like cups in nested relationship with one another.

Figure 9:
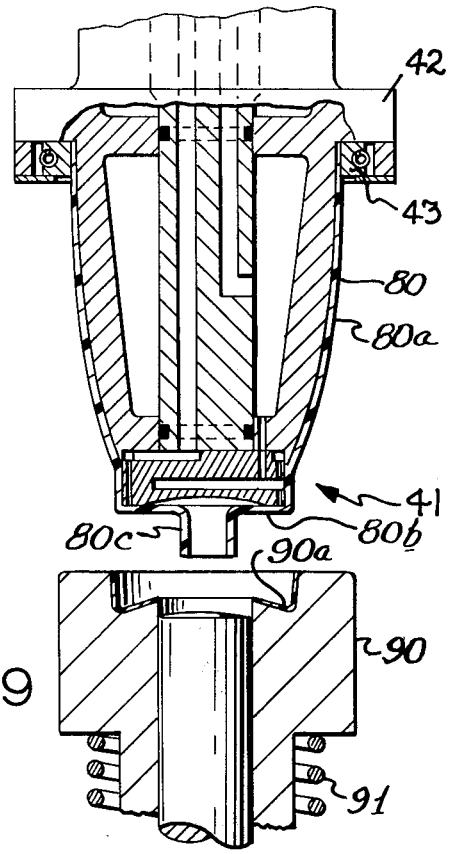
FIGS. 9 and 10 are schematic views illustrating sequential steps in the fabricating of a one-piece container.
Figure 10:
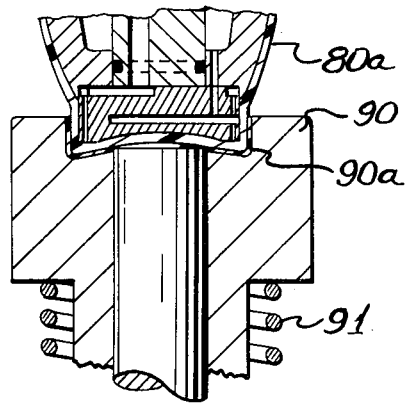

A cup of the type shown in FIGS. 1 and 2 may also be formed of one-piece construction, as well as of two-piece construction as heretofore described. Such a cup may be constructed, as is shown in FIGS. 9 and 10, from a sleeve 80 which is the same as sleeve 17 except that it is longer and has a relatively long portion adapted to extend beyond the smaller end of the forming mandrel, which may be considered to be the forming mandrel depicted in FIGS. 6–8. In such a case the starting sleeve from which the cup is to be formed is of sufficient length to have a substantial portion which extends beyond the smaller end of the mandrel 41 when the upper edge of such sleeve is in its aligned position with the upper portion of the forming surface of the mandrel. Upon the heat-shrinking of such a sleeve, as is shown in FIG. 9, it will form a member with a sidewall portion 80a, a generally planar annular portion 80b integral with portion 80a and extending radially inwardly from the lowermost edge thereof, and a relatively small tubulation 80c which extends longitudinally from the interior edge of the planar portion 80b and which is integral with sidewall portion 80a and annular portion 80b. The bottom of a cup may be formed in the shrunken member 80, preferably while such member is still on the mandrel, by the application of heat and pressure to the bottom of such member to cause the tubulation 80c to collapse and fuse together with planar portion 80b. This may be done by means of a pressing and shaping tool 90 which has a contoured surface adapted to contact the bottom of the shrunken sleeve and to shape it to the desired final configuration. Tool 90 is normally in a noncontacting position relative to mandrel 41, as is shown in FIG. 9, and it may be urged from such position into the sealing and pressing position depicted in FIG. 10 by the action of a spring 91. As the shrunken sleeve 80 on mandrel 41 may not be at a sufficiently high temperature at the time that tool 90 is brought into contact therewith to permit the sealing and pressing operation to be performed without additional heat, tool 90 may be considered to be heated by means, not shown, and to have its contact surface covered with a material 90a of the type used in regard to the contact surface 61a of the tool 61 of FIG. 8, as heretofore described. In case that the bottom sealing step in the manufacture of either the two-piece cup, as is shown in FIG. 8, or of the one-piece cup, as is shown in FIGS. 9 and 10, is done while the shrunken sleeve elements are at a sufficiently high temperature to obviate the need for additional means to heat the applicable sealing tool, an unheated sealing tool may be used, in which case it will normally be unnecessary to coat the contact surfaces of the sealing tools with the special non-stick material of surfaces 61a or 90a, as the case may be.

In general, it is recommended, for good stacking characteristics, that the sidewall taper of cups or other nestable container constructed in accordance with the present invention increase from a taper of the order of 5° – 7° at the top thereof to a taper of the order of at least 15° at the bottom thereof. To obtain a good balance between performance and cost, for a cup of the order of size of a single serving of coffee or other hot beverage and based on current economic conditions, a starting or parent sheet of expanded polystyrene of a thickness of the order of 20 to 30 mils, of a density of the order of 10 to 18 pounds per cubic foot, and with an orientation in the longer or machine direction of the order of 75% and an orientation in the shorter or cross direction of the order of 15% is preferred, with sheets of a density of the order of 10 pounds per cubic foot and a thickness of the order of 25 mils (0.025 in) being highly satisfactory for the fabrication of single serving hot drink cups. However, while heat-shrinkable, expanded polystyrene is currently the preferred material for the fabrication of insulated cups and other nestable containers according to the present invention, such preference is based mainly on the cost of polystyrene relative to other thermoplastic resins. Such cost relationships could change with the passage of time, and it is therefore to be noted that other heat-shrinkable, expanded thermoplastic materials can, from a technical point of view, be employed in the practice of the invention, including such materials as polypropylene, polyethylene and polyvinyl chloride. It is also to be noted that cups constructed in accordance with the present invention can be used as cold drink cups, where the insulating properties would not be as important, but would still be of value in preventing moisture from condensing on the outer surfaces. In the case of cups or other containers designed for holding cold drinks or for other fluent products at ambient temperature, the use of an expanded thermoplastic material would offer potential benefits, in relation to non-expanded materials, chiefly in reduced material costs.

While the invention has been described with respect to a nestable container which is circular in cross section at all elevations, it is to be noted that other configurations can be provided to suit the wishes of the designer. For example, a nestable container which has the cross section of a round-cornered square at all elevations can be provided, and a nestable container which has a circular cross section at the top gradually merging into the cross section of a round-cornered square at the bottom can be provided. Also, where close nesting is not required, an attractive nestable container with a sidewall having a reverse curvature, similar to the popular "Coke" tumbler, can be provided. Containers which are nonsymmetrical can also be provided.

It is also to be noted that the present invention can be practiced with non-expanded, heat-shrinkable thermoplastic materials in cases where the nestable cups or other containers do not require thermal insulating characteristics. Such containers would still have advantages over containers formed from such materials by vacuum forming or other sheet drawing techniques, in regard to the ease and relatively low cost with which the sidewall thereof could be decorated. Also, by virtue of the mode of manufacture thereof, such containers, being fabricated from rectangular blanks, would involve a considerably lower amount of scrap to be reground and recycled, and would inherently avoid the problem of excessive thinning in the sidewall region near the bottom which is characteristic of such containers when formed by any such popular sheet drawing technique and which, in regard to relatively tall, narrow containers, can lead to a significant reduction in the strength in the bottom regions of the sidewalls of such containers.

It is thought that the container of the present invention may be better understood from the following example, which is not to be construed as limiting the scope of the invention in any way.

EXAMPLE

The sidewalls of two-piece cups of the outline of that shown in FIG. 1 were constructed from preprinted rectangular blanks of 10 pounds per cubic foot density polystyrene, 9⅜ in. long by 4 in. wide by 25 mil (0.025 in.) thick, such blank having 75% orientation in the longer or machine direction and 15% orientation in the shorter or cross direction. The bottom elements were fabricated from polystyrene sheeting of the same specifications. Each finished cup had an overall height of 3.448 in., and I.D. at the rim of 2.920 in. and I.D. inside of the stacking shoulder of 1.892 in., a wall thickness, at the rim, of 30 mils, a wall thickness, immediately above the stacking shoulder, in excess of 40 mils, a curved sidewall curving along the arc of a circle of a radius of 12⅝ in. from a taper of 5° 30' at the rim, and an O.D. over the rim of 3.155 inches. The stacking distance or height between the bottoms of like cups in a nested relationship was 0.390 inch. Each such cup had a volumetric capacity to overflowing of 9 fluid ounces and such cups were found to very well suited, in rigidity, liquid impermeability and insulating properties for hot beverages such as coffee. Cups of similar design have also been satisfactorily constructed from expanded polystyrene sheets of the following thicknesses and densities: (1) 18 pounds per cubic foot and 25 mil, (2) 10 pounds per cubic foot and 30 mil, (3) 15 pounds per cubic foot and 20 mil, and (4) 18 pounds per cubic foot and 25 mil.

But for some differential post-expansion of the foam sheet which is caused by differential application of heat thereto which will be discussed hereafter, all regions of the cup sidewall were heated generally uniformly at the same temperature and the density of the cup sidewall remained relatively uniform throughout. As a result, it could be fairly said that the product of sidewall circumference at any elevation and thickness at that elevation remained relatively constant through a major portion of the cup.

Referring now to FIGS. 11–30, which illustrate the previously described apparatus for making the two-piece cups in more detail, the reference numbers to certain elements which have been previously described have been increased by 100 to facilitate reference back to the previous descriptive matter, and unless otherwise indicated, the elements correspond to the elements described above.

FIG. 11 is a schematic plan view of a preferred embodiment of the apparatus of the present invention in its entirety and the apparatus may be considered to be comprised of a plurality of separate working stations, or subassemblies, which are hereinafter discussed individually. The separate working stations, or subassemblies are representative of various steps that are performed in the process of the present invention, and are discussed essentially in the sequence in which they are performed.

With specific reference to FIG. 11, and beginning approximately at the "12 O'Clock" position, a main conveyor 250 having a plurality of spaced mandrels thereon moves in a counterclockwise direction to a mandrel preheat station 300, a sleeve forming station 400 (9 O'-Clock position) which includes a web handling and feed subassembly and a sleeve transfer subassembly, a bottom disc cutting station 500 (6 O'Clock" position) which includes an initial bottom disc conveyor and a final bottom disc conveyor which transfers the discs to the main conveyor, a shrink tunnel 700, a bottom forming station 800 (3 O'Clock position) and a rim forming station 900. While the various mechanisms and process steps are hereinafter discussed individually, it should be understood that the various steps and operations are performed in timed sequence in proper interrelationship with respect to one another, so that the various mechanisms cooperate in the form of a true combination.

The main conveyor 250, which transports the cup forming mandrels 141 through the above-mentioned series of operational stations, moves continuously along a closed path in the form of a flattened ellipse, although it should be understood that paths having other shapes, such as circular, are within the contemplation of the invention. A blank 118 of thermoplastic material of predetermined length is fed onto sleeve forming mandrels 131, which are turret mounted beneath the main conveyor 250 at station 400. The blanks 118 are then sealed along their end portions to form a sleeve 117, which is telescoped upwardly by a stripper sleeve 138 to the main conveyor mounted mandrels 141 which have been preheated prior to reception of the sleeve 117. The main mandrel conveyor 250 then transports the sleeves 117 to the disc transfer conveyor 600 to receive the bottom discs 171.

The bottom discs 171 are cut two at a time from two webs of stock 501 by dual die cutters at the bottom disc cutting station 500. The cut discs 171 are then serially transferred by a linear conveyor 560 to the disc transfer conveyor 600 which places the individual discs 171 on the bottom of the forming mandrel 141.

After receiving the bottom disc 171, the cup forming mandrels 141 are conveyed through the shrink oven or tunnel 700 wherein the sleeve blank 117 is shrunk to the contour of the forming mandrel 141, with the end portion 117b of the sleeve overlapping the bottom closure disc that has been previously placed on the mandrels. After emerging from the shrink tunnel, the forming mandrels move to the bottom forming station 800 where a sealing die forms a fluid tight seal between the bottom portion 117b of the shrunken sleeve and the disc. The formed cup 111 is then conveyed to the rimming station 900 where the cup is removed from the forming mandrel 141 and deposited in a cup die. The cup die is then conveyed to a rimming mechanism which is reciprocated into engagement with the cup die to form the circumferential bead rim 115, thus completing formation of the cup. The finished cups are then removed from the rimming station conveyor, and the empty cup die receives a formed cup 111 which is to be rimmed. After having deposited the partially formed cups in the rimming station cup die, the main forming mandrels are conveyed to the mandrel preheat station 300 and the entire operation is repeated.

Main Conveyor and Drive Therefor

The main conveyor 250 includes two endless chains 260 (FIGS. 14 and 25) spaced vertically from one another, and a plurality of spaced mandrel support members 252 are connected to chains 260 by brackets 261 that extend vertically between chains 260. Each bracket 261 includes upper and lower support portions 261a on the inside surface of a flat plate 261b, with each support portion 261a having an inwardly facing recess within which a chain 260 is pinned. Chains 260 are driven at the right hand end turn by conveyor shaft 810 (FIGS. 11 and 25), and vertically spaced, horizontally disposed sprockets 234 and 235 disposed at the level of the recesses within support portions 261a. The chains 260 are carried on spaced idler sprockets 234' and 235' disposed vertically from the left hand end turn shaft 810'.

Guide track carriers are mounted on the frame of the machine at opposite ends of the path of the main conveyor, and each guide track carrier 266 includes a hub 266a that is secured in free running relationship with respect to shafts 810 and 810' by vertically spaced bearings 810a. Each hub 266a is associated with its respective bearings 810a by clamping rings 266b and bolts 266c, and carriers 266 are secured to the frame of the machine by bolts 266f which are threaded into frame member 266g. With reference to FIG. 14a, frame members 266g, are parallel to one another and spaced outwardly of the axis of shaft 810 at the left hand end of the conveyor path. As is also evident from FIG. 14a, the carrier member at the left hand end of the machine is provided elongate slots 266h that are impaled by bolts 266f, so that the left hand carrier member 266 can be adjusted relative to the carrier member at the right hand end of the machine. An adjusting screw 266i is threaded through a support that is carried by transverse frame member 266j, and bears against the left hand carrier member 266 to effect adjustment thereof. The right-hand carrier member is secured in fixed relationship with respect to the prime mover which rotates the shaft 810 at the right-hand end of the conveyor path.

Carrier members 266 further include a horizontally disposed web portion 266d extending outwardly from hub 266a, with a series of circumferentially spaced, vertical flanges 266e being provided at the outer end of web 266d. Four flanges 266e are spaced at 60° intervals around the outwardly facing end portion of each carrier member as can be seen in FIG. 14a with two flanges being disposed transversely to the straight portion of the main conveyor path and with two flanges being disposed to trisect the 180° end turn.

Means are provided on carrier members 266 for guiding and positively supporting chains 260 as the main conveyor moves around opposite ends of its path, and said means includes a plurality of mounting blocks 265, each being secured to one of flanges 266. The guiding means further includes an arcuate upper guide member 262 that is secured to the upper surface of blocks 265 by bolts 262a, with guide member 262 having an arcuate downwardy facing guide track; an arcuate intermediate guide member 263 that is secured to the outer surface of blocks 265 by bolts 263a, with guide member 263 having an outwardly facing arcuate guide track; and an arcuate lower guide member 264 that is secured to the lower surface of blocks 265 by bolts 264a, with guide member 264 having an upwardly facing arcuate guide track.

A first vertically disposed roller 254 is connected to an inwardly extending, horizontally disposed flange 254a (FIG. 25) on bracket 261 by bolt 254b, and roller 254 extends upwardly to be received within the downwardly facing arcuate guide track in upper member 262.

A second horizontally extending roller 255 is connected to an intermediate portion of bracket 261 by a bolt 255a, and roller 255 extends inwardly to be received within the outwardly facing arcuate guide track in intermediate guide member 263. A third roller 256 is connected to an inwardly extending horizontally disposed flange 256a adjacent the lower portion of bracket 261 by bolt 256b, and roller 256 extends downwardly to be received within the upwardly facing arcuate guide track in lower member 264.

Figure 24:
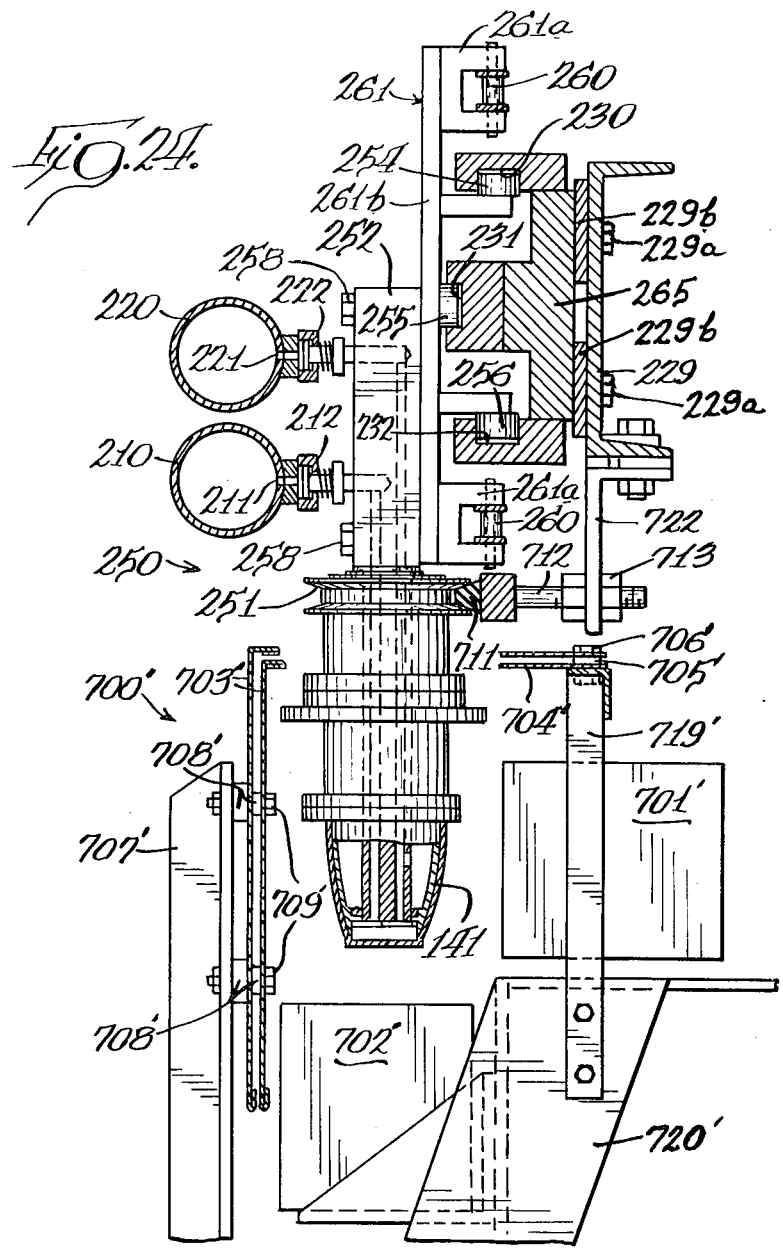
FIG. 24 is a cross-sectional view of an alternate shrink tunnel embodiment.

A similar guide system is provided for chains 260 in the straight section of the conveyor path, and the structure thereof can be best understood by considering FIGS. 12, 14a and 24. As shown therein, a pair of inwardly facing U-shaped plates 229 extend horizontally between the ends of transverse frame members 266j, and plates 229 are supported by downwardly extending L-shaped brackets 233. T-shaped mounting blocks 265 are secured to the outer face of plates 229 at spaced intervals by bolts 229a and spacers 229b. Upper and lower guide members are secured to blocks 265 by bolts (not shown), and provide vertically aligned, straight upper and lower guide paths 230 and 232, respectively. An intermediate guide member is secured to the outer face of the leg of mounting blocks 265, and provides an outwardly facing, straight track 231 that is parallel with guide tracks 230 and 232. Guide tracks 230, 231 and 232 are positioned in aligned communication with the guide tracks in members 262, 263, and 264, respectively, to provide a smooth transition between the arcuate and straight portions of the conveyor path as rollers 254, 255 and 256 traverse the guide slots.

In the illustrated embodiment, the main conveyor 250 is driven from the right hand end thereof, and the drive is transmitted to shaft 810 by a worm 814 (FIG. 25) mounted on bracket 815 and a worm gear 816 carried at the lower end of shaft 810. Worm 814 is rotated by a suitable prime mover (not shown). Worm gear 816 is mounted on a vertical stud 813 by spaced bearings 817, and shaft 810 is fixedly attached to the hub of gear 816 for rotation therewith by bolts 818 that extend through an enlarged sleeve or flange at the lower end of shaft 810.

Each forming mandrel 141 is rotatably mounted upon a spindle 147, FIG. 26, which is integrally formed at the lower end of support member 252. The upper end of the members 252 are flattened, and are secured in surface abutting engagement with the outer face of plates 261b by bolts 258. Mandrels 141 are each supported on a spindle 147 by a mounting assembly which includes a collar 270 having circumferentially spaced flanges 271 at its lower end which are secured by bolts 274 to an outwardly extending flange 141a at the top of the mandrel 141. A bearing 269 is positioned coaxially within each collar 270, and is retained around its respective mandrel 141 by clip rings 272 which are located in circular recesses in the spacer and which bear against the upper and lower surfaces of collar 270. The mounting assembly is positioned and retained in place on spindle 147 by a thrust bearing 273 and an annular member 147a threaded to the spindle 147.

Mandrel Preheat Station

As described above, it is desirable that the forming mandrels be at an elevated temperature during the shrinking step to prevent the formation of wrinkles in the sides of the cup, and to this end the mandrels are passed through the preheat station 300. The preheat station FIG. 12, is located upstream from the left-hand arcuate end turn, and includes an infra-red heater 320 on one side of the conveyor path at the level of the mandrels and reflector structure 301 beneath the conveyor path and on the side thereof opposite from heater 320. Heater 320 may be the same as, or similar to, heaters of the type described above to shrink sleeve 17, i.e., an electrical element of the type manufactured by Irex Corporation of Riverdale, N. J. and sold as Radplane radiant process heaters. The particular reflector elements illustrated in FIG. 12 are L-shaped, with a first leg 301a extending below the mandrel path, and with a second leg 301b extending upwardly above the lower forming section of the mandrels. Reflector leg 301b is secured to vertical frame members 304 by means of insulating spacers 302 and 303, and anchor bolts 305. Reflector leg 301a is secured to horizontally disposed frame members 307 by means of an insulating spacer 303 and anchor bolt 305, and heater 320 is also secured to frame members 307 outwardly of the end of reflector leg 301a.

The upper portion 142 of the forming mandrel is provided a collar 270 formed with a circumferential recess 251. A horizontal rail 308 is secured to frame members 304 by means of studs 306, and rail 308 extends the length of the preheat station. Rail 308 extends outwardly from frame members 304 and engages within mandrel recesses 251 as the mandrels traverse the preheat station. Rail 308 is preferably made from a resilient material, so that proper frictional contact may be maintained between rail 308 and recesses 251 to rotate the mandrels about their vertical axis as they pass through the preheat station. Illustratively, mandrels 141 may be heated to a temperature in the range of 150°–160° F. in the preheat station. and the degree of heating will, of course, vary depending upon the character of the plastic used for the sleeves, i.e. its composition and thickness. It should be appreciated that after conditions at thermal equilibrium have been reached, the step of preheating the mandrels may be omitted.

Web Handling and Feed

The web handling and feed system is similar in many respects to the system described and claimed in S. W. Amberg et al. application, Ser. No. 209,751, filed Dec. 20, 1971, and the disclosure of said application is expressly incorporated herein by reference to the extent that the diclosure thereof is not inconsistent with the present disclosure.

As described above, the sleeves 117 are formed from a continuous web of stock. With reference to FIG. 11, the thermoplastic web stock 415 is supplied from roll 415a which is supported outwardly of the left-hand and the main conveyor path on a rotary stand with a vertically disposed axis. The decorated surface, if any, of the web stock 415 is on the outer surface of the stock wall. The web stock 415 is continuously fed with a vertical orientation along a path past a guide roller 416 and between adjacent S-wrap guide rollers 417 and 418. The web stock 415 next passes between the nip of a pair of feed rollers 419 and thence, onto feed drum 420 adjacent the path of the main conveyor. Web 415 goes onto feed drum 420 with the printed surface (if any) facing inwardly on the drum. When the web stock is decorated with a repeat pattern, a photo registration unit (not shown) may be provided between guide rollers 417, 418 and feed rollers 419 to maintain the linear relationship of the repetitive decoration. A rotary vertical cut-off knife 421 adjacent feed drum 420 severs the web stock at preselected intervals to provide appropriate length blanks of material for forming the container sidewall.

After the web 415 passes through the feed rollers 419, the leading edge of the web is held against the vertical cylindrical surface of the feed drum 420 by vacuum applied to a vertically arranged series of ports. Feed drum 420 corresponds to element 92 in above-mentioned application Ser. No. 209,751, and reference may be made to this application for details not shown or specifically described herein. The surface of the feed drum 420 is provided with three equally spaced apart sets of vertical ports which receive vacuum from a suitable source. Each set of ports comprises two vertical rows of ports to which vacuum is selectively directed so that the leading row of ports first receive vacuum to pick up the leading edge of the web 415 just as the previous blank is cut by the rotary knife 421; and thereby controls the leading edge of the web to hold it on feed drum 420 as the knife severs the material. The second or trailing row of vacuum ports in each set are in contact with the web 415 previous to the cutting thereof and exerts a pulling force in the web to keep the material taut between rollers 419 and the feed drum.

When the rotary knife 421 has completed its cutting action against the vertical face of the feed drum 420, the leading ports will apply vacuum to the web 415 at the interface with the drum. The feed drum 420 has a higher peripheral velocity than the web material fed by rollers 419, and the difference in surface speed generates a slip-clutch affect between the vertical face of the drum 420, the leading and trailing vacuum ports, and the web 415. This slip-clutch effect (see FIGS. 17a and 17b of application Ser. No. 209,751) will cause the leading vacuum ports to advance the leading edge of the web 415 and subsequently lose contact. Before this occurs, the trailing ports will have engaged the web 415 and thereby maintain a continuity in the slip-clutch effect. After the web 415 has been cut by knife 421, the blank 118 assumes the velocity of the drum surface. This causes a gap to occur between the trailing edge of blank 118 and the leading edge of web 415 providing the timing of the successive blanks 118 and mandrels 131 which are rotated into trangential relationship with the vertical surface of the feed drum 420. The slip-clutch effect, just described, that occurs between the feed drum 420 and the web 415, applies a tension to the material between the feed drum 420 and feed rollers 419 and holds the web taut therebetween. When the feed drum 420 reaches its closest tangential relationship with a mandrel 131, the vacuum ports which are holding the blank 118 on the feed drum, are supplied with a short puff of positive air pressure which releases the leading edge of blank 118 from the surface of the feed drum 420. The clearance between the mandrel surface and the feed drum surface interface at this point is about one and one-half times the thickness of the blank 118. When a transfer interface occurs, i.e., where the center axis of a mandrel 131 coincides with the diametrical line connection between the rotary center of feed drum 420, the blank 118 is transferred from the feed drum onto the mandrel. The blank 118 is then carried on the mandrel 131 by means of the set of vertically spaced vacuum ports described above in connection with FIG. 4.

Mandrel Mechanism

Figure 14:
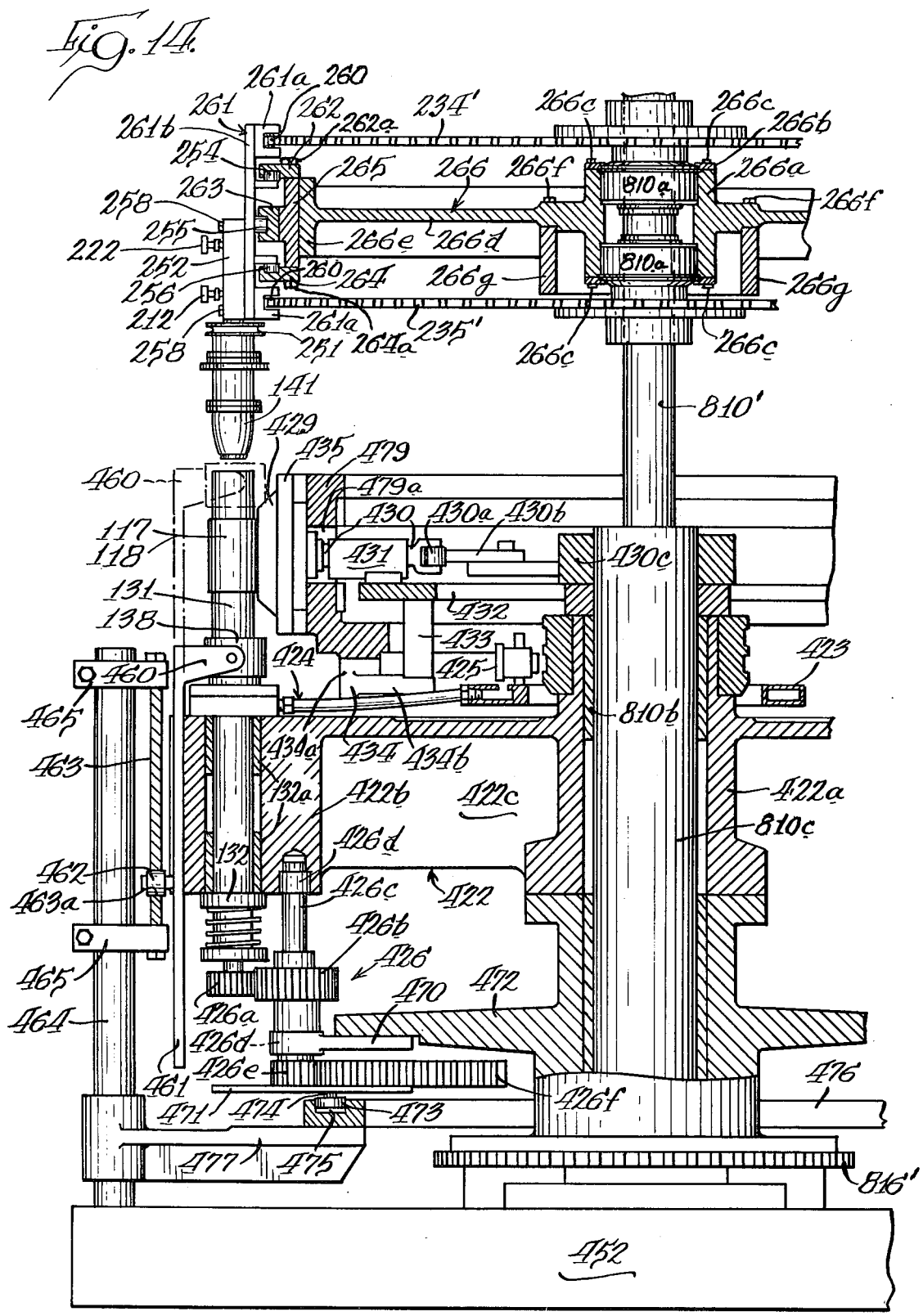
FIG. 14 is a cross-sectional view, taken generally along plane 14—14 of FIG. 11, and illustrating the turret assembly.
Figure 14A:
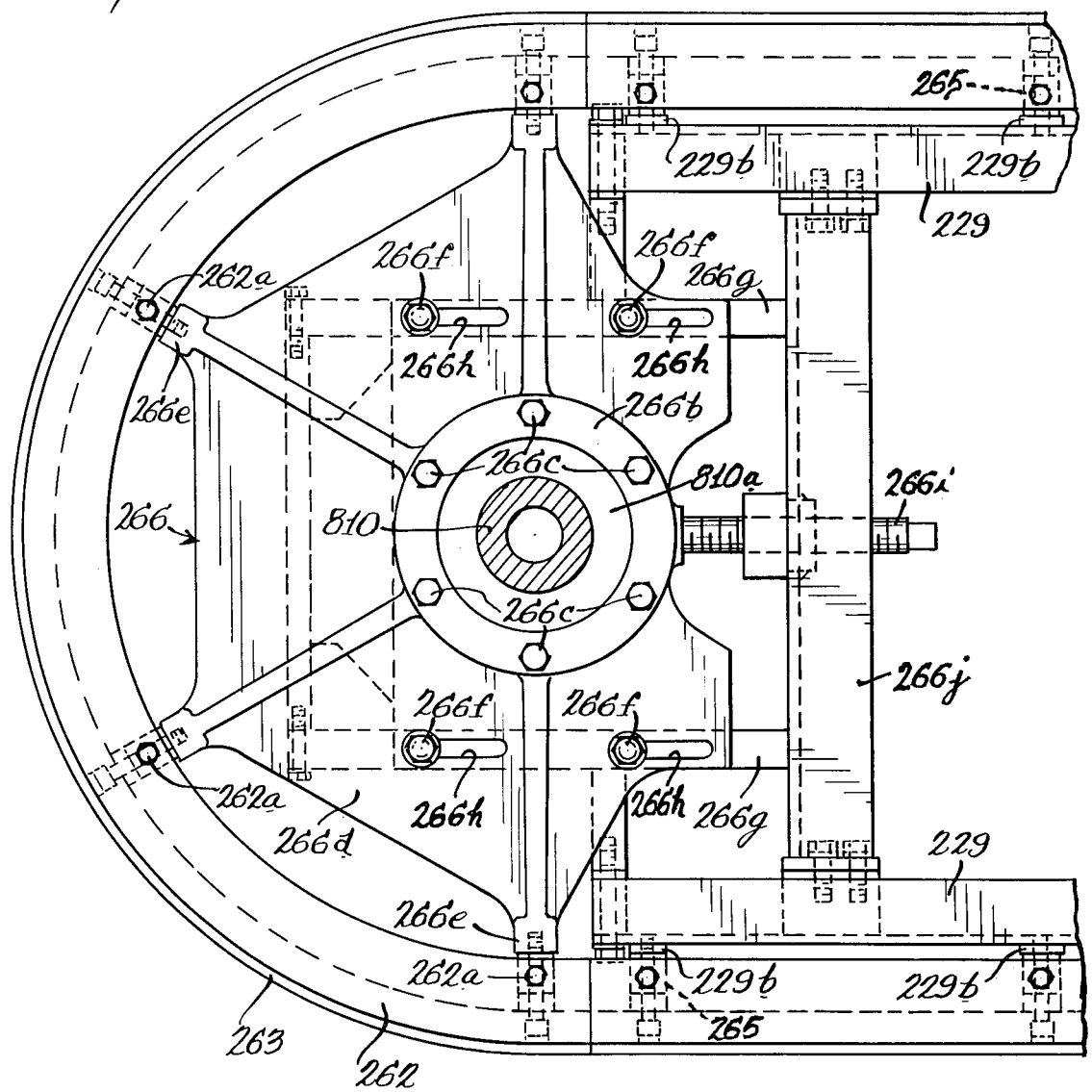
FIG. 14a is a fragmentary plane view, partially in cross-section, illustrating the guide track carrier assembly for the mandrels mounted on the conveyor chain.

A plurality of sleeve forming mandrels 131 are rotatably mounted by bearings in the spokes of a turret 422 which rotates about shaft 810' at the left-hand end and below the main conveyor path as can be seen in FIG. 14, which shows a mandrel in the sealing position. Turret 422 is comprised of a hub portion 422a, a plurality of radial spokes 422b, extending outwardly from the hub, and supported by a web portion 422c. The outer end of each spoke is bored to receive a vertical shaft 132 which is supported by bearing 132a, and the forming mandrels 131 are provided at the upper portion of shafts 132. Shafts 132 are located on a common radius with the path of movement of the forming mandrels 141 at the curved left-hand end of main conveyor path, and the sleeve mandrels 131 and the mandrels 141 move into vertical registry at the left-hand end of the conveyor path and remain in vertical registry for 180° of rotational travel.

The vertical vacuum ports 135 in each mandrel 131 receive vacuum through an internal chamber 137 (FIG. 13a), and the vacuum is supplied from an annular manifold block 423 mounted above the turret 422 (FIG. 14). Manifold block 423 communicates with chamber 137 in each mandrel through a radially disposed hose 424 which is connected at the end remote from chamber 137 to suitable source of vacuum by a fitting.

Mandrels 131 are rotated by a gear train system 426 best seen in FIG. 14 herein, and shown in even greater detail in FIGS. 14–16 of application Ser. No. 209,751. The gear train system converts the continuous rotary movement of turret 472 into intermediate rotary movement of mandrels 131, and to this end, each mandrel is provided with a gear 426a at the lower end of shaft 132 which meshes with a gear 426b. A vertical shaft 426c parallel with each shaft 132 is mounted at its upper end in the lower portion of spoke 422b of turret 422 by a bearing 426d and its lower portion by a bearing 426d which is located in a bracket 470 extending from a flange at the lower end of turret 472. Shaft 426c is driven by a rack and pinion system mounted beneath the flange of turret 472 in housings 471. This system includes a drive pinion 426e which is keyed to the end of shaft 426c extending below bearing 426d and is in mesh with rack gear segment 426f. Each rack gear 426f carries a cam roller 473 which is attached to the underside of the gear segment by pin 474.

Roller 473 travels in an upwardly facing cam grooves 475 formed on the top surface of a stationary cam plate 476 which defines an endless cam path about turret 472. Cam plate 476 is rigidly held on the ends of horizontally disposed arms 477 which are attached to the frame base platform 452 at spaced intervals circumferentially around turret 472 by vertical support posts 464. The cam path is contoured to produce 540° rotation of the forming mandrels 131 immediately after the leading edge of the blank has been positioned thereon to wrap the blank around the mandrel and to locate the overlapping edge portions in a position facing inwardly toward the seam forming apparatus to be hereafter described. The aforedescribed 540° rotation takes place as turret 422 rotates from the blank pickup position adjacent drum 420 to a 6 o'clock position, where a dwell portion of the cam 475 terminates rotation of the mandrel after which the blank 118 is seamed to form a cylindrical sleeve 117. A gradual rise in the cam will reset the rotational position of mandrel 131 180° for receiving another blank just as the mandrels 131 rotate into register with mandrels 141. The mandrels then remain stationary as they move into vertical registry with the overhead forming mandrels 141 where the sleeves are transferred to mandrels 141.

Turrets 422 and 472 are in fixed relationship to one another for conjoint rotation. A worm gear 816' is attached to the lower end of turret 472 and a driven by a worm (not shown) which is rotated on a common drive shaft with worm 814 (FIG. 25).

After the mandrel rack and pinion drive system has rotated mandrel 131 through 540°, the overlapping ends of the blank 118 are seamed. Referring to FIGS. 13a, 13b and 28, the seaming apparatus of the present invention utilizes a combination of hot air and cold clamping to create a smooth liquid tight seam between the overlapping portions of blank 117. To this end, each mandrel is provided with a sealing system which is located above turret 422 and positioned on a support ring 432 (FIG. 14) which is attached to the upper surface of the turret spokes 422b by vertical support column 433 and horizontal bracket 434.

The individual seaming systems for each mandrel 131 are located on a radius of turret 422 which intersects the center axis of its respective mandrel.

Referring to FIG. 28, at position 1 after the leading edge of blank 118 has been picked up on a mandrel 131 by its vertical row of vacuum ports 135, the mandrel is rotated by its rack and pinion system 426 through 540°, as described above. As the mandrel passes 180° of rotation (position 2), a carriage assembly 435 (discussed below) is cammed radially toward the mandrel so that a vertically elongated roller 436 extending the height of the blank 118 contacts the surface of the blank to support it on the mandrel. When the mandrel 131 completes 540° of rotation (position 3), the vertical edges of blank 118 are presented in overlapping relationship. Hot air is then directed to the overlapping edges from converging nozzles 427a to soften the thermoplastic material. The hot air acts simultaneously on both edges of the blank thus shortening the time necessary to seam the blank. The hot air preferably has a temperature in the range of 550°-650° F. to soften the thermoplastic material of the type contemplated by the present invention.

As the hot air is directed toward the overlapping edges, the trailing edge of blank 118 is oriented against the flow of hot air and tends to be lifted from the surface of mandrel 131, thus forming a V-shaped pocket with the leading edge of the blank to receive hot air. Roller 436 remains in contact with the blank adjacent the trailing edge so that the trailing edge is in the proper attitude to the flow of hot air.

After the edges of the blank 118 have been softened, a cold clamping bar 429 is cammed against the overlapping edges and the softened surfaces unite to form a seam, thus completing the formation of a cylindrical sleeve 117. At this time, vacuum to ports 135 is terminated, so that the sleeve 117 may be subsequently removed from mandrel 131. The hot air is diverted from the blank 118 as the clamp 429 is cammed against the blank to prevent distortion of the sidewalls (position 4). After the edges have been seamed, the clamp 429 and roller 436 are moved out of contact with the sleeve 117 (position 5) and the mandrel enters the sleeve ejection position where the sleeve is telescoped onto the forming mandrels 141.

Referring to FIGS. 13, 13a, 13b and 29, the hot air is directed from an air regulator 427c which supplies air at a suitable rate, such as, for example, 6-7 cfm., to the lower end of an air heater assembly disposed vertically to and adjacent each forming mandrel 131. The air heater assembly comprises a vertical elongated chamber 427 which receives air from regulator 427c through tubing and fitting 427i and which is open at the top 427b to allow air to escape upwardly. A suitable heating element (not shown) is located within the chamber 427 which heats the air as it passes therethrough. Each air heater assembly is mounted on a horizontal plate 427e, which is secured to the upper surface of a turret spoke 422b by bolts 427f. Plate 427e is provided with an upright support 427g to which the air heater assembly is mounted by box brackets and bolts 427h. A movable cover 428 is provided over an opening at the end of duct 427, so that after the blank 118 has been wound on mandrel 131 and seamed, the hot air may be directed away (FIG. 13b) from the sidewall of the seamed tube to prevent distortion thereof.

Cover 428 is controlled by a vertically disposed linkage system 428a, FIG. 29, and the cover is spring loaded toward an open position. The linkage system includes the cover 428, which is pivotally mounted to a support 428b at the upper portion of chamber 427 by pin 428c. The cover 428 thus forms a lever and the end of the cover opposite chamber 427 is pivotally connected to the upper portion of vertically disposed link 428d by slide pin assembly 428e. Slide pin assembly 428e is biased upwardly by a spring 428f, and an adjustment collar 428g is threaded on the upper end of link 428d, so that the cover opening may be adjusted. It will be appreciated that longer cover closure times will be necessary as the speed of the machine is increased and the above described adjustment means gives the machine the flexibility of accommodating different production rates.

Link 428d is biased downwardly by a spring 428h that is connected to plate 427e, so that cover 428 is urged into the open position. The lower portion of link 428d is pivotally connected to an operating lever 428i by pin 428j, and lever 428i is pivotally attached by a pin 428l to a fulcrum block 428k mounted on the upper surface of plate 427e. The other end of lever 428i carries a spherical cam follower 428m which rides on an arcuate cam 428n mounted on turret spokes 422b. Cam 428n has a low portion which causes cover 428 to close immediately after the blank 118 has been wound about mandrel 131, so that hot air is directed to the interface between the overlapping end portions of the blank 118. After the cold clamp 429 engages the overlapping ends of blank 118, the cam surface drops and the cover 428 opens.

The cold clamp 429 is mounted on a radius of the turret 422, and is reciprocated in a radial plane through the center of rotation of the mandrel 131. The vertical operative surface 429a at the outer end of the clamp is designed to produce a vertical seam between the softened overlapping edges of blank 118. Each clamp 429 is attached to a piston rod 430 extending through a cylinder 431. The piston rod 430 is spring loaded (not shown) inside the cylinder 431 to normally urge piston rod 430 radially inwardly, and this retracts clamp 429 so that it is stopped in contact with the outwardly facing surface of an annular stop ring 479. Ring 479 is mounted concentric with shaft 810' above turret 422, and supported thereon by brackets 434. Each bracket 434 includes a vertical column portion 434a which supports stop ring 479 from the upper surface of turret 422. Radial access slots 479a are provided in ring 479 at spaced circumferential locations to permit piston rod 430 and cylinder 431 to extend therethrough. Cylinder 431 is attached to an annular support ring 432 which is mounted on turret 422 by vertical columns 433 that extend upwardly from the ends of horizontally disposed cantilever portions 434b of brackets 434, as shown in FIG. 14.

Each clamp 439 is secured in an outwardly facing vertical slot in a carriage assembly 435 (FIG. 13), and a vertically disposed roller 436, is mounted in side-by-side relationship with respect to each clamp by shafts 436a. A spring 437 surrounds each shaft 436a and biases the shaft outwardly to provide a yieldable force for holding blank 118 on mandrel 131. Each carriage 435 is controlled by the movement of its piston rod 430, and the end of the piston rod 430 opposite the clamp 429 is provided with a cam follower 430a which rides on the vertical face of a lateral cam 430b. Cam 430b is stationary and is fastened by a hub 430c on the vertical stationary shaft 810c concentric with shaft 810'.

Cam 430b extends circumferentially of turret 422 through an arc of travel spanning the seaming cycle (FIG. 28). Accordingly, roller 430a engages cam 430b while a mandrel 131 starts to wind a blank 18 around itself so that roller 436 will contact the side of the blank on the mandrel approximately after 180° rotation of the mandrel. As is clear from FIG. 13 and the No. 2 position of FIG. 28, roller 436 extends outwardly beyond the end of clamp 429, so that clamp 429 remains spaced from the blank as it is being wound. A subsequent high portion in cam 430b causes the clamp 429 to press against the overlapping softened ends to form the seam and the side walls of sleeve 117. During this latter movement, roller 436 moves inwardly against the bias of spring 437. After the sealing cycle is completed, roller 430a runs off cam 430b and the spring loading of cylinder 431 returns piston rod 430 inwardly and retracts clamping bar 439 and roller 436 from their contact with the sleeve.

As is discussed above with reference to FIG. 5, it is also possible to use a heated sealing bar 40 to form the seam of the blank. However, the embodiment just discussed utilizing the hot air system is preferred. The hot air system allows for heating smaller thicknesses of sheet blank since the hot air is directed between the overlapping end portions of the blank, and thus gives good heating effect to the areas of the end portions which are to be bonded. Using the heated bar 40, it is necessary to first heat the outer overlaying portion and then the inner overlaying portion before a bond can be established. Thus, it will be appreciated that the use of a hot air system to simultaneously heat the juxtaposed portions of the blank simultaneously greatly reduces the time required to form the seam.

Sleeve Transfer System

The seamed sleeve 117 is telescoped onto the forming mandrels 141 by a stripper mechanism, as discussed generally above, when the mandrels 131 and 141 are in register, i.e. between about the 10 and 11 o'clock positions at the left-hand end turn of FIG. 11. A stripper sleeve 138 is carried on each mandrel 131 and connected by a U-shaped arm 460 to an actuator rod 461, as can be best seen in FIG. 14. Each rod 461 carries a roller 462 which rides on a continuous rising-falling cam plate 463 having a cam surface 463a. Cam plate 463 is mounted circumferentially on the frame 452 of the machine along the path of the mandrel movement by the vertical posts 464 and lateral brackets 465. The rising portion of cam 463 occurs at the beginning of the ejection cycle and raises rod 461 to the position shown in phantom in FIG. 14 to move sleeve 117 upwardly and off at mandrel 131 and over forming mandrel 141. The lower end of mandrels 141 are positioned in close proximity to the upper ends of mandrels 131, and the lower ends of mandrels 141 are substantially smaller in diameter than the upper ends of mandrels 131 so that the sleeves 117 can be telescoped over mandrels 141 by mere vertical movement of the stripper sleeves, thus obviating the necessity of any complex sleeve gripping mechanisms. When stripper 138 reaches the end of its upward stroke, sleeve 117 is held by clamping ring 143 as can be best seen in FIGS. 22 and 26. Thereafter cam surface 463a falls to return stripper 138 to the retracted position shown in full lines in FIG. 14.

Prior to the ejection cycle, each mandrel 131 is rotated 180° by the rack and pinion system 426 so that the vertical vacuum ports 135 will be presented tangentially to the feed drum 420 as the mandrel and feed drum again approach the blank feed path, thus, resetting the mandrel for the next cycle.

Bottom Disc Cutting Station

The sleeve 117 and mandrel 141 continue through the arcuate travel of the left-hand end turn and then to the disc transfer station 600, whereat the bottom portion or disc 171 of the cup is deposited at the base of the mandrel 141. While the material for use in forming the discs 171 may be the same type used for the sleeve 117, preferably, the discs are formed from other materials, e.g. other thermoplastic materials, which are non-oriented and non-shrinkable, and have properties commensurate with the liquid tight sealing requirements of this invention.

Referring to FIGS. 11, 15 and 16, the bottom discs 171 used to form the base of the finished cup are cut, two at a time, from two continuous webs of thermoplastic material 501. The webs of bottom stock 501 are mounted on spools 501a with their axis of rotation perpendicular to the main conveyor 250. The webs of bottom stock 501 are fed inwardly toward one another and over inclined rollers 502 which change the direction of feed perpendicularly to the original direction, thus directing the webs of bottom web stock parallel to one another and into the disc cutting station 500.

Spools 501b are mounted in parallel coaxial relationship with sppls 501a and receive scrap bottom stock material from the disc cutting station 500, as will hereinafter appear.

Referring to FIG. 16, bottom web stocks 501 are pulled from right to left by unwinding rollers 510 and 511 (hereinafter described in detail) that are supported in spaced relationship with respect to cutting station 540. Web stocks 501 are unsupported between cutting station 540 and rollers 510, 511 and thus sag downwardly to form supply loops. Arcuate tracks 547a and 547b are positioned, respectively, adjacent the exit end of rollers 510, 511 and the entrance end of cutting station 540 and provide smooth guide surfaces which direct the web stocks into the cutting mechanism. The web stocks are intermittently pulled through the cutting station 540 by pull rollers 510' and 511' (also hereinafter described in detail), and during the dwell periods of the intermittent feed, discs 117 are severed from the stock webs 501 by a reciprocating cutting mechanism, hereinafter described. The scrap webs that remain after the bottom discs have been severed are guided into the nip between rollers 510' and 511' by flat guide plates 547c, and the scrap webs then pass over further guide members 547d, rollers 502 and to the aforementioned spools 501b where the scrap material is accumulated.

After formation, bottom discs 171 are delivered to a linear conveyor 560 which conveys the bottom discs serially (from right to left as viewed in FIG. 11) to a disc transfer conveyor 600 which travels in a clockwise direction along a rectangular path to transport the discs to the main conveyor, where they are on the bottom of the forming mandrels 141.

Turning now to the web feed system, which can be best understood from FIGS. 16 and 19, independent lower unwinding rollers 511 are provided for each web 501, with rollers 511 each having integral opposite end shafts 511a and 511b which are supported in parallel vertical frame members 525 by bearings 520. An independent upper unwinding roller 510 is associated with each lower roller 511, and rollers 510 are also integrally formed with integral opposite end shafts 510a and 510b which are rotatably mounted in lever support members 522 by bearings 523. Unwinding rollers 510 are smaller in width than rollers 511, as is clear from FIG. 19. Support members 522 are interconnected and pivotally supported in frame members 525 by shafts 526 that are spaced from and parallel with shafts 510a and 510b. Members 522 act as a lever and are free to pivot about shafts 525, so that the unwinding rollers 510 may be moved to a clearance position spaced from rollers 511 to facilitate initial threading of web stocks 501 into the feeding mechanism. Movement of members 522 is controlled by air cylinders 531 (FIG. 19) connected at their head end to a transverse frame member 572 and connected at these rod ends to one of members 522. Upward movement of members 522 is limited by stop studs 571 that are threaded into member 525 and which pass through enlarged clearance openings in members 522.

Each upper unwinding roller 510 is driven by its corresponding lower roller 511 through a gear system including gears 527 mounted on shafts 511a which mesh with gears 529 mounted on shafts 510a. Gears 529 are separated from bearings 523 by retainers 530, which position the bearings 523 in member 522, while gears 527 are retained in spaced relationship with respect to gears 570 on shafts 511 by spacers 528.

The amount of unwound stock in the loop between the unwinding rollers 510 and 511 and the cutter section 540 is controlled by light sensors 535 that are mounted on opposite sides of the loop. The light sensors 535 are connected through appropriate circuitry (not shown) to electric clutches 519 connected to shaft 518, which is supported on the frame of the machine in parallel relationship below rollers 511, and in a common plane with their associated shafts. Gears 517 are carried at opposite ends of shafts 518', which are operatively coupled to shaft 518, and mesh with gears 570 that are fixed to the outer ends at shafts 511a for rotating lower rollers 511 when clutches 519 are energized.

Shaft 518 is continuously rotated by a drive means from a main crankshaft 541 (FIGS. 16 and 20) that is supported in the frame of the machine in spaced parallel relationship with respect to shaft 518. Crankshaft 541 is driven by sprocket 544 by means of chain 543 that is connected to a suit prime mover, e.g., the prime mover for the main conveyor 250. A sprocket 542 is fixed on the end of the crankshaft 541 opposite from sprocket 544, and an endless chain 513 is trained over sprocket 542, and idler sprocket 514 and a sprocket 575 on shaft 515. Shaft 515 is mounted in spaced parallel relationship below shaft 518, and a transfer gear 512 on shaft 515 meshes with a gear 516 on shaft 518 to continuously rotate shaft 518. Thus, as the stock webs 501 are fed through the cutter mechanism 540, the web loops being monitored by sensors 535 are raised until light is permitted to pass between the sensors thereby initiating rotation of the feed rolls 510, 511 through clutches 519 and the aforedescribed drive system to return the loops to their desired size.

The stock webs 501 are intermittently advanced through the cutter station 540 by means of rollers 510' and 511' which operate in a similar fashion to that of the unwinding rollers 510 and 511, except that the initial drive system is modified so that the rollers 510' and 511' are rotated continuously. Referring to FIGS. 16, 17 and 20, a gear 545 is mounted on the crankshaft 541 and meshes with a transfer gear 546 that is fixed on a shaft 546a, which is rotatably supported on the frame of the machine in spaced parallel relation above and to one side of crankshaft 54. Transfer gear 546 in turn drives gear 547 which is mounted on the lower pull roller shaft 548, which, unlike the lower unwinding roller shafts, extends through both lower pull rollers 511'. The remainder of the pull roller drive is similar to that of the unwinding rollers 510 and 511 and the elements are correspondingly numbered with prime numbers, and their operation will not be repeated, except to note the structural change in the rollers.

As can be best seen in FIGS. 16 and 20, the upper pull rollers 510' are the same width as the lower rollers 511' and are mounted on separate coaxial shafts 551. The lower rollers 551' are circumferentially surfaced with a neoprene cover 549, that is formed with a high portion 549a and a dwell portion 549b. Rollers 510' have neoprene portions 550 bonded thereto. Neoprene portions 549a and 550 are positioned to engage the webs 501 simultaneously after the cutter mechanism 540 has moved out of engagement with the webs. The raised feed portions 549a and 550 have an arcuate extent that is coordinated with the diameter of the bottom discs, so that each time the raised portions engage the webs, the webs will be advanced a sufficient amount to place unsevered portions of the web stock above the cutting mechanism.

Discs 171 are severed from web stocks 501 by the cooperative action of movable cutters 561 and fixed dies 583. Dies 583 (FIGS. 17 and 18) include a cylindrical central bore 583b, and cutters 561 are cylindrical in external configuration and guided within bores 583b. Die 583 include horizontally aligned guide slots 583a at opposite sides thereof, and constrain the webs 501 for movement through the bore 583b of the dies. The external surface of each cutter 561 is positioned in sliding surface abutting engagement with the internal surface of a bore 583b, and the outer upwardly facing edge of cutters 561 cooperate with the inner downwardly facing edge of die 583 above slots 583a to effect a shearing action upon the webs 501, when the cutters 561 are moved upwardly to, in effect, punch the discs from the webs.

Dies 583 are fixedly mounted upon a horiontally disposed frame member 584 (FIG. 17) by bolts 583c, and frame member 584 is fixedly connected to vertically extending frame members 585 by bolts 584a.

Cutters 561 are moved vertically by a horizontally disposed platform member 561a, which is constrained for vertical movement by guide rods 587 (FIG. 16) that extend downwardly from mounting member 584 and which are slidably mounted within guide sleeves 588 fixed to platform 561a. Each cutter 561 is carried by an upright post 561b that extends perpendicularly with respect to platform 561a. Upright posts 561b have an externally threaded lower end which projects beyond the lower surface of platform 561a, and an externally threaded collar 561c is threaded on the lower end of each post 561b to retain a downwardly facing shoulder 561d on each post against the upper surface of platform 561a. Cutters 561 include a bore 561e at the upper end thereof, and a counterbore 561f at the lower end thereof which is received over a reduced diameter portion at the upper end of posts 561b, so that the cutters are seated upon an outwardly facing shoulder 561g on posts 561b. A hollow passage 561h is provided centrally of posts 561b throughout the length thereof, for reception of a lifting rod to be hereafter described. The upper end of each passage 561h is internally threaded for reception of an externally threaded clamping screw 561j, which has an outwardly extending flange at the upper end thereof which bears against the end of cutter bore 561e to positively retain the cutters 561 against shoulders 561g.

Platform 561a is reciprocated by links 580 having bifurcated upper ends 580a pivotally connected to downwardly facing lugs 580b connected to the bottom surface of platform 561a at opposite sides thereof. The lower end of each link 580 is in the form of a split hub 581 that defines a journal for an eccentric that is fixed to shaft 541, it being understood that the throw of the eccentric is sufficient to move the cutters from a clearance position disposed below the level of the die slots 583a to an elevated position thereabove, as shown in FIG. 18.

A lifter assembly is provided at cutting station 540 for transferring the cut discs to linear conveyor 560, and the lifter assembly includes connecting rods 562a mounted for vertical reciprocating movement within the passages 561h of posts 561b. Circular lifting discs 562 are connected to the upper ends of rods 562a by screws 562d that are threaded into countersunk openings in rods 562a. The outer diameter of lifters 562 is less than the inner diameter of cutter bores 561e so that the lifters can be nested therewithin during the web cutting operation. The lower ends of rods 562a are connected to a support member 562b, which in turn is connected to a mounting member 562c in the shape of an inverted U having the legs of the U slidably embracing crankshaft 541. A roller 563 extends laterally outwardly from member 562c and engages an eccentric cam 564 keyed to shaft 541, and cam 564 moves the lifters upwardly against a return spring 536 which is coaxially mounted on a vertical guide rod 586. Spring 536 reacts between frame member 584 and a spring seat on the upper surface support member 562b to bias the lifters 562 downwardly and to retain roller 563 against cam 564.

The eccentric cam 564, in one embodiment, has been formed with a 110° simple harmonic rise to move the lifters 562 upwardly in timed relationship with the upward movement of cutters 561, it being understood that the throw of cam 564 is substantially in excess of the cutter eccentric, so that after discs have been punched from the webs and elevated slightly by cutters 561, lifters 562 move upwardly to raise the discs 171 above the upper surface of die 583 into a position to be transferred to linear conveyor 560. In the specific embodiment mentioned in the preceding sentence, cam 564 has an 105° simple harmonic fall portion circumjacent to the rise portion for lowering lifters 562 into cutter bores 561e as the cutters are lowered toward the clearance position below the plane of the stock webs. Cam 564 has an 145° dwell portion to hold lifters 562 at an elevation below the plane of the stock webs, and while lifters 562 remain stationary, the cutter eccentric moves the upper edge of the cutters downwardly to the clearance position (at which time rollers 510', 511' advance webs 501) and then upwardly in a web severing stroke.

The lifters 562 are constrained for vertical movement by the slidable engagement between rods 562a and flanged rod bushing sleeves 561i and rod 586 which moves upwardly in a guide opening 584c in plate 584.

In order to maintain proper tension in the webs 501 as they are fed and the discs 171 are cut therefrom, two spring loaded tensioner assemblies 566 are provided. The assemblies 566, one for each web 501, are biased to rotate counterclockwise (FIG. 18) against the webs as they are conveyed over member 547b. To facilitate the shearing action, the upper edge of cutters 561 may be inclined downwardly from diametrically opposed high points, so that the shearing takes place progressively as the cutters move through the web stock.

Initial Bottom Disc Conveyor

The linear conveyor system 560 which moves the discs serially, parallel to the main conveyor to the disc transfer conveyor 600 can be best understood from FIGS. 15 and 18. As shown therein, conveyor 560 includes spaced parallel rails 565 that are essentially rectangular in cross section and which have recesses 565a on their oppositely facing interior faces. The leading edges of rails 565 define an entrance width slightly less in width than the diameter of discs 171 but greater than the diameter of lifters 562. Since the discs 171 are made of a flexible thermoplastic material, as the lifters 562 move the discs upwardly, the outer edges of the discs will yield to allow the discs to be positioned in the recesses 565a.

Rails 565 are supported below parallel, coplanar, rectangular plates 578 by bolts 578a and spacers 578b, and plates 578 as suspended below fixed frame member 579c by bolts 579a that extend through transverse straps 579 and spacers 579b. A third, or central, rectangular plate 569 is mounted in spaced coplanar relationship between plates 578, bolts 589, and spacers 589a, and the edges of plates 579 and 578 form roller guides, as will hereinafter appear.

To insure that the discs 171 are not lifted past the recesses, stop members 567 are positioned directly above and in line with the center line of the lifters, and members 567 are free to move upwardly in the bore 567a of a guide sleeve 567b fixed to plate 569. A weight 537 is fixed to the upper end of each stop member to return them to their lowermost position. Discs 171 are supported on the lower flange of the recesses 565a, once the lifters 562 are retracted; and discs 171 are moved lengthwise along the rails 565 from right to left as viewed in FIG. 15 to the disc transfer conveyor 600. The conveyor 560 includes a pair of endless chains 576, the rollers of which move along the edges of guide members 569 and 578. Links 577a extend outwardly from chains 576, and carry downwardly extending pins 577 that are spaced in side by side relationship with respect to one another by a distance less than the diameter of discs 171 when the pins 577 traverse the area between recesses 565a. Chains 576 are trained about idler sprockets 594 and 595 at the right hand end of plates 578, as viewed in FIG. 15, and after the discs 171 have been positioned in recesses 565a and the lifter 562 retracted, the pins 577 contact the discs at their downstream portion and transfer them along the recesses 565a to the outlet end of linear conveyor 560.

Chains 576 are driven by sprockets 591 and 595 at the left hand end of plates 578, as viewed in FIG. 15, with sprocket 591 being driven by a chain 590 from a sprocket 602' carried by a vertical shaft 602a, which also drives conveyor 600. Tension is maintained in chain 590 by a idler sprocket 590b mounted on the end of an adjustable arm 590a. A spur gear 593a is mounted on shaft 592 and drives spur gear 593b, coaxially mounted with sprocket 595', to provide timed motion of the chains 576.

Final Bottom Disc Conveyor

The conceyor 600 may be best understood from FIGS. 15 and 21 and is comprised of two vertically spaced endless chains 603a and 603b which are driven by a pair of vertically spaced sprockets (not shown) on shaft 602a below sprocket 602, and which are guided for movement around a rectangular path by pairs of vertically spaced idler sprockets 609, 611, and 612. One side of the rectangular path of conveyor 600 is colinear with a portion (the outlet end) of conveyor 560, while the opposite side of the path of conveyor 600 is colinear with main conveyor 250.

A plurality of pick-yp heads 601 are carried by chains 603a and 603b for picking up discs from linear conveyor 560, transporting the discs to main conveyor 250, and serially transferring the discs to the bottom of forming mandrels 142. Pick-up heads 601 are carried at the upper end of a vertically disposed carrier rod 605, and rods 605 are each slidably mounted within a vertical bore in a support member 604. Support members 604 have inwardly facing lugs 604a and 604b that are spaced by a distance corresponding to the spacing between chains 603a and 603b, and rollers (not shown) are mounted in lugs 604a and 604b and are driven by chains 603a and 603b, respectively.

Support members 604 derive support from a fixed horizontal frame member 615 through track members 616 that are bolted to member 615 and which extend outwardly from the edges thereof. Track members 616 are provided with an upwardly facing guide track 617 and an outwardly facing guide track 618 that receive, respectively, downwardly extending rollers 619 and inwardly extending rollers 620 on support member 604.

The structure of pick-up heads 601 can be best understood from a consideration of FIGS. 22 and 23. Pick-up heads 601 include a horizontally disposed surface 601c adapted to support a disc 171 and surface 601c includes arcuate portions at the leading and trailing edes that are connected by generally straight sides edges (FIGS. 23). A flange 601a extends upwardly from the acruate leading edge while a further flange 601b extends upwardly from the trailing edge. The diametric distance between flanges 601a and 601b is slightly in excess of the diameter of disc 171, which is shown in phantom in FIGS. 23. The trailing edge of the heads 601, including flange 601b, is shorter than the leading edge of the head and flange 601a to thereby provide access openings 601d at the trailing edge of the pick-up nmember to accommodate pins 577, as will hereinafter appear. Flanges 601a and 601b cooperate with surface 601c to collectively define a generally cup-shaped receptacle for holding discs 171.

Pick-up members 601 have a central vertical bore 601e (FIG. 22) having a bushing therein, that is received over a reduced diameter upper end of carrier rod 605. A retainr ring 605a is fitted on the upwardly facing shoulder on rod 605 at the lower end of the reduced diameter portion, and a spring 608 extends between ring 605a and a downwardly facing shoulder 601f on each pick-up head to bias the pick-up heads upwardly. An enlarged flange 605b is provided at the upper end of each rod 605 to retain the pick-up members 601 thereon. A cam track 606 is mounted on the machine frame in the colinear area of conveyors 560 and 600, and cam track 606 includes a rise portion that is aligned with discs 171 and heads 106 as they pass through the colinear area. Shaft 605 is provided with a roller 607 at its bottom portion which engages the cam 606, and the rise portion of the cam causes the head 601 to be moved vertically upward to receive the discs 171, the head being returned to its lower position by cam 606 after disc 171 has been received.

Chains 603a and 603b move the raised heads 601 into vertical registry beneath the discs 171 and as the individual discs 171 approach the ends of guide rails 565, the pins 577 push the discs off of tracks 565 and the discs fall so that the leading edge of the disc initially engages the leading flange 601a of the head 601 and then the entire disc falls so that the trailing end of the disc is adjacent flange 601d. As the discs are transferred to the heads 161 they remain under the control of pins 577, which are nested within recesses 601d at the point of transfer. The trailing portion 601b of the head is provided with recesses which accommodate the fingers 577 as a disc 171 is being transferred from the rails to the head during register movement.

After the discs 171 has been received in the recess of the head 601, the disc transfer conveyor 600 moves the heads 601 into the colinear area between conveyors 600 and 250 and into vertical registry with the main conveyor forming mandrels 141. A cam 613 is mounted on the frame of the machine in the colinear area between conveyors 600 and 250, and includes a rise portion aligned with mandrels 141 as they pass through the colinear area. Roller 607 rides within cam 613 to lift the disc carrying head into the disc transfer position shown in FIG. 21 in contact with the bottom of mandrel 141. The head 601 and mandrel 141 move together while in contact, and the bottom disc 171 is transferred to the bottom of the mandrel by means of a vacuum applied to the bottom of the mandrel. The spring 608 cooperates with the camming action to insure a close union between the head 601 and the mandrel 141 during disc transfer.

A pair of vertically spaced tubular vacuum reservoirs 210 and 220 (FIG. 21) are supported on the frame of the machine above the colinear sections of conveyors 250 and 600, and reservoir 220 extends from the colinear conveyor sections essentially through the entire shrink tunnel 600, to be hereinafter described, while reservoir 210 extends only partially through the shrink tunnel. Reservoirs 210 and 220 are connected to a suitable vacuum source (not shown) and are connected, respectively, through elongate slots 211 and 221 with fittings 212 and 222 that extend outwardly from the mandrel support members 252. Fittings 212 and 222 are connected, respectively, to vertical passages 145 and 146 (FIGS. 21 and 26) that extend the entire length of the spindle portion 147 of support member 252. A lateral port 146a (FIG. 26) establishes communication between passage 146 and the space between spindle 147 and the contoured sidewall at the lower end of spindle 141. A plurality of passages 141b are provided in the mandrel sidewall for applying vacuum to the sleeve 118, in the shrink tunnel as will hereinafter appear.

A plug 142 is seated within a downwardly opening recess 143 in the lower end of mandrel 141 and plug 142 includes a passage 142a establishing communication between passage 145 and a plurality of fine vertical passages 144 spaced circumferentially around the plug adjacent the outer diameter thereof. Plug 142 includes a further passage 142b that establishes communication between passage 146 and a plurality of spaced vertical passages 253 in the upwardly dished central portion of plug 142. Passages 253 are somewhat larger than passages 144 to assist in shaping the bottom contour of the cup, as will hereinafter appear. The vacuum drawn through passages 144 applies retentive force to the edges of disc 171, and positively holds the disc on mandrel 141 as head 601 is cammed downward by cam 613.

Shrink Tunnel

Immediately upon receiving the bottom disc 171, the forming mandrels 141 are conveyed through a shrink-tunnel or oven wherein the thermoplastic material is caused to shrink to the contour of the surface of the forming mandrel 141. Referring to FIGS. 11 and 30, the shrink-tunnel 700 includes six longitudinally extending infra-red heaters which are disposed, respectively, along the inside (701a and 702a), outside (701b and 702b), and beneath (703) the path of conveyor 250.

Side heaters 701a and 701b are parallel to the side of the path of the main conveyor 250 at the first half of the shrink tunnel, with the mandrel facing surfaces of the heaters being parallel to one another, to uniformly heat the generally cylindrically shaped sleeve 117 and initially heat the sleeves as they move into the shrink tunnel. As sleeve 117 is heated by heaters 701a and 701b, the lower end portion of the sleeve moves away from each of the heaters inwardly toward the small contoured end of the mandrel 141 so that the upper portion of the sleeve would be heated to a greater extent than the lower portion. As noted above, the taper of the sleeve ranges from 5°-7° at the top thereof and increases to a taper on the order of at least 15° at the bottom. To accommodate for this difference in distance and provide for generally uniform heating, heaters 702a and 702b are canted to assume a position substantially parallel to the mean contour of the forming mandrel 141 so that the distance between the heating elements and sleeve 117 is substantially equal along the second half of the shrink tunnel.

In one shrink tunnel embodiment, good results have been achieved by canting heaters 702a and 702b at an angle of 7½° from the vertical plane. In this embodiment, the heating elements of each canted heater were spaced a perpendicular distance from the stacking shoulder contour on the mandrel 141 substantially equal to the perpendicular spacing of the upstream heaters from the path of conveyor 250. In this embodiment, the upstream bottom heaters were spaced approximately 2 inches lower than the downstream bottom heaters so that the lower portion of the sleeve is not heated sufficiently in the first half of the shrink tunnel to produce premature curling or folding of the sleeve.

The heaters are mounted on an elevator assembly 740 which raises the heaters from a lowered position to an elevated operating position (shown in phantom in FIG. 30) around conveyor path 250 by means of two air cylinders 794 (only one of which is shown in FIG. 30). The heaters are thus adjustable to allow for service of the mandrels in the shrink oven and to provide for start-up and shut-down of the machine.

The heaters are adjustable mounted by two independent but interconnected mounting assemblies 750. Each assembly 750 includes two L-shaped brackets 751 which mount the ends of each of the side heaters to corresponding sets of inverted L-shaped adjustment brackets 752, by bolts 753. Side heaters 701a, 701b, 702a and 702b are secured to their respective brackets 751, as by welding. Brackets 752 are provided with horizontal adjustment slots through which bolts 753 pass so that each side heater may be independently adjusted inwardly and outwardly relative to the mandrel path. Spacers 753a, such as a shim material, may be positioned between the abutting horizontal surfaces of brackets 751 and 752 to provide the desired cant to side heaters 702a and 702b.

Each vertical adjustment bracket 752 has a side plate 752a in abutting relationship to a mounting plate 754, and parallel vertical slots 752b inside plates 752a are each impaled by a bolt 755 to guide brackets 752 for vertical movement relative to plates 754. Brackets 752 are moved by vertical adjustment studs 756, the upper ends of which bear against the lower surface of blocks 757 fixed to the lower portion of side plates 752a. The midportion of each stud 756 is threaded through a block 758 on the vertical surface of plate 754 so that, as each stud 756 is turned, the elevation of heater end thereabove is adjusted.

A longitudinally extending U-shaped channel 760 is centrally located between the brackets 752 of each pair of side heaters, and each channel 760 carries a bottom heater 703. The bottom heaters 703 are located centrally between the upwardly extending legs of channels 760, and to this end, L-shaped adjustment brackets 761 are secured to the ends of channels 760 by bolts 762 that extend through vertical adjustment slots in the vertical portion of bracket 761. The base of each channel 760 is secured to mounting pads 771 at each end by bolts 770, and the mounting pads are in turn fixedly mounted on an inverted U-shaped channel member 772 which extends the full length of the shrink tunnel to provide for conjoint movement of the assemblies 750, as discussed below. Vertical studs 775 are provided for independently adjusting the elevation of bottom heaters 703, and studs 775 are threaded through pads 771 and pass through clearance holes in channels 772 and 760 to bear against adjustment blocks 776 located on the bottom surface of bracket 761 to provide means for adjusting the end of the bottom heaters independently of each other and the side heaters.

The mounting assemblies 750 are positioned between and bear against parallel, vertically extending frame uprights 780 through lever mounted roller assemblies 781 which are provided at each side of opposite end of channel member 772. Each roller assembly includes a pivot block 782 fixedly attached, as by welding, to the bottom surface of the web of channel 772, and a lever 783, pivotally attached to one of blocks 782 by pin 784. Each lever member carries a lateral roller 786 which bears against an upright 780 under the influence of loading spring 785 disposed upwardly from each lever member to contact the lower surface of the web of channel 772. Each loading spring is adjustable by bolt 785a so that the moment and bearing force generated in each roller against upright 780 may be adjusted. The frame uprights are supported by longitudinal channels 787 at the base and top, and the bottom flanges of the base channels are mounted on floor pads 788.

The channel 772 is supported by an air cylinder activated linkage system 799 at each end of the shrink tunnel, and each system includes a connection link 790 mounted to the lower surface of the web of channel 772, a first pair of parallel links 791 pivotally connected at one end to link 790, a second pair of parallel links 792 pivotally attached outboard the ends of links 791, a base link 793 mounted to floor pad 788 and pivotally attached at the other end to links 792. Each linkage system is operated by an air cylinder 794 which is pivotally mounted (not shown) at an angle with respect to base 788. The piston rod 795 of each cylinder is pivotally attached to the linkage system inboard at the joint of links 791 and 792, so that, as the rod 795 is moved outwardly of the cylinder, the linkage system will raise the heaters to the operative position shown in phantom line in FIG. 30.

Shrink tunnel 700 is provided with means for rotating the forming mandrels 141 to assure even distribution of heating. To this end, the edge portion of a horizontal rail 711 engages within recess 251 of the forming mandrel, so that as the mandrel is conveyed through the shrink tunnel the mandrel will rotate about its spindle 147. Rail 711 is preferably formed of a resilient material so that contact is maintained with recess 251. Rail 711 is suspended below frame member 229 from inverted L-shaped brackets 722 by studs 712 and nuts 713, and preferably is coextensive in length with the shrink tunnel.

As the sleeve 117 is being shrunk in the tunnel, the vacuum that is supplied along the contoured surface of the mandrel cooperates with the shrinkage attributable to the heat to cause the sleeve 117 to closely conform to the external contour of the mandrel. As the sleeve 117 shrinks, the lower portion thereof moves inwardly into overlapping relationship with the peripheral edge of the bottom disc 171, while the central portion of the disc is drawn upwardly by the combined action of the heat and the vacuum applied through passages 253.

With the heaters positioned as described above, it has been found possible to produce a temperature differential within the shrink tunnel which enables a unique and highly advantageous container to be produced. Specifically, the combination of the bottom heater and the canted side heaters in the downstream portion of the shrink tunnel, together with the absence of a heater at the upper portion of the shrink tunnel, causes a higher temperature to be present at the upper portion of the shrink tunnel than at the lower portion thereof. As will be explained in more detail hereinafter, this enables a container to be produced which has a sidewall which varies both in density and thickness, the thinnest and most dense region being at the upper end of the sidewall and the thickest and least dense region being at the lower end of the sidewall. Such a container has enhanced strength and stability, as compared to prior art containers, and in fact, enables containers of surprising strength to be formed from thin materials which would ordinarily be expected to produce a structurally unsound container.

Figure 38:
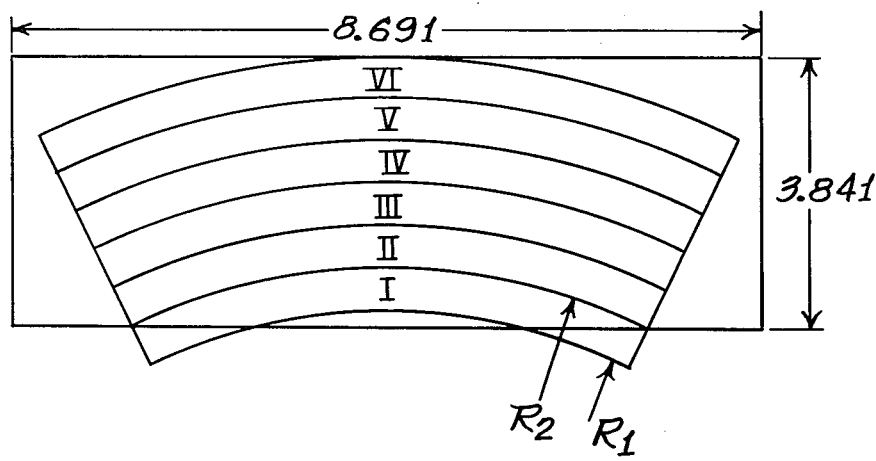
FIG. 38 is a plan view showing a layout of a sidewall blank prior to and after shrinkage.

For purposes of illustration, the sidewall blank for a 6 oz. hot beverage container is shown laid out flat prior to shrinkage in FIG. 38, and superimposed thereon is a flat layout of a sidewall after it has been shrunk on a mandrel of the type described above. Of course, the external surface of the mandrel, if laid out flat, would assume the same configuration of the shrunken container sidewall. The sidewall was formed of 25 mil thick expanded polystyrene of the type set forth above, and was shrunk by moving it through a shrink tunnel as shown in FIG. 30 at a rate of 150 feet per minute. In the shrink tunnel the temperature varied from around 1,350° F in the region adjacent the lower end of the sidewall to around 1,250° F in the region adjacent the upper end of the sidewall.

The shrunken container sidewall was divided into six zones of equal volume, and the geometric details of the sidewall configuration are set forth herebelow in Table 1.

TABLE 1

|  | Original Rectangle Blank 6 Oz. LTC | Frustrum Cone Mandrel | Zone No. 1 | Zone No. 11 | Zone No. 111 | Zone No. IV | Zone No. V | Zone No. VI |
|---|---|---|---|---|---|---|---|---|
| AREA In$^2$. | 33.13 | 27.82 | 3.849 | 4.164 | 4.478 | 4.792 | 5.107 | 5.442 |
| Radius R$_1$ In. |  | 7.184 | 7.184 | 7.824 | 8.464 | 9.104 | 9.744 | 10.384 |
| Radius R$_2$ In. |  | 11.024 | 7.824 | 8.464 | 9.104 | 9.744 | 10.384 | 11.024 |
| Volume In.$^3$ | 0.828 | 0.828 | 0.138 | 0.138 | 0.138 | 0.138 | 0.138 | 0.138 |
| Blank-thickness mils | 25.0 |  | 35.8 | 33.1 | 30.8 | 28.8 | 27.0 | 25.5 |
| Thickness Variation mils |  |  | 10.8 | 8.1 | 5.8 | 3.8 | 2.0 | 0.5 |

It should be noted that the average sidewall thickness varied from 25.5 mils in Zone VI to 35.8 mils in Zone I, and that the sidewall thickness increased continuously and progressively from the upper end to the lower end. The increase in sidewall thickness is caused by not only the geometric area reduction when the cylindrical sleeve shrinks to the configuration of the mandrel, but also by post expansion of the foam wherein heat within the shrink tunnel drives off residual blowing agent in the foam.

Figure 39:
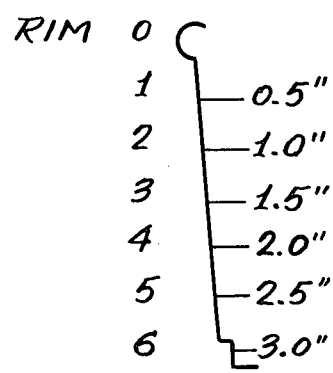
FIG. 39 is a cross-sectional view through a container sidewall which varies in thickness and density.

The sidewall of a 6 oz. container of the type described above is shown in cross-section in FIG. 39, and six positions are identified progressing in ⅛ inch intervals from the rim of the container to the base thereof. The details regarding the thickness and density variations for two such containers are set forth herebelow in Table 2.

Table 2

| Position | Distance from rim in. | Cup Sidewall Thickness mil. | Thickness Variation mil. | Increased Thickness due to Shrinkage mil. | Increased Thickness due to Post Expansion mil. | Density p.c.f. |
|---|---|---|---|---|---|---|
| Sample No. 1 rim | 0 | 25.0 | 0.0 | 0.0 | 0.0 | 11.20 |
| 1 | 0.5 | 36.0 | 11.0 | 0.5 | 10.5 | 8.00 |
| 2 | 1.0 | 39.0 | 14.0 | 2.0 | 12.0 | 7.56 |
| 3 | 1.5 | 43.0 | 18.0 | 3.8 | 14.2 | 7.14 |
| 4 | 2.0 | 45.0 | 20.0 | 5.8 | 14.2 | 7.14 |
| 5 | 2.5 | 47.5 | 22.5 | 8.1 | 14.4 | 7.11 |
| 6 | 3.0 | 50.5 | 25.5 | 10.8 | 14.7 | 7.03 |
| Sample No. 2 rim | 0 | 25.0 | 0.0 | 0.0 | 0.0 | 11.50 |
| 1 | 0.5 | 32.0 | 7.0 | 0.5 | 6.5 | 9.13 |
| 2 | 1.0 | 35.0 | 10.0 | 2.0 | 8.0 | 8.71 |
| 3 | 1.5 | 39.0 | 14.0 | 3.8 | 10.2 | 8.17 |
| 4 | 2.0 | 41.0 | 16.0 | 5.8 | 10.2 | 8.17 |
| 5 | 2.5 | 44.0 | 19.0 | 8.1 | 10.9 | 8.00 |
| 6 | 3.0 | 47.0 | 22.0 | 10.8 | 11.2 | 7.90 |

It will be noted that in Sample 1, the sidewall thickness increased continuously and progressively from a minimum thickness of 25 mils adjacent the rim of the container to a maximum thickness of 50.5 mils adjacent the base of the container, while the density of the sidewall varied continuously and progressively from a maximum of 11.20 lbs/cu.ft. adjacent the rim of the container to a minimum of 7.03 lbs/cu.ft. adjacent the base of the container. A similar result is shown in Sample 2 where the sidewall thickness increased from 25 to 47 mils in progressing from the rim to the base, while the sidewall density decreased from 11.50 to 7.90 in progressing from the rim to the base.

By appropriate selection of processing conditions, i.e., the amount of residual blowing agent in the foam, the temperature conditions within the shrink tunnel, and the time of exposure of the material to heat, the degree of thickness and density variations can be controlled. Desirably, the thickness of the lower end of the sidewall may be increased from about 50 percent to about 125 percent as compared to the thickness of the starting material, while the density at the lower end of the sidewall is decreased from about 25 percent to about 50 percent. It will be noted from Table 2 that a significant amount (greater than 50 percent) of the increase in sidewall thickness is due to post expansion of the foam.

Alternately, the shrink tunnel may also be formed with two sets of heaters disposed to one side and beneath the path of the conveyor 250. Referring to FIG. 24, the shrink tunnel 700' includes longitudinally extending infrared heaters 701' and 702' which are disposed, respectively, along one side and beneath the path of the conveyor 250. Reflector plates 703' located opposite heater 701' and reflector plates 704' located above heater 701' are designed to contain and reflect the infrared heating rays emitted from the heaters. Reflector plates 704' are mounted to a frame member 720' by insulators 705' which are secured to frame brackets 719' by bolts 706'. Reflector plates 703' are mounted to vertical support member 707' by insulators 708' and bolts 709'. The apparatus for rotating the mandrels 141 and supplying vacuum thereto are the same as shown in FIG. 30 and are correspondingly numbered

Bottom Forming Station

Referring to FIG. 11, after the sleeve 117 has been shrunken to the contour of the forming mandrel 141, the mandrels are conveyed to the bottom forming station 800 at the right-hand turn of the main conveyor where the bottom disc 171 and sleeve 117 are joined to provide a liquid-tight seal.

Figure 25A:
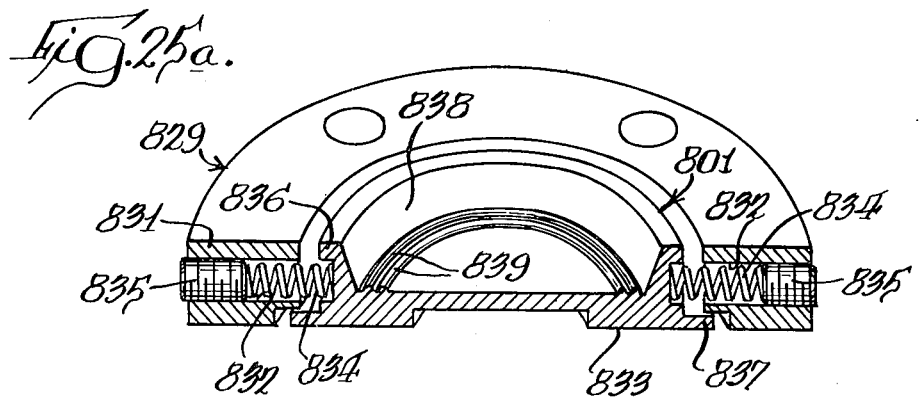
FIG. 25a is a plan view of the bottom sealing head.

The seal between the overlapping edge portion 117b of the sleeve and the peripheral edge of the disc 171 is effected by a heated die 801, as shown in FIGS. 25 and 25a. Dies 801 are mounted for vertical movement relative to a horizontal turret 802 that is connected for rotation with shaft 810 by a key 811. To this end, a plurality of vertical die support posts 803 are mounted for vertical movement within sleeves 821 that are secured at circumferentially spaced positions around turret 802. Sleeves 821 are located on a common diameter, and in vertical registry, with mandrels 141 when the mandrels move into the bottom forming station.

A cam track 804 is secured to frame structure 822, and a cam 804a is secured to the lower end of rod 803 and engages cam track 804. Cam track 804 has a rise portion which moves the heated dies 801 upwardly into engagement with inwardly extending sidewall portions 117b as the mandrels 141 traverse the right-hand end turn of the main conveyor.

Each die 801 is spring biased upwardly by a spring 820 that extends between an annular spring regainer 825 fixed to rod 803 and a spring seat in the lower portion of the die. A guide pin 826 is fixed to retainer 825 and is slidably received within a downwardly opening passage 827 in the die to assist in guiding the die for vertical movement relative to the retainer 825.

Die 801 consists of a heater element 828 and a sealing head 829 that is secured to the upper surface of heater 828. The heater 828 includes a central bore that is slidably positioned over the upper end of rod 803, and which is retained thereon by an adjustment nut 830 that is connected to the upper end of rod 803.

Sealing head 829 includes an outer annular ring 831 having a plurality of pairs of diametrically opposed radial passages 832, as can be best seen in FIG. 25a. A forming member 833 is positioned centrally of ring 829, and is floatingly mounted and centered relative thereto by springs 834 that are received in passages 832. Springs 834 react between set screws 835 threaded into the outer ends of passages 832 and the outer sidewall of forming member 833 to resiliently maintain the forming member in a centered position. The inner end of springs 835 are retained by flanges 836 and 837 on opposite sides of the forming member 833.

The forming member 833 is provided with an upwardly facing generally frusto-conically shaped recess 838 which has a contour which conforms with the desired final configuration of the lower portion of the cup. A plurality of upwardly extending annular ribs 839 are provided on the base of recess 838 to provide corresponding annular rings in the bottom portion of the formed container.

Forming member 833 is heated by conduction through heater 828, which in the illustrated embodiment is an electric heating element that is powered by wires 818 which entend through the center of shaft 810, and contact brushes 819 to receive electrical power. As a result of the heat and pressure caused by the aforedescribed die 801, a liquid-tight seal is produced between the bottom disc 171 and the inwardly extending lower portion 171 of the sleeve.

As each mandrel 141 and die 801 approach the end of the right-hand turn, the die is cammed downwardly out of contact with the mandrel 141, and the mandrels proceed to the rim forming station 900.

Rim Forming Station

After the sleeves 117 have passed through the bottom forming station, they are complete except for the formation of the curled top rim. The details of the specific rimming mechanism that is utilized at the rimming station is not critical to the present invention and several techniques known to those skilled in the art may be employed. One such technique will be described generally herein.

A separate conveyor is provided at the rimming station, as is evident from FIG. 11. The mechanism for ejecting the non-rimmed cups from the main conveyor 250 and depositing the cups on the rimming conveyor can be best understood from FIGS. 26 and 27. As shown therein, a cup ejector mechanism 910 is mounted adjacent the path of travel of main conveyor 250 and includes an ejector member 911 that is movable downwardly into engagement with sleeve 277 to strip the non-rimmed cup from the forming mandrel 141. Member 911 is in the form of a roller that is carried at the outer eccentric end 912 of a shaft 913 that is rotatably mounted in a bearing block 914. A right angle gear box 915 is supported from the frame of the machine by a bracket 916 and rotates shaft 913 from a sprocket 917. Sprocket 917 is driven from a chain 918 and a drive sprocket 919 and is synchronized with the drive to the rimming conveyor.

The rimming conveyor includes a plurality of spaced cup holders 920 (FIG. 21) that are advanced into vertical registry with the mandrels 141 as the shaft 913 rotates roller 911 into engagement with the upper surface 277a of sleeve 277. Sleeve 277 moves downwardly and the lower surface 277b thereof lowers clamping ring 143 to a reduced diameter portion of the mandrel to release the sleeve. Surface 277b then engages the upper edge of the cup sidewall to positively strip the container from the mandrel 141. Positive pressure may be applied through passages 145, 146, 141b, 144 and 253, to assist in freeing the container from the mandrel, if desired.

Cup holders 920 are conveyed at the same linear speed as mandrels 141, and are positioned in close vertical proximity to the bottom of the mandrels so that th stripped cups fall downwardly directed into the holders. Holders 920 have a frustoconically shaped interior which supports the upper edge of the cup in a position to be rimmed. The rimming conveyor then transports the holders 920 past a rimming die 922, and relative movement is effected between the rimming die 922 and the holder 920 to form a curl at the upper edge of the sidewall of the cup. The process of the present invention is then completed by removing the rimmed containers from the rimming conveyor, and this can be accomplished by conventional techniques not important to the present invention.

Second Embodiment of Bottom Disc Cutting And Transfer Mechanism

FIGS. 31-37 illustrate mechanism 1000 for simultaneously punching two bottom discs from two web stocks and transferring the disc serially to the bottom of the mandrel which may be substituted for the bottom disc cuttig station 500, initial bottom disc conveyor 560, and final bottom disc conveyor 600 described above. It is a simple mechanism in that it utilizes only one conveyor to transfer the disc to the mandrels. As previously described, the bottom disc 171 used to form the base of the finished cup, are cut, two at a time, from two continuous webs of thermoplastic material 501. The webs of bottom stock 501 are mounted in similar fashion on spools 501a with their axis of rotation perpendicular to the main conveyor 250. The webs of stock 501 are fed inwardly toward one another and other inclined rollers 502 which change the direction to feed perpendicularly to the original direction, thus directing the web stocks parallel to one another and into the disc cutting station.

Referring to FIG. 31, bottom web stocks 501 are pulled from right to left by a pull roller assembly 1001 (hereinafter discribed in detail) that is mounted in spaced relationship to a punch mechanism 1002. Web stocks 501 are unsupported between punching mechanism 1002 and pull roller assembly 1001 and thus sag downwardly to form supply loops. Arcuate guide tracks 1004 and 1005 are positioned, respectively, adjacent the exit of pull roller assembly 1001 and the entrance of punching station 1002 and provide smooth guide surfaces which direct the web stocks into the punching mechanism.

The web stocks are intermittently fed into the punching station 1002 by a feed roller assembly 1010 (also hereinafter described in detail) positioned adjacent guide tracks 1005, and during the dwell periods of the intermittent feed, disc 171 are severed from the stock webs 501 by a reciprocating cutting mechanism hereinafter described. In order to maintain proper tension in the webs 501 as they are fed, two spring loaded tensioner assemblies 1199, similar to assemblies 566 described above, are provided. The scrap webs that remain after the bottom discs have been severed are supported on a horizontal guide plate 1011 and directed about a cylindrical member 1012 positioned above guide plate 1011 to direction the waste stock upwardly for suitable disposal, such as rewinding on spools 501b, as previously described.

After bottom discs 171 have been severed from the web stocks, each disc is transferred downwardly into a recessed pickup head 1220 which is tangentially carried on a disc transfer conveyor 1020. Transfer conveyor 1020 comprises an endless chain that travel in a clockwise direction, as viewed in FIG. 31 from the top, around a generally flattened elliptical path to transport the discs to the main conveyor 250, where they are deposited on the bottom of the forming mandrels 141.

Power input is provided to the mechanism 1000 from he main conveyor drive shaft which extends longitudinally of conveyor 250. To this end, a bevel gear 1021 (FIG. 31) is keyed to the main drive shaft and meshes with a right angle bevel gear 1022. Bevel gear 1022 is keyed to one end of a shaft 1023 extending transfersely of main conveyor 250 and mounted to the frame base by means of bearing block 1024. The other end of shaft 1023 is coupled to a spider gear box transmission 1025 by means of coupling 1026. Transmission 1025 provides a means for increasing and decreasing the drive speed to allow proper synchronization of the transfer conveyor 1020 to the main conveyor 250. Transmission 1025 is mounted on a frame plate 1027 and is joined to one end of a second shaft 1028 by coupling 102. Shaft 1028 is rotatably mounted by bearing 1030, which is attached to base plate 1027. The opposite end of shaft 1028 carries a bevel gear 1031 which meshes with a further right angle bevel gear 1032 to transmit the power input to a gear train assembly 1043.

The gear train assembly 1043 is best understood with reference to FIG. 34 with illustrates that gear 1032 is attached to one end of a drive shaft 1033, which is mounted on frame base 1027 by means of spaced apart bearing mounts 1034 and 1035 so that shaft 1033 is positioned parallel to the straight run portions of the main conveyor 250. The opposite end of shaft 1033 is provided with a spur gear 1036 that drives an intermediate transfer gear 1037 which is mounted on the end of an idler shaft 1038 extending between upright supports 1039 and 1040 of the machine frame and rotatably mounted therein by means of bearings 1041. Bearings 1041 are secured to vertical, spaced apart mounting plates 1042 which are attached to the interior surfaces of uprights 1039 and 1040. Transfer gear 1037 meshes with gear 1045 mounted at the end of a main drive shaft 1046 which is rotatably mounted in plates 1042 by means of bearings 1050 and which provides power input to the pull roller assembly 1001, feed roller assembly 1010 and punching mechanism 1002, as will be described below.

Drive input for pull roller assembly 1001 is provided by means of a sprocket 1051 keyed to main drive shaft 1046. Sprocket 1051 drives an endless chain 1052, FIG. 31, which is trained about a driven sprocket 1053 at the pull roller assembly, FIGS. 31 and 35. A frame-mounted idler sprocket assembly 1054 (FIG. 31) engages the upper reach of chain 1052 to provide proper tension therein.

Pull roller assembly 1001 can be best understood with reference to FIG. 35. Pull roller assembly 1001 comprises two pairs (one for each web stock) of vertically aligned rollers. Each pair of rollers includes an upper roller 1061 which is cylindrical in shape and covered with a coating 1062 of a resilient material such as neopene and a lower roller 1063 which is also cylindrically shaped. Upper rollers 1061 are mounted in spaced apart relationship on a common drive shaft 1064. Each pair of rollers is contained within a box shaped housing 1065 which is attached at its upper surface to a horizontal frame plate 1066. Housings 1065 are suitably apertured to permit shaft 1064 to extend therethrough and the shaft is rotatably mounted in the outer vertical walls thereof by means of bearings 1067. Shaft 1064 extends beyond bearings 1067 to mount spur gears 1068 at each end thereof. Sprocket 1053 is mounted adjacent the right-hand gear 1068, as viewed in FIG. 35, so that shaft 1064 is driven by chain 1052.

The lower pull rollers 1063 are each mounted on independent idler shafts 1070. Each idler shaft 1070 is rotatably mounted at each end by a bearing 1071 carried in a vertically movable slide block 1072 on either side of the lower pull roller. The slide blocks 1072 of each pull roller are joined at their lower ends by means of a cross plate 1073 to form a V-shaped slide member. An air cylinder 1075 is mounted in upwardly facing orientation in the lower horizontal member 1074 of housing 1065 and a piston rod 1076, extending upwardly therefrom, is attached to plate 1073 so that as piston rod 1076 is moved upwardly or downwardly under the influence of compressed air, the lowr pull rollers 1063 may be moved into and outer of engagement with their associated upper pull rollers 1061.

Each shaft 1070 mounts a driven spur gear 1077 at its outer end which meshes with gear 1068 on the upper roller shaft 1064 to provide for conjoint rotation of the upper and lower pull rollers. From the above description, it will be appreciated that the upper pull rollers are driven continuously by chain 1052, and, as will be described below, the feed roller assembly 1010 intermittently advance the web stocks 501. To maintain the supply loop on each web at a proper length, two pairs of photoelectric sensors 1080, FIGS. 31 and 34, are provided to sense the length of the supply loops, and sensors 1080 control suitable valve means, as is known in the art, to supply compressed air to cylinders 1075 to cause the lower rollers to be brought into and out of engagement with the upper rollers in response to the changes in the length of the supply loops.

Web stocks 501 are intermittently fed through the cutter station by means of feed roller assembly 1010 (FIGS. 31 and 36) which is constructed in a similar fashion to pull roller assembly 1001 and corresponding parts are similarly numbered thereon. Power input to the feed roller assembly is provided by a sprocket 1100 keyed to drive shaft 1046 adjacent the left-hand bearing 1050, as viewed in FIG. 34. Sprocket 1100 drives an endless link chain 1101 which is trained about a driven sprocket 1102, which corresponds in function to the previously described sprocket 1053, on upper feed roller shaft 1064. An idler assembly 1103 (FIG. 34) is also provided for adjusting the tension in chain 1101.

Referring specifically to FIG. 36, it will be seen that, unlike the pull roller assembly, both the upper and lower feed rollers are provided with a resilient coating 1105, 1106 on the upper and lower rollers, respectively. Coatings 1105 and 1106 have circumferentially spaced portions of different thickness to provide feed and dwell segments for intermittently advancing the web stocks to the punching mechainsms. Air cylinders 1075 of the feed roller assembly normally bias the lower feed rollers upwardly to a drive position so that both the upper and lower rollers are continuously rotated during bottom disc cutting operations. These air cylinders are designed to retract the lower feed rollers downwardly to provide access to the nip between the feed rollers when a new stock web is threaded into the machine.

Discs 171 are severed from web stocks 501 by the cooperative action of vertically movable cutters 1110 and fixed dies 1111, best seen in FIGS. 31 and 37. Dies 1111 include a cylindrical central bore 1112, and cutters 1110 are cylindrical in external configuration and guided within bores 1112. Web stocks 501 are guided along a horizontal path by means of spaced guide plates 1115 positioned at the output of the feed roller assembly 1010 and a horizontal plate 1011 which is spaced from guide plates 1115. Dies 1111 are positioned with their upper surfaces immediately below the horizontal path of the stock webs between guide plates 1115 and 1011, FIG. 37. In this manner, the upper surface of the die acts as a guide surface for the stock webs as they pass across the dies. The outer lower facing edge of cutters 1110 cooperate with the inner upwardly facing edge of dies 1111 to effect a shearing action upon the web 501, when the cutters 1110 are moved downwardly to punch a disc from the stock web.

Each cutter 1110 is in the form of a vertically elongated cylinder, which is slidably mounted within the bore of a cylindrically shaped guide member 1120, FIG. 33. Guide members 1120 are fixedly positioned in a top frame plate 1121 extending between spaced frame uprights. In this manner, each cutter 1110 is constrained for vertical movement perpendicular to the path of the web stocks 501. Each cutter 1110 includes a central bore 1122 and a counterbore 1123 at its lower end. An elongated control rod 1125 is slidably positioned within each bore 1122 and guided by bearings 1126 at the upper and lower ends of bore 1122. Each rod 1125 extends beyond the upper and lower ends of its respective cutter 1110 and a disc transfer member 1130 is mounted at the lower end of control rod 1125.

Disc transfer member 1130, best seen in FIG. 37, includes a circular flange 1131 and a downwardly extending cylindrical shaped hub 1132. The outer diameter of portions 1131 is less than the inner diameter of counterbore 1123 so that the transfer member can be nested therewith during the web cutting operation.

The cutter 1110 and disc transfer member 1130 are reciprocated vertically by means of a rocket arm assembly driven from shaft 1046. To this end, the upper portion of each cutter 1110 is provided with vertically spaced flanges which define therebetween an annular U-shaped horizontal recess 1140. FIG. 31. Each cutter is reciprocated by a rocker arm 1141, FIGS. 31 and 32, which is pivotally mounted at its mid-portion to a pivot mount 1142 by means of a stub shaft 1143. Rocker arm 1141 includes a clevis portion 1145 which carries rollers 1146. Rollers 1146 at the interior facing portions thereof. Rollers 1146 slide within annular portion 1140 so that as rocker arm 1141 is pivoted about shaft 1143, the associated cutter 1110 is moved vertically into and out of engagement with the web stock to sever a disc therefrom. Rocker arm 1141 includes a connecting arm portion 1147 that extends rearwardly from shaft 1143 and which is pivotally connected to a vertically extending connecting rod 1150.

Referring to FIG. 34, the upper end of each connecting rod 1150 is provided with a U-shaped yoke 1151 in which arm portion 1147 is received and pivotally attached by means of pin 1152. The lower end of rods 1150 are attached to the follower 1154 of an eccentric 1155, which is keyed to shaft 1046. It will be understood that the throw of eccentric 1155 is sufficient to move the cutters from a clearance position disposed above the level of the upper surface of the web stocks to a lower position below the plane of the web stocks, as illustrated in FIG. 37, whereby a disc is severed from the web stock.

Central rods 1125 extend upwardly beyond clevis portions 1145 and the two rods are interconnected by means of a horizontal plate 1170, FIG. 33. In this manner, the reciprocation of plate 1170 produces corresponding reciprocation of each of the transfer elements 1130. To this end, a second rocker arm 1175 is provided, which is generally H-shaped, as viewed in FIG. 32, which is keyed to a stub shaft 1176 at its central portion. Shaft 1176 is mounted above the elevation of stub shaft 1143 by two spaced apart vertical extensions 1178 of mount 1142. The bifurcated forward end of rocker arm 1175 carries outwardly facing rollers 185, FIG. 33. Rollers 1185 are received in U-shaped horizontal passages defined by blocks 1186, which are secured to the upper surface of plate 1170 by bolts 1187.

Rocker arm 1175 is biased in a clockwise direction, as viewed in FIG. 31, by means of a compression spring 1183 concentric with a vertical rod 1180 which is slidably positioned at its lower end within a bore defined in plate 1121 and pivotally attached at its upper end between the forwardly facing legs of rocker 1175 by means of pin 1182. Spring 1183 bears against the upper surface of plate 1121 at its lower end and against an adjustable block 1184 at its upper end. Block 1184 is adjustable along the length of rod 1180 to provide varying degrees of biasing force against pin 1182 to return the transfer members 1130 to a nested position within recesses 1123.

Referring now to FIG. 34, the bifurcated rearward end of rocker arm 1175 is pivotally connected to a vertical rod 1190, which includes a T-shaped journal portion at its upper end to receive a pivot pin 1191 therein. Rod 1190 is adapted for vertical reciprocating movement by means of a follower assembly 1195 attached to the lower end thereof, which is similar to that previously described in connection with the lifter assembly, shown in FIG. 17, and includes a journal portion 1196 having a vertically elongated passageway which embraces shaft 1046. A roller 1197 extends laterally outwardly from the follower assembly and engages an eccentric cam 1198 which is keyed to shaft 1046, and cam 1198 moves the rod 1190 upwardly against compression spring 1183 to move the disc transfer element 1130 in timed relationship with the movement of cutters 1110.

As previously described, in relation to eccentric cam 564, the cam 1198 may be formed with a 110° simple harmonic rise to move the transfer elements 1130 downwardly in timed relationship with the downward movement of cutters 1110, it being understood that the throw of cam 1198 is sufficiently in excess of the cutter eccentric 1115, so that after discs have been punched from the webs, and depressed slightly into the dies; transfer elements 1130 move downwardly to transfer the discs through the cutter dies and into a pick-up head, to be described below. The fall portions of cam 1198 is sufficient for compression spring 1183 to return the transfer members 1130 to a retracted position within the counterbore of cutters 1110 so that the transfer elements are in a clearance position for the next subsequent severing operation.

The bottom disc transfer conveyor 1020 may be best understood with reference to FIGS. 31 and 33 and is comprises of two vertically spaced, endless chains 1200 and 1201 which travel about two pairs of vertically spaced sprockets 1202 and 1203 along substantially straight run paths therebetween. Sprockets 1202 are driven sprockets and are keyed to a vertical drive shaft 1205, and sprockets 1203 are driven sprockets and are keyed to a vertical stub shaft 1206. Each shaft 1205 and 1206 is rotatably mounted on a horizontal plate 1207 by means of a pair of bearings 1208. Plate 1207 is supported at its lower surface by a vertical plate 1209 which extends transversely of the transfer conveyor and which is in turn supported on a second horizontal plate 1210 spaced vertically below plate 1207. Plate 1210 is supported from beneath at two, laterally spaced apart, locations on the upper surfaces of a pair of L-shaped plates 1211 extending toward the main conveyor 250 from the frame uprights. One side of the straight run path of chains 1200 and 1201 is colinear with and below the elevation of cutter dies 1111. The other straight run path of the conveyor is colinear with and below the path of the mandrels 141 carried on the main conveyor 250.

A plurality of pick-up heads 1220 are carried by chains 1200 and 1201 for receiving discs from the transfer member 1130, transporting the discs to the main conveyor 250 and serially transferring the discs to the bottom of the forming mandrels 141. Pick-up heads 1220 are each carried at the upper end of a vertically disposed carrier rod 1225, and rods 1225 are each slidably mounted within a pair of coaxial, vertically spaced, bores defined in a support member 1226. Support members 1226 have inwardly facing lugs 1227 that are spaced by a distance corresponding to the vertical spacing between chains 1200 and 1201 and rollers (not shown) are mounted in lugs 1227 and are driven by chains 1200 and 1201.

Support members 1226 derive support from two vertically disposed gide members 1230 and 1231. Guide member 1230 is fixedly attached to plate 1207 by means of bolts 1232. Guide member 1230 is provided with an upwardly facing guide track 1233 and an outwardly facing guide track 1234 that receive, respectively, a downwardly extending roller 1235 and an inwardly extending roller 1236 on support member 1226. Guide track member 1231 is fixedly attached to plate 1210 by means of bolts 1237. Guide track member 1231 is provided with an upwardly facing guide track 1240 and an outwardly facing rising-falling cam track 1241 that receive, respectively, downwardly extending roller 1242 on support member 1226 and an inwardly extending roller 1245 mounted at the lower end of rod 1225.

Power input for transfer conveyor 1020 is provided from shaft 1033, FIG. 34, by means of a sprocket 1250 keyed to shaft 1033 between bearing mounts 1034 and 1035. An endless link chain 1251 is trained about sprocket 1250 and about a driven sprocket 1255, FIGS. 31 and 34, and engages an idler assembly 1256. Sprocket 1255 drives a right-angle gear box 1260 whose output shaft is connected to shaft 1205 by coupling 1261 to provide continuous power input to the drive sprockets 1202. Gear box 1260 is mounted at its upper surface on a plate 1265, which is attached to the lower surface of frame member 1210.

The structure of pick-up heads 1220 can best be understood from a consideration of FIG. 37. Each pick-up head 1220 includes a horizontally disposed dish shaped member 1280 which has a central bore 1281 corresponding in diameter to rod 1225. An integral sleeve 1282 extends downwardly from the lower surface of each dish shaped member 1280 to slidably mount the members on rods 1225. A compression spring 1285 is positioned coaxially about each sleeve 1282 and bears against the lower surface of member 1280 at its upper end and against the upper surface of an annular collar 1286, which is fixedly attached to rod 1225 at its lower end. In this manner, dish-shaped 1280 is slidably mounted and biased upwardly upon the upper end of rod 1225. Sleeves 1282 are provided with a vertical cut-out 1287 which opens to the lower end of the sleeve and receives a pin 1288 extending outwardly from rod 1225 to prevent relative rotation between member 1280 and rod 1225.

A disc carrying member 1290 is positioned within a recess 1289 in the upper surface of each dish shaped member 1280. Members 1290 are generally cylindrical in shape and the outer diameter is less than the inner diameter of the recess 1289 so that the member 1290 may be partially received therein. The upper surface of member 1290 defines a counterbore 1291 in which the discs 171 are received from the transfer member 1130. The counterbore 1291 has tapered sidewalls to guide the discs 171 to the center of the disc carrying member 1290 as they are received. As best illustrated in FIGS. 33 and 37, member 1290 is mounted on a vertically disposed slide rod 1295 which is slidably received within a bore in rod 1225. Each member 1290 is secured to slide rod 1295 by means of bolt 1296 and a comparison spring 1300 is positioned coaxially about rod 1295 with the upper end of the spring engaging the lower surface of member 1290 and with the lower end of the spring being supported in a counterbore in rod 1225 to thereby bias members 1290 upwardly relative to rods 1225. The spring biasing of members 1280 and 1290 operated to prevent any damage when the pick-up heads 1220 mechanically engage the bottom of forming mandrels 141 (see FIG. 31).

Referring to FIG. 31, in summary, web stocks 501 are pulled from right to left by pull roller assembly 1001 mounted in spaced relathip to punch mechanism 1002. The stocks 501 are unsupported between the punch mechanism 1002 and assembly 1001 and thus sag downwardly into arcuate guide tracks 1004 and 1005 to form supply loops. Web stocks are intermittently fed to punch mechanism 1002 by feed roller assembly 1010, and during the dwell period of the intermittent feed, discs 171 are severed from stocks 501. Discs 171 are severed from stock webs 501 by the cooperative action of vertically movable cutters 1110 and fixed dies 1111. Disc transfer member 1130 follows cutters 1110 to transfer the discs 171 downwardly into pick-up heads 1220.

Transfer conveyor 1020 carries a plurality of pick-up heads 1220 on vertically spaced endless chains 1200 and 1201. The chains 1200 and 1201 travel about vertically spaced sprockets 1202 and 1203 and along substantially straight run paths therebetween. Along one of the substantially straight run paths, pick-up heads 1220 move into vertical registry with disc transfer members 1130 to receive discs 171 therefrom. During this straight run path of chains 1200 and 1201, cam track 1241 (FIG. 33) is in its lowermost portion and dish-shaped members 1280 and disc carrying members are supported by springs 1285 and 1300 respectively. Along the other substantially straight run path of chains 1200 and 1201, pick-up heads 1220 move into colinear registry with the forming mandrels 141. At this time, guide track 1240 (FIG. 33) serially raises each rod 1225 to cause the upper surface of dish member 1280 to engage the lower edge of the container sidewall and the disc carrier 1290 moves upwardly to present the disc 171 to the bottom of the forming mandrel 141. The tapered sidewalls of counterbore 1291 slidably receive the bottom of forming mandrels 141 therein. As the pick-up head and mandrel move together while in contact the bottom disc 171 is transferred to the bottom of the forming mandrel 141 in a similar manner as described above.

The invention, and operative embodiments thereof, have been described above in terms sufficiently full, clear, concise and exact as to enable any person skilled in the art to make and use the same. It is to be understood, however, that it is within our contemplation that certain modifications of the above-described mode or practicing the invention can be made by a skilled artisan without departing from the scope of the invention and it is, therefore, desired to limit the invention only in accordance with the appended claims.

We claim:

1. Apparatus for forming a sheet of thermoplastic material into a cylindrical sleeve comprising: a generally cylindrical shaped rotatable support having said sheet of material wrapped therearound so that one end portion overlaps an underlying end portion; vacuum means on said support for holding said underlying end portion thereagainst, a nip roller for holding said overlapping end portion against said support such that the facing surfaces of said end portions are capable of being spaced from each other, pneumatic heating means disposed adjacent said support and having an outlet directed toward said overlapping end portion for separating the overlapping end portion from the underlying end portion to apply hot air against the facing surfaces of said end portions, whereby said facing surfaces are softened; a reciprocable sealing bar mounted adjacent said heating means between said vacuum means and said nip roller; and means for moving said sealing bar into engagement with the overlapping end portion to compress the softened surfaces against one another and form a seam and thereby complete a sleeve.

2. Apparatus according to claim 1 wherein said heating means includes a source of hot air, means communicating with said source and defining an elongated vertical chamber located adjacent said support; elongated nozzle means communicating with said chamber and providing said outlet adjacent said end portions, whereby said nozzle directs said heated air against said facing surfaces.

3. Apparatus according to claim 2 wherein said chamber defining means includes an opening facing away from said cylindrical sleeve and further comprising selectively operable means for covering and uncovering said opening.

4. Apparatus for forming a sheet of thermoplastic material into a cylindrical sleeve comprising: a generally cylindrically shaped support having said sheet of material wrapped therearound so that one end portion overlaps an underlying end portion; heating means adjacent said support, said heating means having a source of hot air, means communicating with said source and defining an elongated vertical chamber located adjacent said support; said heating means having an elongated outlet nozzle communicating with said chamber and directed toward said overlapping end portion for separating the overlapping end portion from the underlying end portion to apply hot air against the facing surfaces of said end portions, whereby said facing surfaces are softened; said chamber defining means having an opening facing away from said cylindrical sleeve and selectively operable means for covering and uncovering said opening; said covering and uncovering means having (1) a cover pivotally attached to the upper portion of said chamber defining means, said cover being adaptable to close said opening and thereby cause hot air to flow outwardly of said nozzle, and (2) linkage means to operate said cover including a horizontal link pivotally attached to said cover at one end; a vertical link pivotally attached at its upper end to the other end of said horizontal link; means biasing said vertical link downward thereby urging said cover into an open position; a pivotally mounted lever attached at one end to the lower end of said vertical link and having a cam follower at the other end thereof; a continuous rising falling cam engaging said cam follower; means for effecting relative movement between said cam and cam follower, whereby said cover may be closed to selectively direct hot air to said nozzle; a sealing bar mounted adjacent said heating means; and means for moving said sealing bar into engagement with the overlapping end portion to compress the softened surfaces against one another and for a seam and thereby complete a sleeve.

5. Apparatus according to claim 4 in which said horizontal link is pivotally attached to a slide member, said slide member being mounted coaxially on the upper end of said vertical link; and further comprising an adjustment collar threaded to the upper end of said vertical link above said slide member; and means biasing said slide member against said adjustment collar, whereby the length of time said cover is opened may be adjusted.

6. Apparatus according to claim 4 wherein said cam follower is essentially spherical in shape and said cam defines an arcuate cross-section cam track complementary to said spherical shape.

7. Apparatus according to claim 1 wherein said moving means includes a rod having said sealing bar at one end thereof; a cam follower rotatably mounted at the other end of said rod; means for biasing said rod radially outwardly from said generally cylindrically shaped support to space said sealng bar from said support; cam means adapted to move said rod radially inwardly toward said support, whereby said sealing bar engages said overlapping end portion and means for effecting relative movement between said cam means and said cam follower.

* * * * *

UNITED STATES PATENT OFFICE
CERTIFICATE OF CORRECTION

PATENT NO. : 4,053,346
DATED : Oct. 11, 1977
INVENTOR(S) : Amberg et al.

It is certified that error appears in the above-identified patent and that said Letters Patent are hereby corrected as shown below:

Col. 1, Line 54, change "fabrication" to --fabricating--.
Col. 3, Line 21, change "whilt" to --while--.
Col. 5, Line 7, change "plane" to --plan--.
Col. 9, Line 43, change "orifice" to --surface--.
Col. 13, Line 5, change "(9 O'Clock position)" to --("9 O'Clock" position)--.
Col. 13, Line 8, change "(6 O'Clock" position)" to --("6 O'Clock" position)--.
Col. 13, Line 12, change "(3 O'Clock position)" to --("3 O'Clock" position)--.
Col. 18, Line 46, change "grooves" to --groove--.
Col. 19, Line 5, after "and", delete "a".
Col. 19, Line 36, change "nozzles" to --nozzle--.
Col. 21, Line 4, change "439" to --429--.
Col. 21, Line 34, change "439" to --429--.
Col. 22, Line 46, change "sppls" to --spools--.
Col. 23, Line 26, change "525" to --526--.
Col. 26, Line 33, change "discs" to --disc--.
Col. 27, Line 18, change "conceyor" to --conveyor--.
Col. 27, Line 29, change "pick-yp" to --pick-up--.
Col. 27, Line 33, change "142" to --141--.
Col. 27, Line 33, after "are" add -- each--.
Col. 27, Line 64, change "nmember" to --member--.
Col. 28, Line 4, change "retainr" to --retainer--.
Col. 28, Line 14, change "106" to --601--.
Col. 34, Line 26, change "regainer" to --retainer--.
Col. 34, Line 62, change "entend" to --extend--.
Col. 34, Line 67, change "171" to -- 117b--.
Col. 35, Line 45, change "th" to --the--.
Col. 35, Line 65, change "cuttig" to --cutting--.
Col. 36, Line 50, change "he" to --the--.
Col. 36, Line 63, change "102" to --1029--.

UNITED STATES PATENT OFFICE
CERTIFICATE OF CORRECTION

PATENT NO. : 4,053,346

DATED : Oct. 11, 1977

INVENTOR(S) : Amberg et al.

It is certified that error appears in the above-identified patent and that said Letters Patent are hereby corrected as shown below:

Col. 39, Line 54, change "185" to --1185--.
Col. 40, Line 37, change "comprises" to --comprised--.
Col. 40, Line 44, change "ona" to --on a--.
Col. 41, Line 6, change "gide" to --guide--.
Col. 42, Line 4, change "operated" to --operate--.
Col. 44, Line 18, change "for" to --form--.
Col. 44, Line 36, change "sealng" to --sealing--.

Signed and Sealed this

Fourteenth Day of March 1978

[SEAL]

Attest:

RUTH C. MASON
Attesting Officer

LUTRELLE F. PARKER
Acting Commissioner of Patents and Trademarks